US012573659B2

(12) United States Patent
Roumi et al.

(10) Patent No.: US 12,573,659 B2
(45) Date of Patent: Mar. 10, 2026

(54) MEMBRANES FOR ELECTROCHEMICAL CELLS

(71) Applicant: CALIFORNIA INSTITUTE OF TECHNOLOGY, Pasadena, CA (US)

(72) Inventors: Farshid Roumi, Pasadena, CA (US); Jamshid Roumi, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 16/890,326

(22) Filed: Jun. 2, 2020

(65) Prior Publication Data

US 2020/0365862 A1 Nov. 19, 2020

Related U.S. Application Data

(63) Continuation of application No. 14/680,997, filed on Apr. 7, 2015, now Pat. No. 10,714,724, which is a
(Continued)

(51) Int. Cl.
*H01M 10/0565* (2010.01)
*H01M 10/052* (2010.01)
(Continued)

(52) U.S. Cl.
CPC ..... *H01M 10/0565* (2013.01); *H01M 10/052* (2013.01); *H01M 10/0562* (2013.01); *H01M 10/4235* (2013.01); *H01M 10/48* (2013.01); *H01M 50/454* (2021.01); *H01M 50/457* (2021.01); *H01M 50/46* (2021.01);
(Continued)

(58) Field of Classification Search
CPC ........... H01M 50/449; H01M 10/0565; H01M 10/052; H01M 10/0562; H01M 10/4235; H01M 10/48; H01M 50/454; H01M 50/457; H01M 50/46
See application file for complete search history.

(56) References Cited

U.S. PATENT DOCUMENTS

| | | | |
|---|---|---|---|
| 528,647 | A | 11/1894 | Reed |
| 990,069 | A | 4/1911 | Sessions |
| 2,673,230 | A | 3/1954 | Brennan |
| 3,168,458 | A | 2/1965 | Sprague |
| 3,275,478 | A | 9/1966 | Rosser et al. |

(Continued)

FOREIGN PATENT DOCUMENTS

| | | |
|---|---|---|
| CN | 1555588 | 12/2004 |
| CN | 1670989 | 9/2005 |

(Continued)

OTHER PUBLICATIONS

JP-H08180853-A English machine translation (Year: 2025).*
(Continued)

*Primary Examiner* — Armindo Carvalho, Jr.
(74) *Attorney, Agent, or Firm* — Leydig, Voit & Mayer, Ltd.

(57) ABSTRACT

Ionically conducting composite membranes are provided which include a solid-state ionically conducting material The ionically conducting composite membranes may be used in electrochemical cells. The solid-state ionically conducting material may be an electrochemically active material. In some electrochemical cells, the solid-state ionically conducting material may be in electronic communication with an external tab.

16 Claims, 37 Drawing Sheets

Related U.S. Application Data continuation-in-part of application No. 14/546,953, filed on Nov. 18, 2014, now abandoned, and a continuation-in-part of application No. PCT/US2014/066200, filed on Nov. 18, 2014.

(60) Provisional application No. 62/024,104, filed on Jul. 14, 2014, provisional application No. 61/985,204, filed on Apr. 28, 2014, provisional application No. 61/976,281, filed on Apr. 7, 2014, provisional application No. 61/938,794, filed on Feb. 12, 2014, provisional application No. 61/905,678, filed on Nov. 18, 2013.

(51) Int. Cl.

| | |
|---|---|
| *H01M 10/0562* | (2010.01) |
| *H01M 10/42* | (2006.01) |
| *H01M 10/48* | (2006.01) |
| *H01M 50/454* | (2021.01) |
| *H01M 50/457* | (2021.01) |
| *H01M 50/46* | (2021.01) |

(52) U.S. Cl.
CPC ............... *H01M 2300/0071* (2013.01); *H01M 2300/0082* (2013.01); *H01M 2300/0085* (2013.01)

(56) References Cited

U.S. PATENT DOCUMENTS

| | | | |
|---|---|---|---|
| 3,342,717 | A | 9/1967 | Leduc |
| 3,351,495 | A | 11/1967 | Wayne et al. |
| 3,607,422 | A | 9/1971 | Moran |
| 3,639,173 | A | 2/1972 | Stachurski |
| 3,970,472 | A | 7/1976 | Steffensen |
| 3,972,795 | A | 8/1976 | Goens et al. |
| 4,041,211 | A | 8/1977 | Wiacek |
| 4,052,539 | A | 10/1977 | Shropshire et al. |
| 4,346,152 | A | 8/1982 | Sammells et al. |
| 4,349,614 | A | 9/1982 | Werth et al. |
| 4,438,185 | A | 3/1984 | Taskier |
| 4,786,567 | A | 11/1988 | Skyllas-Kazacos et al. |
| 4,871,428 | A | 10/1989 | Misra et al. |
| 4,981,672 | A | 1/1991 | De Neufville et al. |
| 5,089,455 | A | 2/1992 | Ketcham et al. |
| 5,227,260 | A | 7/1993 | Rose et al. |
| 5,384,211 | A | 1/1995 | Choi et al. |
| 5,487,959 | A | 1/1996 | Koksbang |
| 5,510,209 | A | 4/1996 | Abraham et al. |
| 5,554,464 | A | 9/1996 | Stempin et al. |
| 5,601,951 | A | 2/1997 | Johnson et al. |
| 5,714,283 | A | 2/1998 | Briscoe et al. |
| 5,952,120 | A | 9/1999 | Yu et al. |
| 6,074,776 | A | 6/2000 | Mao et al. |
| 6,096,456 | A | 8/2000 | Takeuchi et al. |
| 6,146,786 | A | 11/2000 | Stadnick et al. |
| 6,306,540 | B1 | 10/2001 | Hiroi et al. |
| 6,335,115 | B1 | 1/2002 | Meissner |
| 6,372,379 | B1 | 4/2002 | Samii et al. |
| 6,383,675 | B1 | 5/2002 | Zhong |
| 6,432,586 | B1 | 8/2002 | Zhang |
| 6,444,339 | B1 | 9/2002 | Eshraghi |
| 6,444,340 | B1 | 9/2002 | Jaffrey |
| 6,447,958 | B1 | 9/2002 | Shinohara et al. |
| 6,462,551 | B1 | 10/2002 | Coates et al. |
| 6,489,055 | B1 | 12/2002 | Ichihashi et al. |
| 6,563,691 | B2 | 5/2003 | Kijima et al. |
| 6,602,593 | B1 | 8/2003 | Callahan et al. |
| 6,770,401 | B1 | 8/2004 | Clough |
| 6,781,817 | B2 | 8/2004 | Andelman |
| 6,830,849 | B2 | 12/2004 | Lee et al. |
| 6,852,446 | B2 | 2/2005 | Barbarich |
| 6,869,727 | B2 | 3/2005 | Slezak |
| 7,282,295 | B2 | 10/2007 | Visco et al. |
| 7,282,296 | B2 | 10/2007 | Visco et al. |
| 7,390,591 | B2 | 6/2008 | Visco et al. |
| 7,425,387 | B2 | 9/2008 | Bohnstedt |
| 7,553,584 | B2 | 6/2009 | Chiang et al. |
| 7,618,748 | B2 | 11/2009 | Nathan et al. |
| 7,642,012 | B2 | 1/2010 | Djian et al. |
| 7,662,510 | B2 | 2/2010 | Zhang |
| 7,811,507 | B2 | 10/2010 | Wechs et al. |
| 7,846,571 | B2 | 12/2010 | Christensen et al. |
| 7,951,480 | B1 | 5/2011 | Skinlo et al. |
| 7,985,337 | B2 | 7/2011 | Heuser et al. |
| 8,017,260 | B2 | 9/2011 | Kaneta et al. |
| 8,048,556 | B2 | 11/2011 | Davis et al. |
| 8,110,301 | B2 | 2/2012 | Iacovangelo et al. |
| 8,119,269 | B2 | 2/2012 | Ramasubramanian et al. |
| 8,119,273 | B1 | 2/2012 | Gerald, II et al. |
| 8,202,649 | B2 | 6/2012 | Visco et al. |
| 8,216,712 | B1 | 7/2012 | Ramasubramanian et al. |
| 8,288,034 | B2 | 10/2012 | Davis et al. |
| 8,697,290 | B2 | 4/2014 | Babinec et al. |
| 8,703,356 | B2 | 4/2014 | Hayashi |
| 9,379,368 | B2 | 6/2016 | Roumi |
| 9,658,292 | B2 | 5/2017 | Roumi et al. |
| 9,831,043 | B2 | 11/2017 | Roumi et al. |
| 9,882,196 | B2 | 1/2018 | Eaglesham et al. |
| 9,954,213 | B2 | 4/2018 | Roumi |
| 10,170,702 | B2 | 1/2019 | Copel et al. |
| 10,714,724 | B2 | 7/2020 | Roumi et al. |
| 2001/0041295 | A1 | 11/2001 | Vallee et al. |
| 2002/0150818 | A1 | 10/2002 | Amatucci et al. |
| 2002/0160263 | A1 | 10/2002 | Corrigan et al. |
| 2003/0003364 | A1 | 1/2003 | Mori et al. |
| 2003/0013015 | A1 | 1/2003 | Klein et al. |
| 2003/0059681 | A1 | 3/2003 | Noh |
| 2003/0096147 | A1 | 5/2003 | Badding et al. |
| 2003/0099884 | A1 | 5/2003 | Chiang et al. |
| 2004/0011661 | A1 | 1/2004 | Bradford et al. |
| 2004/0018431 | A1 | 1/2004 | Gozdz et al. |
| 2004/0126653 | A1 | 7/2004 | Visco et al. |
| 2004/0175626 | A1 | 9/2004 | Dasgupta et al. |
| 2004/0234862 | A1 | 11/2004 | Macglashan et al. |
| 2004/0241540 | A1 | 12/2004 | Tsutsumi et al. |
| 2005/0074671 | A1 | 4/2005 | Sugiyama et al. |
| 2005/0095504 | A1 | 5/2005 | Kim et al. |
| 2005/0175894 | A1 | 8/2005 | Visco et al. |
| 2005/0186469 | A1 | 8/2005 | De Jonghe et al. |
| 2005/0208383 | A1 | 9/2005 | Totsuka et al. |
| 2006/0121342 | A1 | 6/2006 | Sano et al. |
| 2006/0154141 | A1 | 7/2006 | Salot et al. |
| 2007/0059584 | A1 | 3/2007 | Nakano et al. |
| 2007/0117000 | A1 | 5/2007 | An et al. |
| 2007/0141432 | A1 | 6/2007 | Wang et al. |
| 2007/0166617 | A1 | 7/2007 | Gozdz et al. |
| 2007/0190427 | A1 | 8/2007 | Carlson et al. |
| 2007/0212603 | A1 | 9/2007 | Nathan et al. |
| 2008/0057389 | A1 | 3/2008 | Kono et al. |
| 2008/0057399 | A1 | 3/2008 | Visco et al. |
| 2008/0107958 | A1 | 5/2008 | Kliatzkin |
| 2008/0113261 | A1 | 5/2008 | De Jonghe et al. |
| 2008/0153000 | A1 | 6/2008 | Salot et al. |
| 2008/0241664 | A1 | 10/2008 | Nanjundaswamy et al. |
| 2008/0268327 | A1 | 10/2008 | Gordon et al. |
| 2008/0274394 | A1 | 11/2008 | Schormann et al. |
| 2009/0035664 | A1 | 2/2009 | Chiang et al. |
| 2009/0087728 | A1 | 4/2009 | Less et al. |
| 2009/0087730 | A1 | 4/2009 | Kondo et al. |
| 2009/0169954 | A1 | 7/2009 | Ino et al. |
| 2009/0189567 | A1 | 7/2009 | Joshi et al. |
| 2009/0197170 | A1 | 8/2009 | Viavattine |
| 2009/0208834 | A1 | 8/2009 | Ramasubramanian et al. |
| 2009/0214956 | A1 | 8/2009 | Prieto et al. |
| 2010/0047671 | A1 | 2/2010 | Chiang et al. |
| 2010/0090650 | A1 | 4/2010 | Yazami et al. |
| 2010/0129699 | A1 | 5/2010 | Mikhaylik et al. |
| 2010/0203372 | A1 | 8/2010 | Kim et al. |
| 2010/0266907 | A1 | 10/2010 | Yazami |
| 2011/0027648 | A1 | 2/2011 | Long et al. |
| 2011/0065009 | A1 | 3/2011 | Lascaud et al. |

(56) References Cited

U.S. PATENT DOCUMENTS

| | | | |
|---|---|---|---|
| 2011/0097623 A1 | 4/2011 | Marinis et al. |
| 2011/0104521 A1 | 5/2011 | Kishimoto et al. |
| 2011/0117416 A1 | 5/2011 | Arora et al. |
| 2011/0123850 A1 | 5/2011 | Duong et al. |
| 2011/0123875 A1 | 5/2011 | Issaev et al. |
| 2011/0143207 A1 | 6/2011 | Arora et al. |
| 2011/0143217 A1 | 6/2011 | Arora et al. |
| 2011/0151332 A1 | 6/2011 | Morgan et al. |
| 2011/0159373 A1 | 6/2011 | Conner et al. |
| 2011/0159374 A1 | 6/2011 | Conner et al. |
| 2011/0159376 A1 | 6/2011 | Skotheim et al. |
| 2011/0165471 A9 | 7/2011 | Skotheim et al. |
| 2011/0171514 A1 | 7/2011 | Nishikawa et al. |
| 2011/0171518 A1 | 7/2011 | Dunn et al. |
| 2011/0183186 A1 | 7/2011 | Klootwijk et al. |
| 2011/0197435 A1 | 8/2011 | Kaneko et al. |
| 2011/0217585 A1 | 9/2011 | Wang et al. |
| 2011/0217586 A1 | 9/2011 | Kim et al. |
| 2011/0217588 A1 | 9/2011 | Roh et al. |
| 2011/0227243 A1 | 9/2011 | Kepler et al. |
| 2011/0236744 A1 | 9/2011 | Kim et al. |
| 2011/0256443 A1 | 10/2011 | Park et al. |
| 2011/0281176 A1 | 11/2011 | Seymour |
| 2011/0293976 A1 | 12/2011 | Chiba et al. |
| 2012/0015229 A1 | 1/2012 | Ohashi et al. |
| 2012/0015232 A1 | 1/2012 | Teshima et al. |
| 2012/0028101 A1 | 2/2012 | Ishihara et al. |
| 2012/0034508 A1 | 2/2012 | Davis et al. |
| 2012/0043940 A1 | 2/2012 | Affinito et al. |
| 2012/0077095 A1 | 3/2012 | Roumi et al. |
| 2012/0094188 A1 | 4/2012 | Visco et al. |
| 2012/0094194 A1 | 4/2012 | Visco et al. |
| 2012/0119155 A1 | 5/2012 | Liu et al. |
| 2012/0183868 A1 | 7/2012 | Tousaint et al. |
| 2012/0219842 A1 | 8/2012 | Visco et al. |
| 2012/0244412 A1 | 9/2012 | Pascaly et al. |
| 2012/0263986 A1 | 10/2012 | Fulop et al. |
| 2012/0270088 A1 | 10/2012 | Huang et al. |
| 2012/0270112 A1 | 10/2012 | Visco et al. |
| 2013/0017432 A1 | 1/2013 | Roumi |
| 2013/0122344 A1* | 5/2013 | Visco .................. H01M 4/405 |
| | | 429/188 |
| 2013/0130131 A1 | 5/2013 | Johnson et al. |
| 2013/0189592 A1 | 7/2013 | Roumi et al. |
| 2013/0224632 A1 | 8/2013 | Roumi |
| 2013/0260205 A1 | 10/2013 | Kwon et al. |
| 2014/0205883 A1 | 7/2014 | Wang et al. |
| 2014/0272500 A1 | 9/2014 | Roumi et al. |
| 2014/0272533 A1 | 9/2014 | Shi et al. |
| 2014/0329120 A1 | 11/2014 | Cui et al. |
| 2015/0171398 A1 | 6/2015 | Roumi |
| 2015/0180000 A1 | 6/2015 | Roumi |
| 2015/0357635 A1 | 12/2015 | Jito et al. |
| 2016/0126532 A1 | 5/2016 | Eaglesham et al. |
| 2016/0254514 A1 | 9/2016 | Roumi |
| 2017/0315178 A1 | 11/2017 | Roumi et al. |
| 2018/0114971 A1 | 4/2018 | Eaglesham et al. |
| 2018/0114972 A1 | 4/2018 | Doe et al. |
| 2018/0294460 A1 | 10/2018 | Roumi et al. |
| 2020/0388811 A1 | 12/2020 | Roumi |

FOREIGN PATENT DOCUMENTS

| | | |
|---|---|---|
| CN | 1726608 | 1/2006 |
| CN | 101188322 | 5/2008 |
| CN | 101641815 | 2/2010 |
| CN | 101809801 | 8/2010 |
| CN | 102117905 | 7/2011 |
| CN | 103647107 | 3/2014 |
| EP | 1271673 | 1/2003 |
| EP | 2639855 | 9/2013 |
| GB | 320916 | 10/1929 |
| JP | S40-001456 | 1/1965 |
| JP | S49-122476 | 10/1974 |
| JP | S51-048627 | 4/1976 |
| JP | S57-055064 | 4/1982 |
| JP | S62-291871 | 12/1987 |
| JP | S63-155552 | 6/1988 |
| JP | H06-140015 | 5/1994 |
| JP | H06-168737 | 6/1994 |
| JP | H08-180853 | 7/1996 |
| JP | H08180853 A * | 7/1996 |
| JP | H08-236093 | 9/1996 |
| JP | H09-092254 | 4/1997 |
| JP | H09-153354 | 6/1997 |
| JP | H09-231962 | 9/1997 |
| JP | H10-106521 | 4/1998 |
| JP | 2000-030686 | 1/2000 |
| JP | 2001-122998 | 5/2001 |
| JP | 2003-151633 | 5/2003 |
| JP | 2005-525674 | 8/2005 |
| JP | 2005-259566 | 9/2005 |
| JP | 2005-268095 | 9/2005 |
| JP | 2006-019146 | 1/2006 |
| JP | 2006-503416 | 1/2006 |
| JP | 2006-066355 | 3/2006 |
| JP | 2006-185917 | 7/2006 |
| JP | 2006-286427 | 10/2006 |
| JP | 2008-16193 | 1/2008 |
| JP | 2008-159589 | 7/2008 |
| JP | 2009-510700 | 3/2009 |
| JP | 2009-105063 | 5/2009 |
| JP | 2010-238421 | 10/2010 |
| JP | 2010-534389 | 11/2010 |
| JP | 2011-512010 | 4/2011 |
| JP | 2011086554 | 4/2011 |
| JP | 2011-515821 | 5/2011 |
| JP | 2011-124104 | 6/2011 |
| JP | 2011-518404 | 6/2011 |
| JP | 2011-222215 | 11/2011 |
| JP | 5452202 | 3/2014 |
| JP | 2015-519686 | 7/2015 |
| JP | 6019980 | 11/2016 |
| KR | 10-2002-0059781 | 7/2002 |
| KR | 100485336 | 2/2003 |
| KR | 10-2006-0043693 | 5/2006 |
| KR | 10-2007-0004670 | 1/2007 |
| KR | 10-2008-0069275 | 7/2008 |
| KR | 10-2010-0098498 | 9/2010 |
| KR | 101517886 | 10/2013 |
| KR | 10-1375422 | 3/2014 |
| WO | WO 1997/006569 | 2/1997 |
| WO | WO 01/39303 | 5/2001 |
| WO | WO 2001097304 | 12/2001 |
| WO | WO 2003/012908 | 2/2003 |
| WO | WO 2005/083829 | 9/2005 |
| WO | WO 2008/019398 | 2/2008 |
| WO | WO 2008/117220 | 3/2008 |
| WO | WO 2008/049040 | 4/2008 |
| WO | WO 2008/153749 | 12/2008 |
| WO | WO 2010/007579 | 1/2010 |
| WO | WO 2010/054261 | 5/2010 |
| WO | WO 2010/062391 | 6/2010 |
| WO | WO 2011/070712 | 6/2011 |
| WO | WO 2012/034042 | 3/2012 |
| WO | WO 2013/009750 | 1/2013 |
| WO | WO 2013/154623 | 10/2013 |
| WO | WO 2014/119274 | 8/2014 |
| WO | WO 2014/119275 | 8/2014 |
| WO | WO 2014/152650 | 9/2014 |
| WO | WO 2014/156891 | 10/2014 |
| WO | WO 2015/074037 | 5/2015 |
| WO | WO 2015/074065 | 5/2015 |
| WO | WO 2015/157339 | 10/2015 |
| WO | WO 2016/100919 | 6/2016 |

OTHER PUBLICATIONS

Japanese Intellectual Property Office, "Notification of Reasons for Refusal," dated Dec. 22, 2020, corresponding to Japanese Patent Application No. 2019-201691, 7 pages.

(56) References Cited

OTHER PUBLICATIONS

Adams (1993) "Particle size and shape effects in materials science: Examples from polymer and paper systems," Clay Minerals 28: 509-530.

Angulakshmi et al., (publicly available Aug. 2013) "MgAl$_2$SiO$_6$-incorporated poly(ethylene oxide)-based electrolytes for all-solid-state lithium Batteries", Ionics, (Feb. 2014) 20: 151-156.

Arora et al., "Battery Separators", Chem. Rev., 104:4419-4462 (2004).

Aurbach et al. (1989) "The Correlation Between Surface Chemistry, Surface Morphology, and Cycling Efficiency of Lithium Electrodes in a Few Polar Aprotic Systems," J. Electrochem Soc. 136(11): 3198-3205.

Aurbach et al., "A short review of failure mechanisms of lithium metal and lithiated graphite anodes in liquid electrolyte solutions", Solid State Ionics, 148:405-416 (2002).

AZoM (Oct. 2016) "Dendrites Are Major Issue for Next-Generation Lithium Batteries," available online at http://www.azom.com/news.aspx?newsID=46636, pp. 1-4.

Bruce et al. (publicly available Dec. 2011) "Li-0$_2$ and Li—S Batteries with High Energy Storage", Nature Materials, (Jan. 2012) 11: 19-29.

Chang et al. (Feb. 2017) Abstract only for "Effect of geometric size on mechanical properties of dielectric elastomers based on an improved visco-hyperelastic film model," Smart Materials and Structures 26(3): 3 pp.

Cheng et al., "Metal-Air Batteries: From Oxygen Reduction Electrochemistry to Cathode Catalysts", Chem. Soc. Rev., 41: 2172-2192 (Jan. 2012).

Christensen et al., "A Critical Review of Li/Air Batteries", J. Electrochem. Soc., 159(2):R1-R30 (2011).

Croce et al., "Role of the ceramic fillers in enhancing the transport properties of composite polymer electrolytes", Electrochimica Acta., 46:2457-2461 (2001).

Duduta et al., "Semi-Solid Lithium Rechargeable Flow Battery", Advanced Energy Materials, 1 (4):511-516 (2011).

Frankland (Sep. 2015) "Extrusion: Pellet Geometry Can Impact Output," available online at http://www.ptonline.com/columns/extrusion-pellet-geometry-can-impact-output, [Accessed Aug. 2017) pp. 1-4.

Goodenough, "Rechargeable Batteries: Challenges Old and New", J. Solid State Electrochem., 16:2019-2029 (Published Online May 8, 2012).

Gowda et al., (publicly available Feb. 2012) "3D Nanoporous Nanowire Current Collectors for Thin Film Microbatteries", Nano. Lett., (Mar. 2012) 12(3):1198-1202.

Hamelet et al., "Non-aqueous Li-Based Redox Flow Batteries", J. Electrochem. Soc., 159(8):A1360-A1367 (Jul. 2012).

Han et al., "Negating interfacial impedance in garnet-based solid-state Li metal batteries", Nature Materials, pp. 1-9 (2016).

Han et al., "Supplementary Information: Negating interfacial impedance in garnet-based solid-state Li metal batteries", pp. 1-17 (2016).

Jung et al., "An Improved High-Performance Lithium-Air Battery", Nature Chemistry, 4:579-585 (Published online Jun. 10, 2012).

Kichambare et al., (publicly available Dec. 2011) "Mesoporous Nitrogen-Doped Carbon-Glass Ceramic for Solid-State Lithium-Oxygen Batteries", ACS Appl. Mater. Interfaces, (Jan. 2012) 4(1):49-52.

Kumar et al., "A Solid-State, Rechargeable, Long Cycle Life Lithium-Air Battery", J. of the Electrochemical Society, 157(1):A50-A54 (2010).

Laman et al. (1988) "Effect of discharge current on cycle life of a rechargeable lithium battery," J. of Power Sources 24: 195-206.

Lee et al., "A review of recent developments in membrane separators for rechargeable lithium-ion batteries", Energy and Environmental Science, 7:3857-3886 (Aug. 18, 2014).

Li et al., (publicly available Nov. 2011) "A Dual-Electrolyte Rechargeable Li-Air Battery with Phosphate Buffer Catholyte", Electrochemistry Communications, (Jan. 2012) 14(1):78-81.

Li et al., "The pursuit of rechargeable solid-state Li-air batteries", Energy and Environmental Science, 6:2302-2311 (May 16, 2013).

Long et al., "Three-Dimensional Battery Architectures", Chem. Rev., 104:4463-4492 (2004).

Lu et al., "Aqueous Cathode for Next-Generation Alkali-Ion Batteries", J. Am. Chem. Soc., 133(15):5756-5759 (2011).

Lu et al., "Rechargeable-Ion Cathode-Flow Battery", J. Mater. Chem., 21:10113-10117 (2011).

Peng et al., "A Reversible and Higher-Rate Li—O$_2$ Battery", Science, 337(6094):563-566 (Aug. 2012).

Pu et al., "Preparation of PVDF-HFP microporous membrane for Li-ion batteries by phase inversion", J. of Membrane Science, 272(1-2): 11-14 (2006).

Raja et al., (publicly available Aug. 2014) "Thin, flexible and thermally stable ceramic membranes as separator for lithium-ion batteries", J. Membrane Sci., (Dec. 2014) 471:103-109.

Roberts et al., "3D Lithium Ion Batteries—From Fundamentals to Fabrication", J. Mater. Chem., 21 :9876-9890 (2011).

Roumi, "Shape changing transformations: Interactions with plasticity and electrochemical processes", Dissertation (Ph.D.), California Institute of Technology (2010).

Salvatierra et al. (publicly available Oct. 2018) "Suppressing Li Metal Dendrites Through a Solid Li-Ion Backup Layer," Adv. Mater. (Dec. 2018) 30(50): 1-9.

Salvatierra et al. (2018) Supporting Information for "Suppressing Li Metal Dendrites Through a Solid Li-Ion Backup Layer," Adv. Mater., 38 pp.

Scrosati, "Nanomaterials: Paper powers battery breakthrough", Nature Nanotechnology, 2:598-599 (2007).

Seel et al., "Electrochemical Intercalation of PF6 into Graphite", Electrochem. Soc., 147(3):892-898 (2000).

Shao et al., "Electrocatalysts for Nonaqueous Lithium-Air Batteries: Status, Challenges, and Perspective", ACS Catal., 2(5):844-857 (Published online Apr. 6, 2012).

Shi et al., "Single ion solid-state composite electrolytes with high electrochemical stability based on a poly(perfluoroalkylsulfonyl)-imide ionene polymer", J. Mater. Chem. A., 2:15952-15957 (Aug. 2014).

Sun et al., (publicly available Sep. 2011) "Graphene Nanosheets as Cathode Catalysts for Lithium-Air Batteries with an Enhanced Electrochemical Performance", Carbon, (Feb. 2012) 50(2):727-733.

Tan et al., "Synthesis and Characterization of Biphenyl-Based Lithium Solvated Electron Solutions", J. Phys. Chem. B., 116(30):9056-9060 (Published Online Jul. 1, 2012).

Tarascon et al., "Issues and challenges facing rechargeable lithium batteries", Nature, 414:359-367 (2001).

Tsai (1965) "Strength characteristics of composite materials," NASA CR-224, Prepared under Contract No. NAS 7-215 by Philco Corporation, 100 pp.

Tu et al., (publicly available Feb. 2015) "A Dendrite-Free Lithium Metal Battery Model Based on Nanoporous Polymer/Ceramic Composite Electrolytes and High Energy Electrodes", Small, (Jun. 2015) 11(22):2631-2635.

Weber et al., "Redox Flow Batteries: A Review", J. Appl. Electrochem., 41 :1137-1164 (2011).

Wiesler, "Membranes," Ultrapure Water. Article No. UP130427, pp. 27-31 [Accessible on the Internet at: http://www.liquicel.com/uploads/documents/Membrane%20Contactors%20-%20An%20Introduction%20To%20The%20Technology.pdfl (1996).

Wu et al. (Oct. 2014) "Improving battery safety by early detection of internal shorting with a bifunctional separator," Nat. Comm. 5: 5193, pp. 1-6.

Xu, "Nonaqueous Electrolytes for Lithium-Based Rechargeable Batteries", Chemical Reviews, 104:4303-4417 (2004).

Zadin, "Modeling the 3-D Microbattery," University of Tartu [Accessible on the Internet at: http://dspace.utlib.ee/dspace/handle/10062/25375] [Last Accessed Jun. 26, 2013] (May 8, 2012).

Zhang, "A review on the separators of liquid electrolyte Li-ion batteries", J. of Power Sources, 164(1) :351-364 (2007).

Zheng et al., (publicly available Feb. 2013) "Amphiphilic Surface Modification of Hollow Carbon Nanofibers for Improved Cycle Life of Lithium Sulfur Batteries", Nano Lett., (Mar. 2013) 13(3):1265-1270.

(56)　　　　　　References Cited

OTHER PUBLICATIONS

Zhong et al., "High-Capacity Silicon-Air Battery in Alkaline Solution", ChemSusChem., 5:177-180 (Published online Dec. 5, 2011).
Communication pursuant to Article 94(3) EPC dated Mar. 28, 2017, for European Patent Application No. 12811935.1.
Decision to Grant a Patent drafted Nov. 30, 2017, corresponding to Japanese Patent Application No. 2014-520250, English translation.
Decision to Grant a Patent drafted Jul. 24, 2018, corresponding to Japanese Patent Application No. 2015-505702, English translation.
Decision to Grant a Patent drafted Aug. 19, 2019, corresponding to Japanese Patent Application No. 2017-200193, English translation.
Decision to Grant a Patent drafted Sep. 30, 2019, corresponding to Japanese Patent Application No. 2018-160745, English translation.
Examination Report corresponding to Chinese Patent Application No. 2012800335610, dated Jun. 8, 2015—with English translation.
Extended European Search Report corresponding the European Patent Application No. 12811935.1, dated Mar. 9, 2015.
Extended European Search Report corresponding to European App. No. 13775922.1, dated Jul. 3, 2018.
Grant of Patent dated Dec. 26, 2018, corresponding to Korean Patent Application No. 10-2014-7000423, English translation.
International Search Report and Written Opinion dated Jan. 30, 2013, for International Application No. PCT/US2012/046067.
International Search Report and Written Opinion dated Jun. 27, 2013, for PCT International Application No. PCT/US2013/021043.
International Search Report and Written Opinion mailed Apr. 30, 2012, for International Application No. PCT/US2011/051041.
International Search Report and Written Opinion mailed Feb. 12, 2015, corresponding the International Application No. PCT/US2014/066200.
International Search Report with Written Opinion corresponding to International Patent Application No. PCT/US2014/066113, mailed Feb. 19, 2015.
International Search Report with Written Opinion corresponding to International Patent Application No. PCT/US2015/024787, mailed Jul. 16, 2015.
Notice of Allowance corresponding to Chinese Patent Application No. 201180042861.0, dated Oct. 27, 2015—with English translation.
Notice of Allowance corresponding to Chinese Patent Application No. 201280033561.0, dated Aug. 30, 2016—with English translation.
Notice of Allowance corresponding to U.S. Appl. No. 13/229,479, mailed Jul. 7, 2017.
Notice of Allowance corresponding to U.S. Appl. No. 13/738,835, mailed Mar. 2, 2016.
Notice of Allowance corresponding to U.S. Appl. No. 14/546,472, mailed Jan. 31, 2018.
Notice of Allowance corresponding to U.S. Appl. No. 15/148,278, mailed Jan. 23, 2018.
Notice of Allowance corresponding to U.S. Appl. No. 15/148,278, mailed Jul. 29, 2017.
Notice of Allowance corresponding to U.S. Appl. No. 13/545,683, mailed Jul. 27, 2018.
Notice of Allowance corresponding to Korean Patent Application No. 10-2020-7015283, dated Dec. 15, 2020.
Notification of Reasons for Refusal corresponding to Japanese Patent Application No. 2015-505702, dated Jan. 10, 2017, with English translation.
Notification of Reasons for Refusal drafted Jun. 20, 2018 corresponding to Japanese Patent Application No. 2015-505702, English translation.
Notification of Reason for Refusal dated Aug. 13, 2018 corresponding to Korean Patent Application No. 10-2014-7000423, English translation.
Notification of Reason for Refusal dated Jun. 27, 2019 corresponding to Korean Patent Application No. 10-2014-7030130, with English translation.

Notification of Reasons for Refusal drafted Feb. 27, 2019 corresponding to Japanese Patent Application No. 2017-200193, English translation.
Notification to Go Through Registration Formalities date Nov. 13, 2018, corresponding to Chinese Patent Application No. 2013800305253 with English translation.
Notice of Allowance corresponding to U.S. Appl. No. 15/911,020, dated Feb. 13, 2020.
Notice of Allowance corresponding to Korean Patent Application No. 10-2014-7030130, dated Feb. 27, 2020.
Notice of Allowance corresponding to U.S. Appl. No. 14/680,997, dated Mar. 4, 2020.
Office Action corresponding to Chinese Patent Application No. 201380030525.3, dated Jul. 30, 2018—with English translation.
Office Action corresponding to Chinese Patent Application No. 201380030525.3, dated Feb. 16, 2017—with English summary.
Office Action corresponding to Chinese Patent Application No. 201180042861.0, dated Apr. 10, 2015—with partial English translation.
Office Action corresponding to Chinese Patent Application No. 201180042861.0, dated Sep. 4, 2014—with English translation.
Office Action corresponding to Chinese Patent Application No. 201280033561.0, dated Jan. 4, 2016—with English summary.
Office Action corresponding to Chinese Patent Application No. 201380030525.3, dated Nov. 16, 2017—with English summary.
Office Action corresponding to Chinese Patent Application No. 201380030525.3, issued Apr. 1, 2016—with English summary.
Office Action corresponding to Chinese Patent Application No. 2012800335610, dated Jun. 8, 2015—with English translation.
Office Action corresponding to European Patent Application No. 12811935.1, dated Dec. 1, 2015.
Office Action corresponding to European Patent Application No. 13775922.1, dated Aug. 9, 2019.
Office Action corresponding to European Patent Application No. 12811935.1, dated Mar. 28, 2017.
Office Action corresponding to European Patent Application No. 12811935.1, dated May 8, 2018.
Office Action corresponding to Japanese Patent Application No. 2017-200193, dated Oct. 23, 2018—with English translation.
Office Action corresponding to Japanese Patent Application No. 2013-528339, dated Aug. 18, 2015—with English translation.
Office Action corresponding to Japanese Patent Application No. 2013-528339, dated Jul. 5, 2016—with English translation.
Office Action corresponding to Japanese Patent Application No. 2014-520250, issued Aug. 16, 2016—with English translation.
Office Action corresponding to Japanese Patent Application No. 2014-520250, issued Aug. 1, 2017—with English translation.
Office Action corresponding to Japanese Patent Application No. 2015-505702, issued Sep. 5, 2017—with English translation.
Office Action corresponding to Japanese Patent Application No. 2015-505702, issued Jan. 10, 2017—with English translation.
Office Action corresponding to Korean Patent Application No. 10-2013-7007963, dated Sep. 22, 2017—with English translation.
Office Action Corresponding to U.S. Appl. No. 14/546,953, dated May 24, 2018.
Office Action corresponding to U.S. Appl. No. 13/229,479, mailed Aug. 13, 2015.
Office Action corresponding to U.S. Appl. No. 13/229,479, mailed May 19, 2016.
Office Action corresponding to U.S. Appl. No. 13/545,683, dated May 18, 2015.
Office Action corresponding to U.S. Appl. No. 13/545,683, mailed Nov. 23, 2015.
Office Action corresponding to U.S. Appl. No. 13/545,683, mailed Dec. 1, 2016.
Office Action corresponding to U.S. Appl. No. 13/545,683, mailed Oct. 5, 2017.
Office Action corresponding to U.S. Appl. No. 13/724,479, mailed Jul. 27, 2017.
Office Action corresponding to U.S. Appl. No. 13/724,479, mailed Oct. 7, 2016.
Office Action corresponding to U.S. Appl. No. 13/738,835, dated Apr. 13, 2015.

(56)　　　　　References Cited

OTHER PUBLICATIONS

Office Action corresponding to U.S. Appl. No. 13/738,835, mailed Aug. 3, 2015.
Office Action corresponding to U.S. Appl. No. 14/546,472, mailed Jan. 31, 2018.
Office Action corresponding to U.S. Appl. No. 14/546,472, mailed Mar. 17, 2017.
Office Action corresponding to U.S. Appl. No. 14/546,953, dated Mar. 14, 2019.
Office Action corresponding to U.S. Appl. No. 14/546,953, dated Oct. 10, 2019.
Office Action corresponding to U.S. Appl. No. 14/546,953, mailed Feb. 13, 2017.
Office Action corresponding to U.S. Appl. No. 14/546,953, mailed Oct. 12, 2017.
Office Action corresponding to U.S. Appl. No. 14/680,997, dated Jul. 17, 2019.
Office Action corresponding to U.S. Appl. No. 14/680,997, mailed Jan. 25, 2018.
Office Action corresponding to U.S. Appl. No. 14/680,997, dated Dec. 14, 2018.
Office Action corresponding to U.S. Appl. No. 14/680,997, mailed Apr. 21, 2017.
Office Action corresponding to U.S. Appl. No. 15/148,278, mailed Feb. 9, 2017.
Office Action corresponding to U.S. Appl. No. 15/148,278, mailed Oct. 18, 2016.
Office Action corresponding to U.S. Appl. No. 15/911,020, dated Apr. 10, 2019.
Office Action corresponding to U.S. Appl. No. 15/911,020, dated Sep. 23, 2019.
Office Action corresponding to Korean Patent Application No. 10-2020-7015283, dated Jul. 3, 2020.
Search Report corresponding to European Patent Application No. 12811935.1, dated Mar. 9, 2015.
Search Report corresponding to European Patent Application No. 13775922.1, dated Feb. 1, 2016.
Search Report corresponding to European Patent Application No. 13775922.1, dated Jun. 15, 2016.
Korean Intellectual Property Office, "Notice to File a Response," dated Jul. 26, 2021, corresponding to Korean Patent Application No. 10-2021-7007717.
China National Intellectual Property Administration, Examination Report dated Feb. 9, 2022, corresponding to Chinese Patent Application No. 2019100825878.
Korean Intellectual Property Office, "Notice to File a Response," dated Aug. 25, 2022, corresponding to Korean Patent Application No. 10-2022-7013868.
China National Intellectual Property Administration, Examination Report dated Aug. 3, 2022, corresponding to Chinese Patent Application No. 2019100825878.
Nimon et al., (2013) "Modeling and Experimental Study of Porous Carbon Cathodes in Li—$O_2$ Cells with Non-Aqueous Electrolyte," ECS Electrochemistry Letters, 2 (4) A33-A35.
Kordek et al., (2018) "Two-Step Activated Carbon Cloth with Oxygen-Rich Functional Groups as a High-Performance Additive-Free Air Electrode for Flexible Zinc-Air Batteries," Adv. Energy Mater., 2019, 9, 1802936.
Meng et al., (2016) In Situ Coupling of Strung $Co_4N$ and Inter-twined N—C Fibers toward Free-Standing Bifunctional Cathode for Robust, Efficient, and Flexible Zn-Air Batteries, J. Am. Chem. Soc. 2016, 138, 10226-10231.
U.S. Appl. No. 13/545,683, filed Jul. 10, 2012.
U.S. Appl. No. 13/738,835, filed Jan. 10, 2013.
U.S. Appl. No. 13/229,479, filed Sep. 9, 2011.
U.S. Appl. No. 13/724,479, filed Dec. 21, 2012.
U.S. Appl. No. 14/211,381, filed Mar. 14, 2014.
U.S. Appl. No. 14/546,953, filed Nov. 18, 2014.
U.S. Appl. No. 14/546,472, filed Nov. 18, 2014.
U.S. Appl. No. 14/680,997, filed Apr. 7, 2015.
U.S. Appl. No. 14/975,336, filed Dec. 18, 2015.
U.S. Appl. No. 15/148,278, filed May 6, 2016.
U.S. Appl. No. 15/484,403, filed Apr. 11, 2017.
U.S. Appl. No. 15/783,768, filed Oct. 13, 2017.
U.S. Appl. No. 15/911,020, filed Mar. 2, 2018.
U.S. Appl. No. 15/973,391, filed May 7, 2018.
U.S. Appl. No. 16/420,675, filed May 23, 2019.
U.S. Appl. No. 16/505,424, filed Jul. 8, 2019.
U.S. Appl. No. 16/872,036, filed May 11, 2020.
U.S. Appl. No. 17/103,722, filed Nov. 24, 2020.
U.S. Appl. No. 17/122,390, filed Dec. 15, 2020.

* cited by examiner

Charging (a)

(b)

MEMBRANES FOR ELECTROCHEMICAL CELLS

CROSS REFERENCE TO RELATED APPLICATION

The present application is a continuation application of U.S. patent application Ser. No. 14/680,997 filed Apr. 7, 2015, which claims the benefit of priority from U.S. Provisional Application No. 61/976,281, filed Apr. 7, 2014 and is a continuation-in-part application U.S. patent application Ser. No. 14/546,953, filed Nov. 18, 2014, which claims the benefit of priority to U.S. Provisional Application No. 61/905,678, filed Nov. 18, 2013; U.S. Provisional Application No. 61/938,794, filed Feb. 12, 2014; U.S. Provisional Application No. 61/985,204, filed Apr. 28, 2014 and U.S. Provisional Application No. 62/024,104, filed Jul. 14, 2014, all of which are incorporated herein by reference in their entireties, and U.S. patent application Ser. No. 14/680,997 is a continuation-in-part application of International Patent Application No. PCT/US14/66200, filed Nov. 18, 2014, which claims the benefit of priority to U.S. Provisional Application No. 61/905,678, filed Nov. 18, 2013; U.S. Provisional Application No. 61/938,794, filed Feb. 12, 2014; U.S. Provisional Application No. 61/985.204, filed Apr. 28, 2014 and U.S. Provisional Application No. 62/024,104, filed Jul. 14, 2014.

STATEMENT REGARDING FEDERALLY SPONSORED RESEARCH OR DEVELOPMENT

Not applicable.

BACKGROUND

Over the last few decades revolutionary advances have been made in electrochemical storage and conversion devices expanding the capabilities of these systems in a variety of fields including portable electronic devices, air and space craft technologies, passenger vehicles and biomedical instrumentation. Current state of the art electrochemical storage and conversion devices have designs and performance attributes that are specifically engineered to provide compatibility with a diverse range of application requirements and operating environments. For example, advanced electrochemical storage systems have been developed spanning the range from high energy density batteries exhibiting very low self-discharge rates and high discharge reliability for implanted medical devices to inexpensive, light weight rechargeable batteries providing long runtimes for a wide range of portable electronic devices to high capacity batteries for military and aerospace applications capable of providing extremely high discharge rates over short time periods.

Despite the development and widespread adoption of this diverse suite of advanced electrochemical storage and conversion systems, significant pressure continues to stimulate research to expand the functionality of these systems, thereby enabling an even wider range of device applications. Large growth in the demand for high power portable electronic products, for example, has created enormous interest in developing safe, light weight primary and secondary batteries providing higher energy densities. In addition, the demand for miniaturization in the field of consumer electronics and instrumentation continues to stimulate research into novel design and material strategies for reducing the sizes, masses and form factors of high performance batteries. Further, continued development in the fields of electric vehicles and aerospace engineering has also created a need for mechanically robust, high reliability, high energy density and high power density batteries capable of good device performance in a useful range of operating environments.

Many recent advances in electrochemical storage and conversion technology are directly attributable to discovery and integration of new materials for battery components. Lithium battery technology, for example, continues to rapidly develop, at least in part, due to the discovery of novel electrode and electrolyte materials for these systems. The element lithium has a unique combination of properties that make it attractive for use in an electrochemical cell. First, it is the lightest metal in the periodic table having an atomic mass of 6.94 AMU. Second, lithium has a very low electrochemical oxidation/reduction potential (i.e., −3.045 V vs. NHE (normal hydrogen reference electrode)). This unique combination of properties enables lithium based electrochemical cells to have very high specific capacities. State of the art lithium ion secondary batteries provide excellent charge-discharge characteristics, and thus, have also been widely adopted as power sources in portable electronic devices, such as cellular telephones and portable computers. U.S. Pat. Nos. 6,852,446, 6,306,540, 6,489,055, and "Lithium Batteries Science and Technology" edited by Gholam-Abbas Nazri and Gianfranceo Pistoia, Kluer Academic Publishers, 2004, which are hereby incorporated by reference in their entireties, are directed to lithium and lithium ion battery systems.

Advances in electrode materials, electrolyte compositions and device geometries continue to support the further development of Li based electrochemical systems. For example, U.S. Patent Application Publication US2012/0077095, published on Mar. 29, 2012, and International Patent Application publication WO 2012/034042, published on Mar. 15, 2012, disclose three-dimensional electrode array structures for electrochemical systems including lithium batteries.

As will be generally recognized from the foregoing, a need currently exists for electrochemical systems, such as lithium based or alkaline based batteries, flow batteries, supercapacitors and fuel cells, exhibiting electrochemical properties useful for a range of applications. Specifically, lithium electrochemical systems capable of good electrochemical performance and high versatility for both primary and secondary lithium based batteries are needed.

SUMMARY

In an aspect, the invention provides an ionically conducting composite membrane which includes a solid-state ionically conducting material. The membranes provided by the present invention can be used in electrochemical cells. Use of a solid-state ionically conducting material in the composite membrane can seal one portion of the cell from another. For example, use of such an ionically conductive membrane can allow use of an aqueous electrolyte in contact with one electrode and a non-aqueous electrolyte in contact with another electrolyte. In other aspects, the invention provides electrochemical cells including the ionically conducting composite membranes and methods for using the electrochemical cells. In embodiments, the electrochemical cell is a Li-ion or Na-ion cell Solid-state ionically conducting materials conventionally used as electrolytes include gelled polymers, solvent free polymers, inorganic crystalline compounds and inorganic glasses. In an embodiment, solid-state ionically conducting materials include materials which include materials whose ionic conductivity is electronically "activated", such as by application of voltage or current. In embodiments, the applied current or voltage can be direct or alternating (e.g. a sinusoidal voltage). In an embodiment, such a material has a significantly greater ionic conductivity in the "activated" state; use of such material can provide gating functionality.

In a further embodiment, solid-state ionically conducting materials suitable for use in the composite membranes disclosed herein include materials conventionally used as active materials in electrochemical cells. Such a material may be "activated" by application of a voltage varying between the charge-discharge voltage of the electrolyte. In an embodiment, such a solid-state ionically conductive material is an oxide material, such as lithium titanate or titanium dioxide. In another embodiment, the solid-state ionically conductive material is a semiconductor, such as silicon. In another embodiment, the solid-state ionically conductive material is a conventional carbonaceous anode material such as graphite, modified graphite, and non-graphitic carbons. In a further embodiment, one or more of these materials conventionally used as electrochemically active materials is used in combination with one or more conventional solid electrolyte materials. Benefits of such cells include, but are not limited to higher mechanical flexibility of the cell during manufacturing and operation, ease of manufacturing, allowing different materials with better thermal and mechanical stability to be used, slow-down of the migration of active materials between the electrodes and lower impedance between the electrodes and the membrane which results in faster rates and longer cycle life. In some embodiments where the electronchemically active materials are in electrical communication with an external tabl, active material additives may be released to the cell when needed.

In embodiments, the solid-state ionically conductive material is in the form of a free standing layer, a coating layer, or included in a support or frame of an electronically conducting or electronically insulating material (e.g. a material which does not conduct electrons through the thickness of the support). Supported solid electrolyte material may be in the form of bulk pieces, particles or fibers. Particles or fibers of solid electrolyte material may be combined with other materials such binders and/or conductive particles or fibers. The support or frame may provide high mechanical strength to the layer including the solid-state ionically conductive material. In an embodiment, the composite membrane has a shear modulus from 1 GPa-3 GPa, a tensile strength of 100-300 MPa and a rupture strength of 900 to 1100 gr.

The ionic conductivity of the composite membrane may be greater than 1 mS/cm In an embodiment, for example, the composite membrane in the presence of an appropriate electrolyte provides a net ionic resistance from the positive electrode to the negative electrode selected over the range of 0.5 ohm cm$^2$ to 25 ohm cm$^2$, and preferably for some applications less than 5 ohm cm$^2$.

In an additional aspect, the solid-state ionically conductive material is in electronic communication with an external connection tab. The external connection tab may also be referred to as an external tab. In an embodiment, the external connection tab used to modify the performance of the cell by applying a voltage or current between the external connection tab and either the external connection tab of one of the electrodes or of an additional electronically conductive layer in the composite separator In an aspect, the disclosure provides an electrochemical cell comprising a positive electrode, a negative electrode and a composite membrane disposed between the positive electrode and the negative electrode, the composite membrane comprising a layer comprising a solid-state ionically conductive material. In an embodiment, the cell further comprises at least one liquid electrolyte disposed between the composite membrane and each of the positive and the negative electrodes and the composite membrane comprises a porous or perforated electronically insulating separator layer disposed between the layer comprising the solid-state ionically conductive material and each of the positive and the negative electrode. In an embodiment, the positive electrode comprises a positive electrode active material and a first current collector in electronic communication with the positive electrode active material, the first current collection further comprising a first external connection tab, a negative electrode comprising a negative electrode active material and a second current collector in electronic communication with the negative electrode active material, the second current collector further comprising a second external connection tab and the ionically conductive solid-state material being in electronic communication with a third external connection tab. In an embodiment, the solid-state ionically conductive material is electronically "activatable" so that application of a voltage between the third external tab and any of the electrodes produces a significant increase in the ionic conductivity of the material.

In an embodiment, the invention provides an electrochemical cell comprising:

a positive electrode comprising a positive electrode active material and a first current collector in electronic communication with the positive electrode active material, the first current collection further comprising a first external connection tab;

a negative electrode comprising a negative electrode active material and a second current collector in electronic communication with the negative electrode active material, the second current collector further comprising a second external connection tab;

a composite membrane disposed between the positive electrode and the negative electrode; the composite membrane being ionically conductive and comprising an ionically conductive solid-state material in electronic communication with a third external connection tab;

a first ionically conductive separator positioned between the positive electrode and the composite membrane; and a second ionically conductive separator positioned between the negative electrode and the composite membrane; and one or more electrolytes positioned between said positive electrode and said negative electrode; said one or more electrolytes capable of conducting ionic charge carriers.

In a further embodiment, the composite membrane further comprises a third current collector in electronic communication with ionically conductive solid-state material, the third current collector being porous or perforated In an aspect, the disclosure provides an electrochemical cell comprising a positive electrode, a negative electrode and a composite membrane disposed between the positive electrode and the negative electrode, the composite membrane comprising a layer comprising a solid-state ionically conductive material. In an embodiment, the solid-state ionically conductive material is material conventionally used as an active material in a positive or negative electrode material. In an embodiment, the cell further comprises at least one liquid electrolyte disposed between the composite membrane and each of the positive and the negative electrodes and the composite membrane comprises a porous or perforated electronically insulating separator layer disposed between the layer comprising the solid-state ionically conductive material and each of the positive and the negative electrode.

In an embodiment, the invention provides an electrochemical cell comprising:

a positive electrode;

a negative electrode;

a composite membrane layer comprising a layer comprising an ionically conductive and electrochemically active solid-state material;

a first ionically conductive porous separator positioned between the positive electrode and the membrane layer;

a second ionically conductive porous separator positioned between the negative electrode and the membrane layer; and one or more electrolytes positioned between said positive electrode and said negative electrode; said one or more electrolytes capable of conducting ionic charge carriers. In an embodiment, the porous separators are electronically insulating.

In a further embodiment, the invention provides an electrochemical cell comprising:

a positive electrode;

a negative electrode;

a composite membrane layer positioned between the said electrodes comprising at least one porous separator layer;

at least one ionically conductive and electrochemically active solid-state material; and one or more electrolytes positioned between said positive electrode and said negative electrode; said one or more electrolytes capable of conducting ionic charge carriers In an additional embodiment, the invention provides an electrochemical cell comprising:

a positive electrode;

a negative electrode;

a composite porous separator layer positioned between the said electrodes comprising at least one ionically conductive and electrochemically active solid-state material, and at least one solid-state binder material; and one or more electrolytes positioned between said positive electrode and said negative electrode; said one or more electrolytes capable of conducting ionic charge carriers.

In a further embodiment, the active layer further comprises a tab which allows connection of the layer comprising the ionically conductive and electrochemically active solid-state material to another electrode or to a source of current or voltage. In an embodiment, an active layer acts as an auxiliary electrode when an external tab is in electronic communication with the active layer. In an addition embodiment, the active layer further comprises electronically and ionically conductive layer in electronic contact with the electrochemically active material of the layer.

In an embodiment, the invention provides an electrochemical cell comprising:

a positive electrode comprising a positive electrode active material and a first current collector in electronic communication with the positive electrode active material, the first current collection further comprising a first external connection tab;

a negative electrode comprising a negative electrode active material and a second current collector in electronic communication with the negative electrode active material, the second current collector further comprising a second external connection tab;

a composite membrane disposed between the positive electrode and the negative electrode; the composite membrane being ionically conductive and comprising an ionically conductive solid-state material in electronic communication with a third external connection tab;

a first ionically conductive separator positioned between the positive electrode and the composite membrane; and a second ionically conductive separator positioned between the negative electrode and the composite membrane; and one or more electrolytes positioned between said positive electrode and said negative electrode; said one or more electrolytes capable of conducting ionic charge carriers. In an embodiment, the separator is electronically insulating.

In a further embodiment, the invention provides an electrochemical cell comprising:

a positive electrode comprising a positive electrode active material and a first current collector in electronic communication with the positive electrode active material, the first current collection further comprising a first external connection tab;

a negative electrode comprising a negative electrode active material and a second current collector in electronic communication with the negative electrode active material, the second current collector further comprising a second external connection tab;

a composite membrane disposed between the positive electrode and the negative electrode; and comprising an ionically and electronically conductive layer;

at least one electronically insulating porous layer positioned between the said electronically conductive porous layer and an electrode.

one or more electrolytes positioned between said positive electrode and said negative electrode; said one or more electrolytes capable of conducting ionic charge carriers.

In an embodiment, the disclosure provides an electrochemical cell comprising: a positive electrode; a negative electrode; one or more electrolytes positioned between said positive electrode and said negative electrode; said one or more electrolytes capable of conducting ionic charge carriers; and a composite membrane comprising at least two electronically insulating and ionically conductive layers; said membrane positioned between said positive electrode and said negative electrode such that said ionic charge carriers are able to be transported between said positive electrode and said negative electrode but not electronic charge carriers. In an embodiment, at least one of the electronically insulating and ionically conductive layers comprises a solid electrolyte.

In some aspects, the invention provides composite membranes and membrane systems for use in an electrochemical cell and electrochemical cells comprising these membrane systems. In an embodiment, the composite membrane comprises a first membrane layer comprising a solid or gel electrolyte disposed within the apertures of a support structure and a second membrane layer comprising a plurality of pores, the pores of the second membrane layer being offset from the apertures of the first membrane layer. FIG. 1 illustrates an exemplary first membrane layer 20 including a support structure 22 and apertures 24. FIG. 2 illustrates an exemplary second membrane layer 30 comprising pores 34; when these two layers are placed in contact, the pores of the second layer are offset from the apertures of the first membrane layer. In an embodiment the first membrane layer is a high mechanical strength layer. In a further embodiment only one high mechanical strength layer is present in the membrane system and that high mechanical strength layer is the first membrane layer. In an embodiment, the second membrane layer may be a porous or perforated polymeric separator. In the embodiment, the size of the apertures of the first membrane layer are greater than the size of the pores of the second membrane layer, as schematically illustrated in FIGS. 1 and 2. In embodiments, the ratio of the size of the apertures to the size of the pores is from 5:1 to 100:1, from 5:1 to 20:1, from 25:1 to 100:1 or from 25:1 to 50:1. In embodiments, the aperture size is from 5 nm to 2 mm, 10 nm to 1 mm, from 1 mm to 10 mm, or from 500 $\mu$m to 1 mm and the pore size is from 5 nm to 2 mm, 10 nm to 1 mm, from 100 $\mu$m to 500 $\mu$m or from 10 $\mu$m to 50 $\mu$m.

In a further embodiment, the second membrane layer further comprises an electronically conductive coating on one side of the layer. In an embodiment, the electronically conductive coating is on the electrode side of the layer. In an further embodiment an external tab is connected to this electronically conducting layer; in this embodiment the electronically conductive coating may be on either side of the membrane.

In an embodiment, the first membrane layer is disposed proximate to the positive electrode and a liquid electrolyte is provided proximate to the negative electrode. In an embodiment, the liquid electrolyte at least partially fills the pores of the second membrane layer. In a further embodiment, a second electrolyte is provided between the positive electrode and the first membrane layer.

In an embodiment, the solid electrolyte is provided within a layer inside the apertures and the thickness of the layer is from 0.01 mm to 0.5 mm or from 5 $\mu$m to 20 $\mu$m.

In an embodiment, the invention provides an electrochemical cell comprising:

a positive electrode;

a negative electrode;

a first membrane layer being positioned proximate to one of the positive electrode and the negative electrode, the first membrane layer comprising a support structure comprising a plurality of apertures and a solid or gel electrolyte disposed within the apertures of the support structures, wherein the support structure formed of an electronically insulating material or is formed of an electronically conducting material at least partially coated with an electronically insulating material;

a second membrane layer being positioned proximate to the other of the positive and the negative electrode and proximate to the first membrane layer, the second membrane layer comprising a plurality of pores, the pores of the second membrane layer not overlapping the apertures of the first membrane layer and the pores comprising a liquid electrolyte;

wherein each of the first and second membrane layer is ionically conductive and at least one of the first and second membrane layers is electronically insulating.

In an additional embodiment, the invention provides an electrochemical cell comprising:

a positive electrode;

a negative electrode;

a membrane layer being positioned proximate to an electrode, the membrane layer comprising a support structure comprising a plurality of apertures and a solid or gel electrolyte disposed within the apertures of the support structures, wherein the support structure is formed of an electronically insulating material or is formed of an electronically conducting material at least partially coated with an electronically insulating material;

wherein the membrane layer is ionically conductive and at least one side of the said membrane is electronically insulating.

In embodiments, the ionically conductive material or electrolyte is a single material or a combination of materials. For example, in an embodiment, the ionically conductive material is a glass electrolyte or a ceramic electrolyte. A polymer electrolyte comprising a polymer host, a solvent and an alkali metal salt provides an example of an electronically conductive material which can be viewed as a combination of a materials. In a further embodiment, the ionically conductive material is a composite material such as a combination of particles or fibers of an ionically conductive material combined with another material such as a polymer, a carbonaceous material or a metallic material.

In an embodiment, a solid electrolyte is selected from the group consisting of polymer electrolytes, glass electrolytes and ceramic electrolytes. In an embodiment, the solid electrolyte is a oxide or sulfide glass electrolyte. In an embodiment, the oxide glass electrolyte is selected from LVSO and LIPON. In a further embodiment, the electrolyte is a crystalline ceramic electrolyte. in an embodiment, the crystalline ceramic electrolyte is a NASICON type electrolyte, a LISICON type electrolyte or a perovskite electrolyte.

In an embodiment, the material(s) for the solid electrolyte or electronically and ionically conductive material are selected from the group consisting of carbon, lithium titanate, $Li_2O_2$, $Li_2O$, titanium disulfide, iron phosphate, $SiO_2$, $V_2O_5$, lithium iron phosphate, $MnO_2$, $Al_2O_3$, $TiO_2$, $LiPF_6$, $Li_3P$, $Li_3N$, $LiNO_3$, $LiClO_4$, LiOH, PEO, $P_2O_5$, LIPON, LISICON, ThioLISICO, Ionic Liquids, Al, Cu, Ti, Stainless Steel, Iron, Ni, graphene oxide, PEDOT-PSS, and combinations thereof.

In additional aspects of the invention methods for operating electrochemical cells are provided, the methods relating to any of the electrochemical cells provided herein. In an embodiment, the invention provides a method of operating an electrochemical cell, the method comprising the steps of: providing said electrochemical cell as described herein and charging, discharging or charging and discharging the electrochemical cell, thereby inducing a surface charge on the surface of the electronically conductive layer.

BRIEF DESCRIPTION OF THE DRAWINGS

FIG. 13A: Top view. FIG. 13B: Cross section.

FIG. 13C: Kapton+PEO, FIG. 13D: Kapton+PEO: LiClO$_4$/90:10. FIG. 13E: Kapton+PEO: LiClO$_4$/50:50.

FIG. 13F shows an Al substrate coated with PEO, FIG. 13G shows Al+PEO: LiClO$_4$/90:10, FIG. 13H shows Al+PEO: LiClO$_4$/50:50.

FIG. 14A: Kapton+PEO; FIG. 14B: Kapton+PEO: LiClO$_4$/90:10;

FIG. 14C: Kapton+PEO: LiClO$_4$/70:30; FIG. 14D: Kapton+PEO: LiClO$_4$/50:50.

FIG. 14E: Al+PEO; FIG. 14F: Al+PEO: LiClO$_4$/90:10; FIG. 14G: Al+PEO: LiClO$_4$/70:30; FIG. 14H: Al+PEO: LiClO$_4$/50:50.

FIG. 20A. Charge cycle. FIG. 20B. Discharge cycle.

FIG. 22A: Kapton® coated with PVDF and LTO slurry. FIG. 22B: Kapton coated with PVDF, LTO, and CF slurry. FIG. 22C: Kapton coated with PVDF, and graphite slurry. FIG. 22D: Al mesh coated with PVDF and LTO slurry. FIG. 22E: Al mesh coated with PVDF, LTO and CF slurry. FIG. 22F: Al mesh coated with PVDF, and graphite slurry.

FIG. 26A: ohmic resistance, FIG. 26B: double-layer capacitance, and FIG. 26C: polarization resistance FIG. 27 Nyquist plot corresponding to FIGS. 26A-26C.

FIG. 29A: charge cycle. FIG. 29B: discharge cycle.

DETAILED DESCRIPTION

Figures 1, 2:
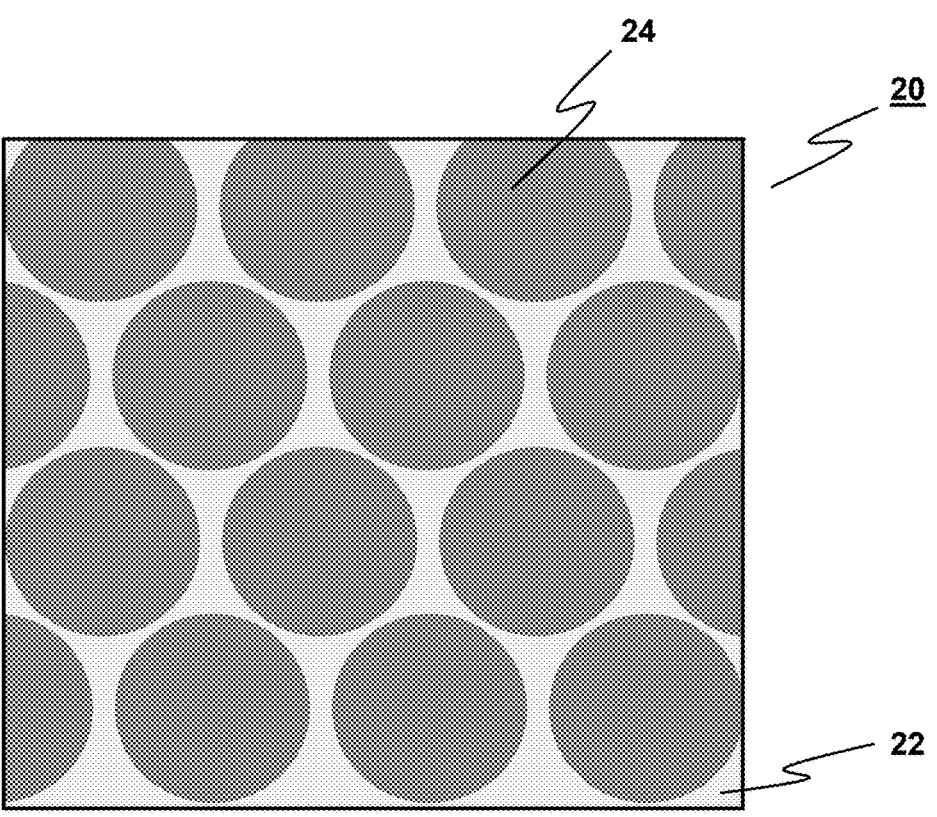
FIG. 1. Schematic illustration of layer one of an exemplary membrane, a first pattern of LISICON disks (dark gray) fills the holes in a metallic matrix (light gray). Each solid electrolyte disk can be about 10 mm. After baking, at several hundreds of degrees Celsius, a polymer coating is applied on the metallic part. The design of the first layer overcomes the brittleness, large thickness and expensive cost of ceramic-based solid electrolytes.
FIG. 2. Schematic illustration of layer two of an exemplary membrane, a second pattern of holes, each about 0.2 mm, is such that the holes of the second layer are aligned such that they have no overlap with the solid electrolyte filled holes of the first layer, offset design. The design of the second layer limits the size of the largest short, which reduces the chance of a catastrophic failure. The offset property of the two-layer design enforces a unique tortuosity such that the applied mechanical pressure may result in stopping the growth of dendrites by kinetic frustration.
Figure 3:
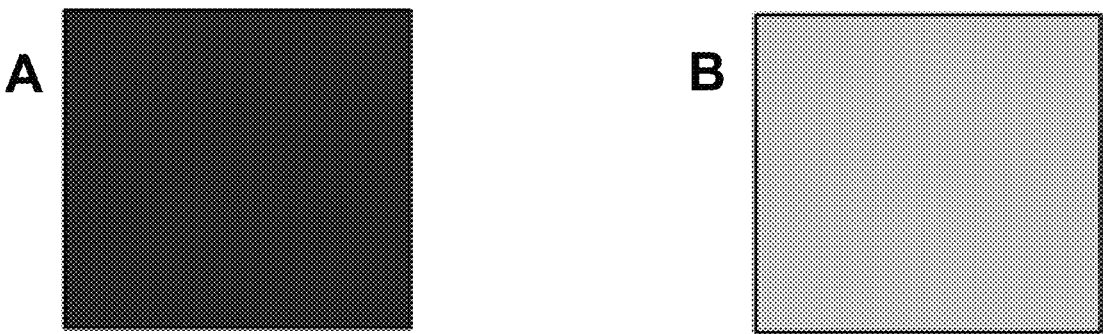
FIG. 3. Schematic illustration of two layers A and B of an exemplary membrane A) Placed next to the cathode layer: Layer one, metal frame with polymer coating (0.007 mm aluminum, stainless steel or copper and 2×0.003 mm polyimide or polyester) with about 80% porosity filled with solid electrolyte (LISICON). B) Placed next to the lithium layer: Layer two, 0.010 mm thick aluminized polymer (polyimide or polyester) with about 10% porosity filled with nonwoven or micro-porous separator and aqueous electrolyte. The two layers can be attached by a 0.002 mm porous PVDF, 80% opening.
Figure 4:
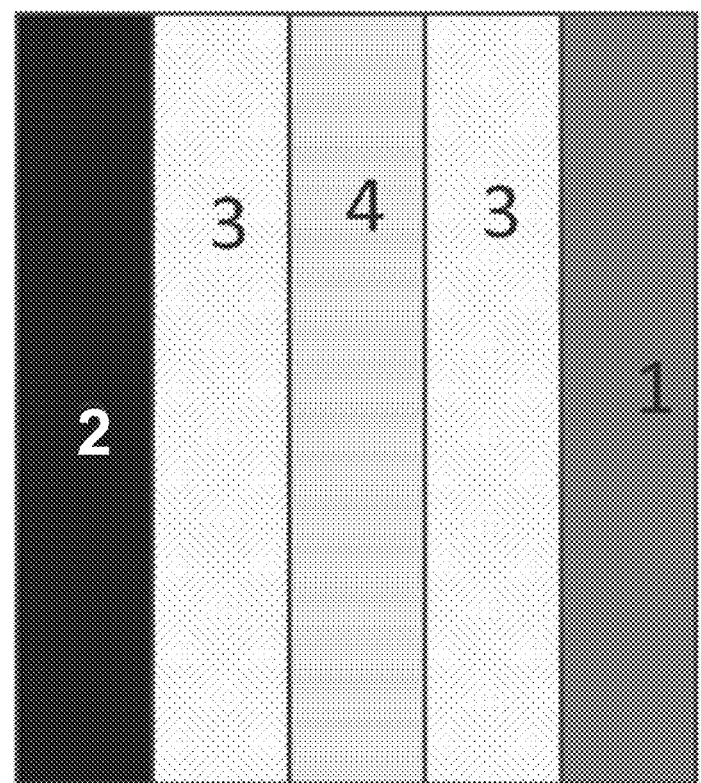
FIG. 4. Schematic illustration of a cell with four types of element: 1) Anode (e.g. Li metal in Li-ion batteries or Zn—ZnO in Zinc batteries). 2) Cathode (e.g. NMC, Sulfur, Air, LCO or LFP in Li-ion batteries or Graphite, NiOOH or Ag—AgO in Zinc batteries). 3) Separator layers, e.g., microporous or nonwoven PE, PP, PVDF, polyester or polyimides. 4) Perforated or porous conductive layer, e.g., Ni, Ti, stainless steel, Cu or Al.
Figure 5:
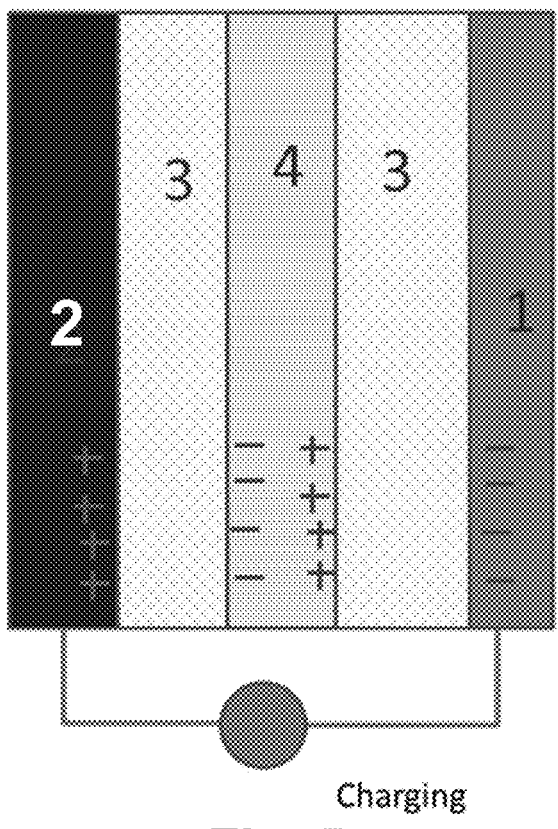
FIG. 5. Schematic illustration of another cell with four types of element 1) Anode (e.g. Li metal in Li-ion batteries of Zn—ZnO in Zinc batteries). 2) Cathode (e.g. NMC, Sulfur, Air, LCO or LFP in Li-ion batteries or Graphite, NiOOH or Ag-Ago in Zinc batteries. 3) Separator layers, e.g. microporous or nonwoven PE, PP, PVDF, polyester or polyimides. 4) Perforated or porous conductive layer, e.g., Ni, Ti, stainless steel, Cu or Al.
Figure 6:
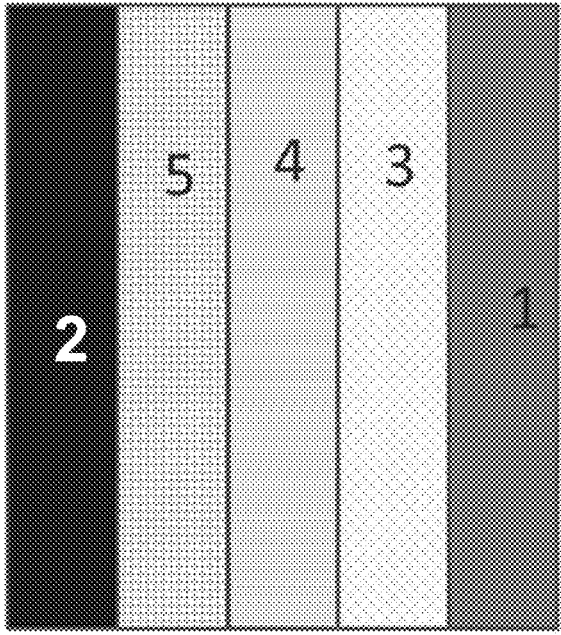
FIG. 6. Schematic illustration of a cell with five types of element 1) Anode (e.g. Li metal in Li-ion batteries of Zn—ZnO in Zinc batteries). 2) Cathode (e.g. NMC, Sulfur, Air, LCO or LFP in Li-ion batteries or Graphite, NiOOH or Ag-Ago in Zinc batteries. 3) Separator layer(s), e.g. microporous or nonwoven PE, PP, PVDF, polyester or polyimides. 4) Perforated or porous conductive layer, e.g., Ni, Ti, stainless steel, Cu or Al. 5) Solid Electrolyte layer, e.g., LISICON.
Figure 7:
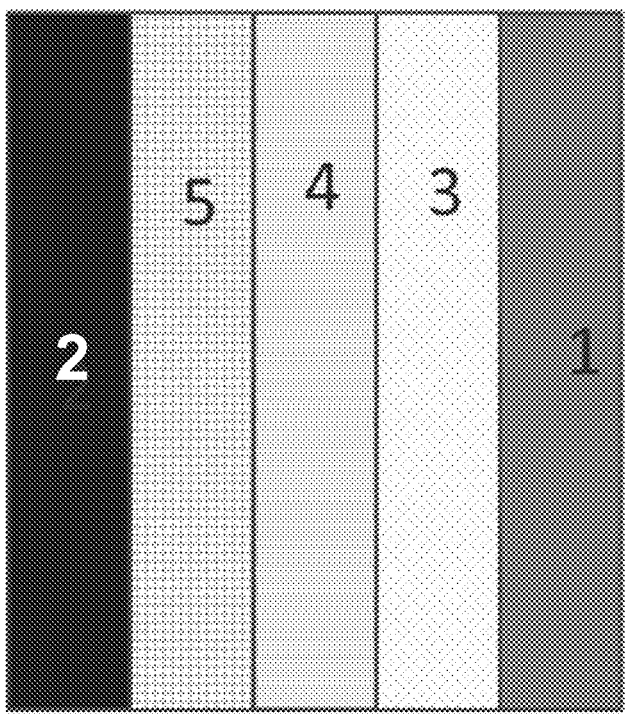
FIG. 7. Schematic illustration of another a cell with five types of element 1) Anode (e.g. Li metal in Li-ion batteries of Zn—ZnO in Zinc batteries). 2) Cathode (e.g. NMC, Sulfur, Air, LCO or LFP in Li-ion batteries or Graphite, NiOOH or Ag-Ago in Zinc batteries. 3) Separator layer(s), e.g. microporous or nonwoven PE, PP, PVDF, polyester or polyimides. 4) Perforated or porous conductive layer, e.g., Ni, Ti, stainless steel, Cu or Al. 5) Solid Electrolyte layer in a frame, e.g., LISICON in an aluminum-Polyester frame.
Figure 8:
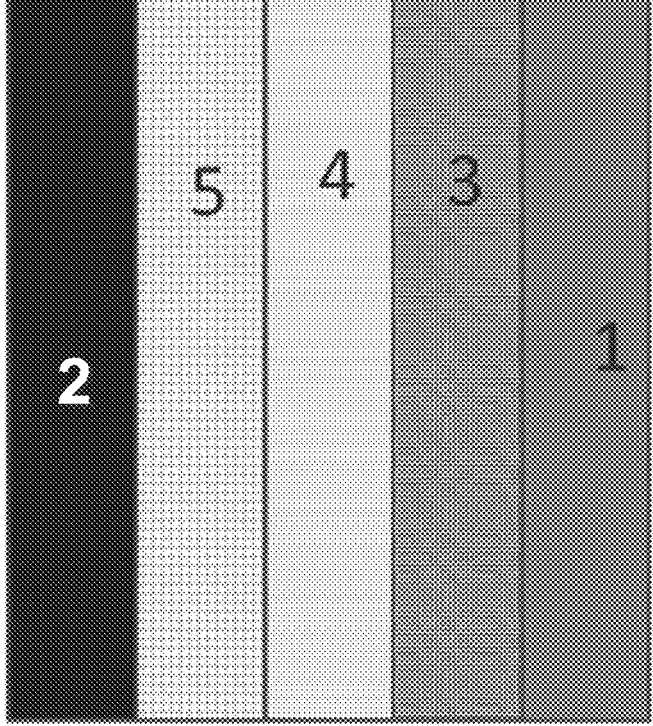
FIG. 8. Schematic illustration of an additional cell with five types of element 1) Anode (e.g. Li metal in Li-ion batteries of Zn—ZnO in Zinc batteries). 2) Cathode (e.g. NMC, Sulfur, Air, LCO or LFP in Li-ion batteries or Graphite, NiOOH or Ag-Ago in Zinc batteries. 3) Separator layers, e.g. perforated PE, PP, PVDF, polyester or polyimides with pattern A. 4) Perforated or porous conductive layer, e.g., Ni, Ti, stainless steel, Cu or Al. 5) Solid Electrolyte layer in a frame with pattern B, e.g., LISICON in an aluminum-Polyester frame.
Figure 9:
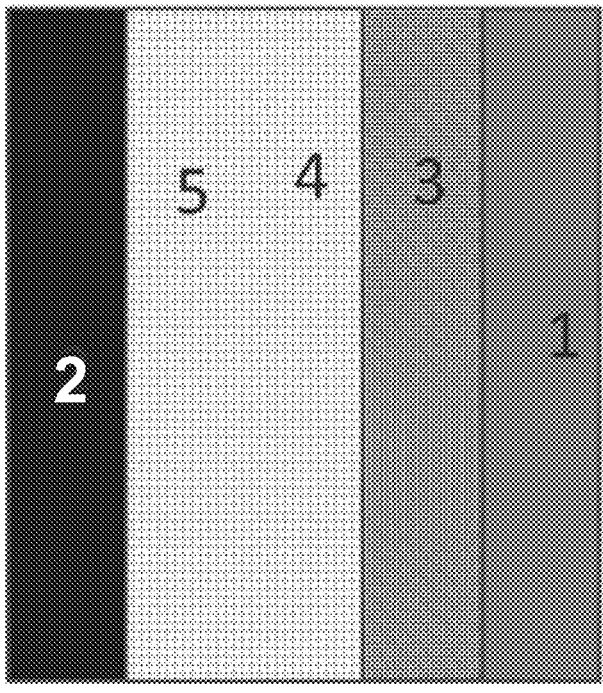
FIG. 9. Schematic illustration of a further cell with five types of element 1) Anode (e.g. Li metal in Li-ion batteries of Zn—ZnO in Zinc batteries). 2) Cathode (e.g. NMC, Sulfur, Air, LCO or LFP in Li-ion batteries or Graphite, NiOOH or Ag-Ago in Zinc batteries. 3) Separator layers, e.g. perforated PE, PP, PVDF, polyester or polyimides with pattern A. 4) Perforated or porous conductive layer with pattern B, e.g., Ni, Ti, stainless steel, Cu or Al. 5) Solid Electrolyte layer in a frame, 4, with pattern B, e.g., LISICON in an aluminum-Polyester frame.
Figure 10:
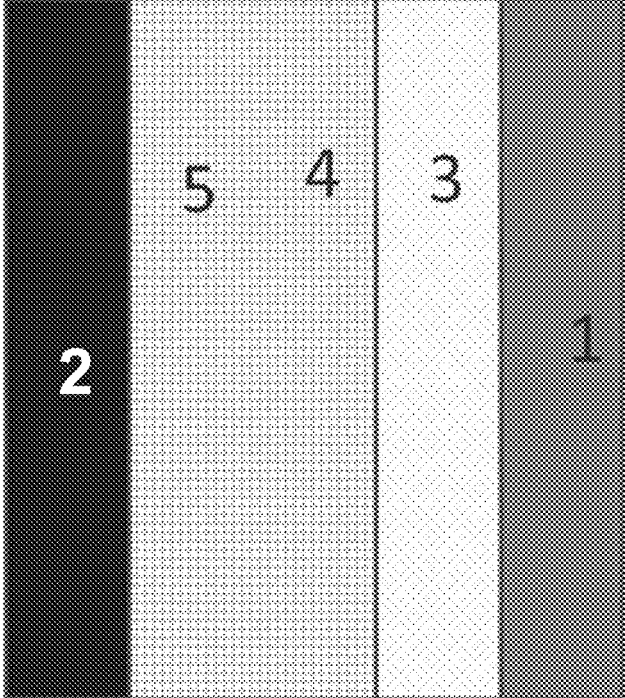
FIG. 10. Schematic illustration of another cell with five types of element 1) Anode (e.g. Li metal in Li-ion batteries of Zn—ZnO in Zinc batteries). 2) Cathode (e.g. NMC, Sulfur, Air, LCO or LFP in Li-ion batteries or Graphite, NiOOH or Ag-Ago in Zinc batteries. 3) Separator layers, e.g. microporous or nonwoven PE, PP, PVDF, polyester or polyimides. 4) Perforated or porous conductive layer, e.g., Ni, Ti, stainless steel, Cu or Al. 5) Solid Electrolyte layer in a frame, 4, e.g., LISICON in an aluminum-Polyester frame.
Figure 11:
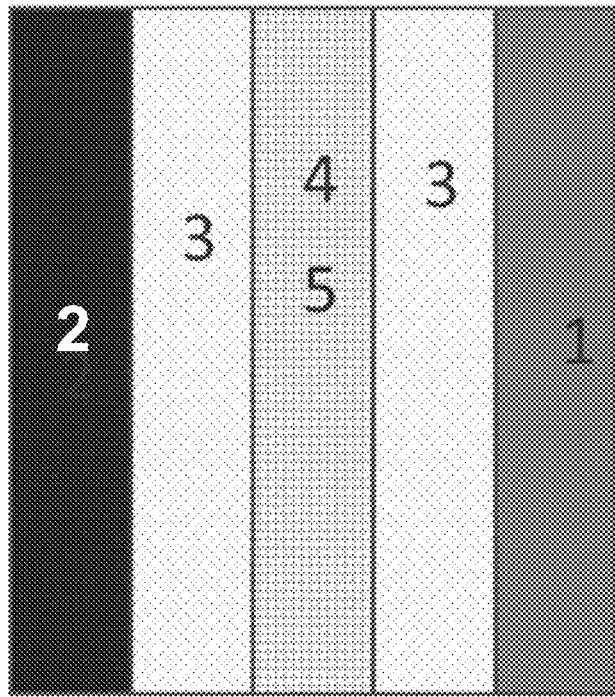
FIG. 11. Schematic illustration of an additional further cell with five types of element 1) Anode (e.g. Li metal in Li-ion batteries of Zn—ZnO in Zinc batteries). 2) Cathode (e.g. NMC, Sulfur, Air, LCO or LFP in Li-ion batteries or Graphite, NiOOH or Ag-Ago in Zinc batteries. 3) Separator layers, e.g. microporous or nonwoven PE, PP, PVDF, polyester or polyimides. 4) Perforated or porous conductive layer, e.g., Ni, Ti, stainless steel, Cu or Al. 5) Solid Electrolyte layer in a frame, 4; e.g., LISICON in an aluminum-Polyester frame.
Figure 12:
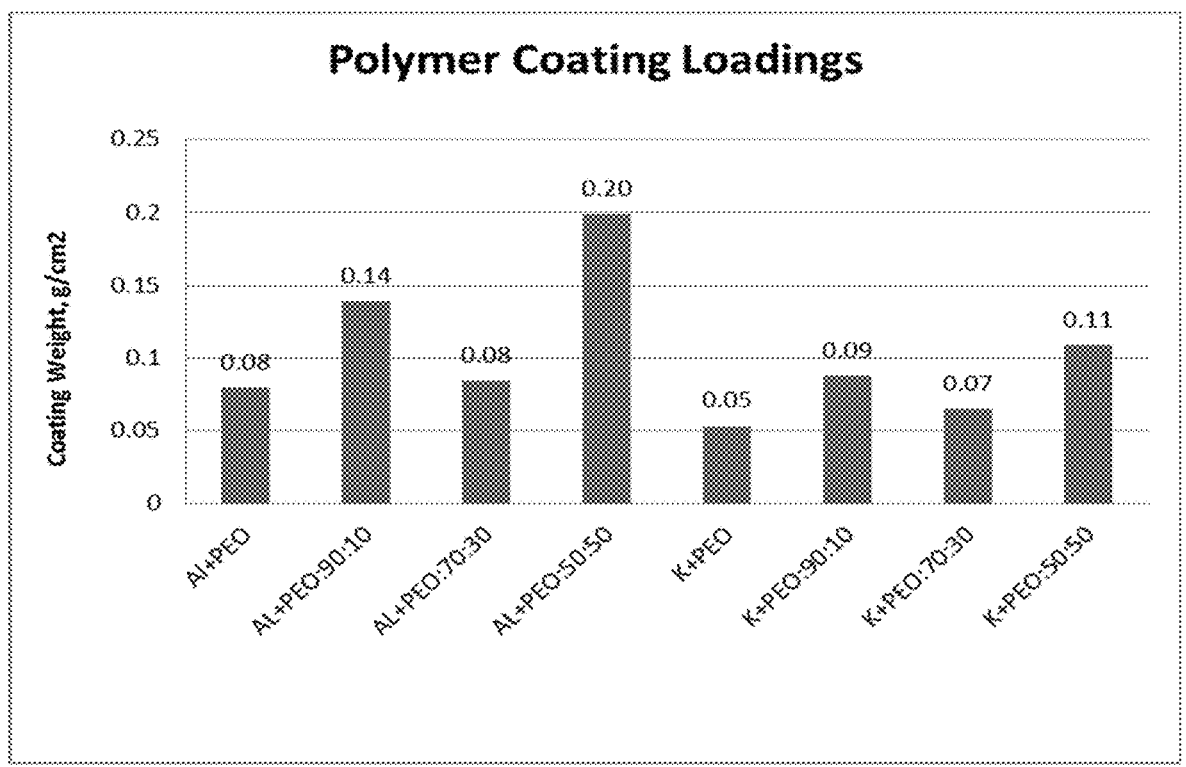
FIG. 12: Coating weights of polymer electrolyte coated per unit area of substrate, see Example 3.

In general the terms and phrases used herein have their art-recognized meaning, which can be found by reference to standard texts, journal references and contexts known to those skilled in the art. The following definitions are provided to clarify their specific use in the context of the invention.

Referring to the drawings, like numerals indicate like elements and the same number appearing in more than one drawing refers to the same element. In addition, hereinafter, the following definitions apply:

The term "electrochemical cell" refers to devices and/or device components that convert chemical energy into electrical energy or electrical energy into chemical energy. Electrochemical cells have two or more electrodes (e.g., positive and negative electrodes) and an electrolyte, wherein electrode reactions occurring at the electrode surfaces result in charge transfer processes. Electrochemical cells include, but are not limited to, primary batteries, secondary batteries and electrolysis systems. In certain embodiments, the term electrochemical cell includes fuel cells, supercapacitors, capacitors, flow batteries, metal-air batteries and semi-solid batteries. General cell and/or battery construction is known in the art, see e.g., U.S. Pat. Nos. 6,489,055, 4,052,539, 6,306,540, Seel and Dahn J. Electrochem. Soc. 147(3) 892-898 (2000).

The term "capacity" is a characteristic of an electrochemical cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight. Specific capacity is typically expressed in units of ampere-hours $kg^{-1}$.

The term "discharge rate" refers to the current at which an electrochemical cell is discharged. Discharge rate can be expressed in units of ampere. Alternatively, discharge rate can be normalized to the rated capacity of the electrochemical cell, and expressed as C/(X t), wherein C is the capacity of the electrochemical cell, X is a variable and t is a specified unit of time, as used herein, equal to 1 hour.

"Current density" refers to the current flowing per unit electrode area.

Electrode refers to an electrical conductor where ions and electrons are exchanged with electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species. Positive electrodes and negative electrodes of the present electrochemical cell may further comprise a conductive diluent, such as acetylene black, carbon black, powdered graphite, coke, carbon fiber, graphene, and metallic powder, and/or may further comprises a binder, such as a polymer binder. Useful binders for positive electrodes in some embodiments comprise a fluoropolymer such as polyvinylidene fluoride (PVDF). Positive and negative electrodes of the present invention may be provided in a range of useful configurations and form factors as known in the art of electrochemistry and battery science, including thin electrode designs, such as thin film electrode configurations. Electrodes are manufactured as disclosed herein and as known in the art, including as disclosed in, for example, U.S. Pat. Nos. 4,052,539, 6,306,540, and 6,852,446. For some embodiments, the electrode is typically fabricated by depositing a slurry of the electrode material, an electronically conductive inert material, the binder, and a liquid carrier on the electrode current collector, and then evaporating the carrier to leave a coherent mass in electrical contact with the current collector.

"Electrode potential" refers to a voltage, usually measured against a reference electrode, due to the presence within or in contact with the electrode of chemical species at different oxidation (valence) states.

"Electrolyte" refers to an ionic conductor which can be in the solid state, the liquid state (most common) or more rarely a gas (e.g., plasma).

"Standard electrode potential" (E°) refers to the electrode potential when concentrations of solutes are 1M, the gas pressures are 1 atm and the temperature is 25 degrees Celsius. As used herein standard electrode potentials are measured relative to a standard hydrogen electrode.

"Active material" refers to the material in an electrode that takes part in electrochemical reactions which store and/or deliver energy in an electrochemical cell.

"Cation" refers to a positively charged ion, and "anion" refers to a negatively charged ion.

"Electrical contact," "electrical communication", "electronic contact" and "electronic communication" refer to the arrangement of one or more objects such that an electric current efficiently flows from one object to another. For example, in some embodiments, two objects having an electrical resistance between them less than 100 are considered in electrical communication with one another. An electrical contact can also refer to a component of a device or object used for establishing electrical communication with external devices or circuits, for example an electrical interconnection. "Electrical communication" also refers to the ability of two or more materials and/or structures that are capable of transferring charge between them, such as in the form of the transfer of electrons. In some embodiments, components in electrical communication are in direct electrical communication wherein an electronic signal or charge carrier is directly transferred from one component to another. In some embodiments, components in electrical communication are in indirect electrical communication wherein an electronic signal or charge carrier is indirectly transferred from one component to another via one or more intermediate structures, such as circuit elements, separating the components.

"Electrical conductivity" or "electrically conductive" refers to transfer of charges which can be ionic (ions) or electronic (electrons). "Electronic conductivity" or "electronically conductive" refers to transfer of charges which are electronic (electrons). "Ionic conductivity" or "ionically conductive" refers to transport of ionic charge carriers.

"Thermal contact" and "thermal communication" are used synonymously and refer to an orientation or position of elements or materials, such as a current collector or heat transfer rod and a heat sink or a heat source, such that there is more efficient transfer of heat between the two elements than if they were thermally isolated or thermally insulated. Elements or materials may be considered in thermal communication or contact if heat is transported between them more quickly than if they were thermally isolated or thermally insulated. Two elements in thermal communication or contact may reach thermal equilibrium or thermal steady state and in some embodiments may be considered to be constantly at thermal equilibrium or thermal steady state with one another. In some embodiments, elements in thermal communication with one another are separated from each other by a thermally conductive material or intermediate thermally conductive material or device component. In some embodiments, elements in thermal communication with one another are separated by a distance of 1 μm or less. In some embodiments, elements in thermal communication with one another are provided in physical contact.

"Chemically resistant" refers a property of components, such as layers, of separators and electrochemical systems of the invention wherein there is no significant chemical or electrochemical reactions with the cell active materials, such as electrodes and electrolytes. In certain embodiments, chemically resistant also refers to a property wherein the tensile retention and elongation retention is at least 90% in the working environment of an electrochemical system, such as an electrochemical cell.

"Thermally stable" refers a property of components, such as layers, of separators and electrochemical systems of the invention wherein there is no significant chemical or electrochemical reactions due to normal and operational thermal behavior of the cell. In certain embodiments, thermally stable also refers to materials wherein the melting point is more than 100 Celsius, and preferably for some embodiments more than 300 Celsius, and optionally the coefficient of thermal expansion is less than 50 ppm/Celsius. In an embodiment, thermally stable refers to a property of a component of the separator system such that it may perform in a rechargeable electrochemical cell without undergoing a change size or shape with the temperature that significantly degrades the performance of the electrochemical cell.

"Porosity" refers to the amount of a material or component that corresponds to pores, such as apertures, channels, voids, etc. Porosity may be expressed as the percentage of the volume of a material, structure or device component, such as a high mechanical strength layer, that corresponds to pores, such as apertures, channels, voids, etc., relative to the total volume occupied by the material, structure or device component.

High mechanical strength" refers to a property of components of separator systems of the invention, such as first, second, third and fourth high mechanical strength layers, having a mechanical strength sufficient to prevent physical contact of opposite electrodes, sufficient to prevent short circuiting due to external objects within the cell, such as metallic particles from fabrication, and sufficient to prevent short circuiting due to growth of dendrites between positive and negative electrodes of an electrochemical cell, for example, during charge and discharge cycles of a secondary electrochemical cell. In an embodiment, for example, a high mechanical strength layer has a mechanical strength sufficient to prevent piercing due to external objects in the cell, such as metallic particles from the fabrication, and shorts due to the growth of dendrites between electrodes. In an embodiment, for example, a high mechanical strength layer has a mechanical strength sufficient to prevent shorting between the positive electrode and the negative electrode of an electrochemical cell due to external objects in the cell such as metallic particles from the fabrication and shorts due to the growth of dendrites between electrodes. In an embodiment, for example, a high mechanical strength layer is characterized by a Young's modulus greater than or equal to 500 MPa, and optionally for some applications a Young's modulus greater than or equal to 1 GPa, and optionally for some applications a Young's modulus greater than or equal to 10 GPa, and optionally for some applications a Young's modulus greater than or equal to 100 GPa. In an embodiment, for example, a high mechanical strength layer is characterized by a yield strength greater than or equal to 5 MPa, and optionally for some applications a yield strength greater than or equal to 50 MPa, and optionally for some applications a yield strength greater than or equal to 100 MPa, and optionally for some applications a yield strength greater than or equal to 500 MPa. In an embodiment, for example, a high mechanical strength layer is characterized by a propagating tear strength greater than or equal to 0.005 N, and optionally for some applications a propagating tear strength greater than or equal to 0.05 N, a propagating tear strength greater than or equal to 0.5 N, a propagating tear strength greater than or equal to 1 N. In an embodiment, for example, a high mechanical strength layer is characterized by an initiating tear strength greater than or equal to 10 N, and optionally for some applications an initiating tear strength greater than or equal to 100 N. In an embodiment, for example, a high mechanical strength layer is characterized by a tensile strength greater than or equal to 50 MPa, and optionally for some applications a tensile strength greater than or equal to 100 MPa, and optionally for some applications a tensile strength greater than or equal to 500 MPa, and optionally for some applications a tensile strength greater than or equal to 1 GPa. In an embodiment, for example, a high mechanical strength layer is characterized by an impact strength greater than or equal to 10 N cm, and optionally for some applications to an impact strength greater than or equal to 50 N cm, and optionally for some applications to an impact strength greater than or equal to 100 N cm, and optionally for some applications to an impact strength greater than or equal to 500 N cm.

Electrochemical Cell.

In an embodiment, the electrochemical cell is a secondary (rechargeable) electrochemical cell. In another embodiment, the electrochemical cell is a primary electrochemical cell. In embodiments, the electrochemical cell is a primary battery, a secondary battery, a fuel cell or a flow battery, a lithium battery, a lithium ion battery, a zinc anode-based battery, a nickel cathode-based battery, a semi-solid battery or a lead-acid-based battery. In additional embodiments, the electrochemical cell is a Li—S, Li-Air, Li—LiFePO$_4$, or Zn—Ni electrochemical cell. In further embodiments the cell is Mg based or Na based.

Negative Electrode

In an embodiment where the cell is a lithium ion cell, the active material of the negative electrode is lithium metal, a lithium alloy, silicon, a silicon alloy, silicon-graphite or graphite. In a further embodiment, active materials suitable for use in the negative electrode of a lithium-ion cell include, but are not limited to carbonaceous material, lithium titanate (LTO) and titanium dioxide (TiO$_2$). Carbonaceous materials include, but are not limited to natural graphite, highly ordered pyrolytic graphite (HOPG), Meso Carbon Micro-beads (MCMB) and carbon fiber.

In an embodiment where the cell is a zinc cell, the anode material is Zn metal, ZnO or Zn—ZnO. In an embodiment, the negative electrode comprises an active material in electronic communication with a current collector. In an embodiment, the current collector comprises an external connection tab; in an embodiment the external connection tab is integral with the current collector. In an embodiment, the current collector is an electronically conductive material such as a metal.

Positive Electrode

In embodiments where the cell is a lithium ion cell, the active material of the positive electrode is NMC (lithium nickel-manganese-cobalt oxide), sulfur, sulfur-carbon, carbon-air, LCO (lithium cobalt oxide, LiCoO$_2$) or LFP (lithium iron phosphate, LiFePO$_4$). In a further embodiment, active materials suitable for use in the positive electrode of a lithium-ion cell include, but are not limited to Lithium Cobalt (LiCoO$_2$), Lithium Manganese Oxide (LiMn$_2$O$_4$), Lithium Iron Phosphate (LiFePO$_4$), Lithium Nickel Cobalt Aluminum Oxide (LiNi$_{0.8}$CO$_{0.15}$Al$_{0.05}$O$_2$) and Lithium Nickel manganese Cobalt Oxide (LiNi$_{0.33}$Mn$_{0.33}$Co$_{0.33}$O$_2$). Alternate materials include titanium disulfide (TiS$_2$).

In embodiments where the cell is a zinc battery, the cathode material is graphite, NiOOH, Ag, or AgO. In an embodiment, the positive electrode comprises an active material in electronic communication with a current collector. In an embodiment, the current collector comprises an external connection tab; in an embodiment the external connection tab is integral with the current collector. In an embodiment, the current collector is an electronically conductive material such as a metal.

In embodiment, the positive electrode may be an oxygen electrode or an air electrode. During discharge of the cell, hydroxide ions are generated through dissociation of oxygen and water at the surface of the oxygen or air electrode. During recharging of the cell, water dissociates to hydroxide and oxygen at the air or oxygen electrode. U.S. Pat. No. 6,221,523 is hereby incorporated by reference for its description of oxygen and air electrodes and catalyst deposition methods.

Catalysts suitable for use with the positive electrode include metals, metal alloys, metal oxides and metal complexes. In an embodiment, a single catalyst is suitable for both reduction of oxygen (during discharge) and evolution of oxygen (during charging). Such a catalyst may be termed a bifunctional catalyst. Bifunctional catalysts known to the art include noble metal thin films, perovskites, and a spinel oxides. Perovskite-type oxides include transition metal oxides represented by the general composition formula ABO$_3$. One class of perovskite-type oxide is LaCoO$_3$, partial substitution products in which La is partially substituted by one or more of Ca, Sr or Ba, partial substitution products in which Co is partially substituted by one or more Mn, Ni, Cu, Fe, Ir, and substitution products in which both La and Co are partially substituted.

Electrolyte

In embodiments, the electrolyte is a liquid electrolyte, gel electrolyte, polymer electrolyte or ceramic electrolyte. In embodiments, the electrolyte is aqueous or nonaqueous. When the electrochemical cell is a lithium ion battery, the electrolyte is preferably nonaqueous. In an embodiment, the electrolyte comprises one or more lithium salts dissolved in a nonaqueous solvent.

Solid Electrolyte

In an embodiment, the solid electrolyte can be a free standing layer or a coating layer. In another embodiment, the solid electrolyte is in the form of particles or fibers filling the holes-pores of an electronically insulating layer or the electronically conductive layer. In an embodiment, a layer is provided comprising at least a porous layer of electronically conductive material and at least a group of fibers or particles filling the pores or holes of the porous layer. A variety of solid electrolytes are known to the art and include, but are not limited to LISICON (Lithium super ionic conductor, Li$_{2+2x}$Zn$_{1-x}$GeO$_4$), PEO (polyethylene oxide), NASICON, and LIPON.

Optionally, the first ionically conductive and electronically insulating material comprises a solid electrolyte, a gel electrolyte, a polymer electrolyte, LISICON, NASICON, PEO, Li$_{10}$GeP$_2$S$_{12}$, LIPON, PVDF, Li$_3$N, Li$_3$P, LiI, LiBr, LiCl, LiF, oxide perovskite, La$_{0.5}$Li$_{0.5}$TiO$_3$, thio-LISICON, Li$_{3.25}$Ge$_{0.25}$P$_{0.75}$S$_4$, glass ceramics, Li$_7$P$_3$S$_{11}$, glassy materials, Li$_2$S—SiS$_2$—Li$_3$PO$_4$, lithium nitride, polyethylene oxide, Doped Li$_3$N, Li$_2$S—SiS$_2$—Li$_3$PO$_4$, LIPON, Li$_{14}$Zn (GeO$_4$)$_4$, Li-beta-alumina, Li$_{3.6}$Si$_{0.6}$P$_{0.4}$O$_4$, Li$_2$S—P$_2$S$_5$, PEO-LiClO$_4$, LiN(CF$_3$SO$_2$)$_2$/(CH$_2$CH$_2$O)$_8$, NaPON, ZrO$_2$, Nafion, PEDOT:PSS, SiO$_2$, PVC, glass fiber mat, alumina, silica glass, ceramics, glass-ceramics, water-stable polymers, glassy metal ion conductors, amorphous metal ion conductors, ceramic active metal ion conductors, glass-ceramic active metal ion conductors, an ion conducting ceramic, an ion conducting solid solution, an ion conducting glass, a solid lithium ion conductor or any combination of these.

In an embodiment, the solid electrolyte is a polymer electrolyte. In an embodiment, polymer electrolyte is a polyelectrolyte comprising ionic groups. In an embodiment, the polyelectrolyte is an ionomer. In an embodiment, an ionomer is a copolymer comprising nonionic repeat units and ion containing repeat units. In an embodiment, the ionic groups located upon nonpolar backbone chains. In an embodiment, the amount of ionic groups is 1 mol % to 15 mol %. In an embodiment, the polymer electrolyte comprises a polymer complexed with an alkali metal salt. Polymer electrolytes known to the art include, but are not limited to, poly(ethylene) oxide (PEO), poly(acrylonitrile) (PAN), poly(methyl methacrylate) (PMMA), poly(vinylidene fluoride) (PVdF) and poly(vinylidene fluoride-hexafluoro propylene) (PVdF-HFP). Lithium salts used in for forming complexes include LiBr, LiI, LiCl, LiSCN, LiClO$_4$, LiCF$_3$SO$_3$, LiBF$_4$ and LiAsF$_6$.

In an embodiment, the solid electrolyte is a gelled or wet polymer. The gelled polymer may further comprise an organic liquid solvent and an alkali metal salt. The polymer host may comprise poly(ethylene) oxide (PEO), poly(acrylonitrile) (PAN), poly(methyl methacrylate) (PMMA), poly (vinylidene fluoride) (PVdF) and poly(vinylidene fluoride-hexafluoro propylene) (PVdF-HFP). Solvents include, but are not limited to ethylene carbonate, propylene carbonate, dimethyl formamide, diethyl phthalate, diethyl carbonate, methyletyl carbonate, dimethyl carbonate, γ-butyrolactone, glycol sulfite and alkyl phthalates.

In a further embodiment, the solid-state ionically conductive material is supported by a frame or porous support. In an embodiment, the frame or support is made of an electronically insulating material or of an electronically conducting material surface coated with an electronically insulating material. In an embodiment, the support is porous or perforated and the holes or pores at least partially filled by particles or fibers of the solid-state ionically conductive material. Suitable active materials include, but are not limited to, traditional electrode active materials such as $LiTiO_2$, silicon or graphite. In an embodiment, application of a voltage or current between the electronically conducting layer and one of the electrodes results in gain and release of ions by the fibers or particles, such that ionic charge carriers are able to be transported between said positive electrode and said negative electrode through the pores or holes of the electronically conducting layer. For example, a pulse or sinusoidal voltage between 1 and 2.5 V may be applied between a graphite anode and a layer comprising LiTiO2 fibers inside a copper matrix in a Li-ion cell with a cathode such as air or sulfur.

In an embodiment, the solid-state ionically conducting material is provided in the form of pellets inserted in the frame such as a metallic frame. In an embodiment, the pellets are bonded to the frame through solid state methods. In a further embodiment, binders (such as polymeric binders) and/or cements such as (silica, alumina or iron oxide). Additional surface coatings may be applied to overcome interfacial resistance between the supported solid-state ionically conducting material and the electrode.

In another embodiment, the solid-state ionically conductive material is provided as a composite of particles of the ionically conductive material with binder. As examples, the amount of binder is from 5% to 35%, 5%-25%, 5%-20%, 5%-15% or 5%-10% (wt %). In a further embodiment, electronically conductive particles may be included in the composite. As an example, the amount of electronically conductive particles is from 5 wt % to 10 wt %. In an additional embodiment, particles of an electronically insulating material such as alumina are included in the composite. For example, the amount of alumina is from 5 wt % to 15 wt %. The composite material may form a porous layer; in embodiments the amount of porosity is from 20-60-% or from 40-60% (vol %). The solid-state ionically conductive material may comprise an conventional solid electrolyte, an electrochemically active ion-conductive material or a combination thereof. In an embodiment, the amount of electrochemically active ion-conductive material in this mixture is from 5% to 20% or 5% to 10% (wt %).

Insulator

In embodiments, the electronically insulating layer comprises a polymer, an oxide, a glass or a combination of these. In embodiments, the electronically insulating is nonwoven or a woven. In an embodiment, the insulating layer is polymeric such as microporous or nonwoven PE, PP, PVDF, polyester or polyimide. In a further embodiment the insulating layer is an oxide such as aluminum oxide. In an embodiment, said electronically insulating comprises a coating provided on at least one side of said electronically conductive layer. As an example, an aluminum oxide layer is provided on an aluminum layer. In an embodiment, the electronically insulating comprises one or more perforated or porous layers each independently having a porosity greater than or equal to 30%, from 30% to 80% or from 50% to 75%. In an embodiment, one or more perforated or porous layers each independently have a thickness selected over the range of 20 nm to 1 mm, 0.005 mm to 1 mm, from 1 μm to 500 μm or from 5 μm to 100 μm. In an embodiment, the separator comprises a first insulating layer having a plurality of apertures arranged in a first pattern and a second insulating layer having a plurality of apertures arranged in a second pattern; wherein said second pattern has an off-set alignment relative to said first pattern such that an overlap of said apertures of said first insulating layer and said apertures of said second insulating layer along axes extending perpendicularly from said first insulating layer to said second insulating layer is less than or equal to 20% In an embodiment, there is no overlap of the apertures.

Ionically Conductive Layer

In an embodiment, for example, a layer permeable to ionic charge carriers has an ionic resistance less than or equal to 20 ohm-cm$^2$, and preferably for some embodiments less than or equal to 2 ohm-cm$^2$, and preferably for some embodiments less than or equal to 1 ohm-cm$^2$.

In an embodiment, the electronically and ionically conducting material or a material to be included in an a combination to produce an electronically and ionically conducting material mixture is selected from the group consisting of carbon, lithium titanate, $Li_2O_2$, $Li_2O$, titanium disulfide, iron phosphate, $SiO_2$, $V_2O_5$, lithium iron phosphate, $MnO_2$, $Al_2O_3$, $TiO_2$, $LiPF_6$, $Li_3P$, $Li_3N$, $LiNO_3$, $LiClO_4$, LiF, LiOH, poly(ethylene oxide) (PEO), $P_2O_5$, LIPON, LISICON, ThioLISICO, an ionic liquid, Al, Cu, Ti, Stainless Steel, Iron, Ni, Poly(3,4-ethylenedioxythiophene)-poly(styrenesulfonate) (PEDOT-PSS), graphene oxide and combinations thereof. In a further embodiment, an electrolyte material or a material to be included in a combination to produce an electrolyte wherein the materials for the said electronically and ionically conductive material are selected from the group consisting of carbon, lithium titanate, $Li_2O_2$, $Li_2O$, titanium disulfide, iron phosphate, $SiO_2$, $V_2O_5$, lithium iron phosphate, $MnO_2$, $Al_2O_3$, $TiO_2$, $LiPF_6$, $Li_3P$, $Li_3N$, $LiNO_3$, $LiClO_4$, LiOH, PEO, $P_2O_5$, LIPON, LISICON, ThioLISICO, an ionic liquids, Al, Cu, Ti, Stainless Steel, Iron, Ni, graphene oxide, PEDOT-PSS, and combinations thereof.

Optionally, an ionically conductive and electronically insulating material has an ionic conductivity greater than or equal to $10^{-5}$ S/cm, greater than or equal to $10^{-4}$ S/cm, greater than or equal to $10^{-4}$ S/cm, greater than or equal to $10^{-3}$ S/cm, greater than or equal to $10^{-2}$ S/cm, greater than or equal to $10^{-1}$ S/cm, greater than or equal to 10 S/cm, selected from the range of $10^{-7}$ S/cm to 100 S/cm, selected from the range of $10^{-5}$ S/cm to 10 S/cm, selected from the range of $10^{-3}$ S/cm to 1 S/cm. Optionally, the first ionically conductive and electronically insulating material has an ionic conductivity selected from the range of $10^{-7}$ S/cm to 100 S/cm at an operating temperature of the cell.

Optionally, the above-mentioned first ionically conductive and electronically insulating material has an average porosity less than 1%. Preferably, the first ionically conductive and electronically insulating material is non-porous. Optionally, the first ionically conductive and electronically insulating material has an average porosity selected from the range of 0% to 5%. Optionally, the first ionically conductive and electronically insulating material is substantially free of pinholes, cracks, holes or any combination of these. Optionally, the first ionically conductive and electronically insulating material is substantially free of defects. Optionally, the first ionically conductive and electronically insulating material is doped.

In an embodiment, the electronically insulating layers and the electronically conducting layers each independently have an average thickness selected over the range 25 nm to 1 mm, optionally for some applications selected over the range 25 nm to 15 µm, and optionally for some applications selected over the range of 1 µm to 100 µm, and optionally for some applications selected over the range of 5 µm to 1 mm. In an embodiment, for example, any of, and optionally all of, electronically insulating layers and the electronically conducting layers each independently have an average thickness selected over the range 10 nm to 2 µm or selected over the range 2 µm to 50 µm.

Electronically Conductive Layer

In embodiments, said electronically conductive layer comprises a chemically resistant material, a heat resistant material, a mechanically resistant material or any combination of these. In an embodiment, the conductive layer comprises a metal, alloy, carbon or a conductive polymer. In an embodiment, the electronically conductive layer comprises a metal foil, a metallic thin film, an electronically conductive polymer, a carbonaceous material or a composite material of any of these. In an embodiment, the metal or alloy is selected from Al, Cu, Ti, Ni, Fe, stainless steel, Sn, Si, Au, Pt, Ag, Mn, Pb and their alloys and Zircalloy, Hastalloy, and superalloys. In an embodiment, the electronically conductive layer comprises a metal selected from the group consisting of Al, Ti, Cu, stainless steel, Ni, Fe, or any alloys or composites thereof. In an embodiment, the carbonaceous material is selected from conductive carbon, super-P, carbon black and activated carbon. In an embodiment, the electronically conducting polymer is selected from the linear-backbone "polymer blacks" (polyacetylene, polypyrrole, and polyaniline) and their copolymers, poly(p-phenylene vinylene) (PPV) and its soluble derivatives and poly(3-alkylthiophenes). In an embodiment, the electronically conducting layer does not react chemically or electrochemically with the electrolyte. In an embodiment, electronically conductive layer comprises a metal reactive with an active material of the negative or positive electrode. In an embodiment, the electronically conductive layer comprises a metal selected from the group consisting of Al and Sn. In an embodiments, the thickness of the electronically conductive layer is greater than zero and less than 1 mm, greater than zero and less than 0.1 mm, from 0.001 mm to 1 mm, from 0.005 mm to 1 mm, from 0.005 mm to 0.5 mm, from 0.01 mm to 0.1 mm, from 0.075 mm to 0.2 mm or from of 25 nm to 0.5 mm. In an embodiment, the composite separator further comprises one or more additional electronically conductive layers.

Fabrication of composite membranes may include bonding of different membrane layers. In an embodiment, a polymeric binder is used.

In an embodiment, a multi-layer battery separator with at least one conductive layer is used to prolong the cycle life and safety enhancement of the cell. The conductive layer may have an external tab that can be used for monitoring the cell or be used to "control" the cell. The conductive layer prolongs the cycle life of the battery by one or more mechanisms. In the case with no auxiliary external tab: a) as a free standing physical barrier, stronger than conventional PP-PP separators, which limits the size of a short to the size of the pores of the conductive layer (an example is a 0.007 mm stainless steel or copper perforated film) and b) as a chemical reactive material to the short material, such that the reaction between the conductive layer and the short results in energy consumption and may stop or remove the short (an example is a 0.007 mm aluminum film or a 0.001 mm aluminum coating on one side of a porous polymer film, such as microporous PP-PP). When an external tab electronically connects the conductive layer to outside of the cell additional mechanisms include using the external to c) monitor the voltage between any of the electrodes and the conductive layer or d) apply a voltage or current between any of the electrodes and the conductive layer. Mechanism d) includes the mechanism of d1) burning the short, d2) activating solid electrolyte and d3) activating alloying with dendrite and d4) releasing other substances in the cell.

In an embodiment, the electronically conductive and chemically reactive layer reacts with a dendrite growing from the negative electrode. In an embodiment, the material of the electronically conductive and chemically reactive layer forms an alloy with the dendrite material. In an embodiment where lithium dendrite structures form at the negative electrode, the electronically conductive and chemically reactive layer comprises at least one of Al, Ti, Ni, Fe, conductive carbon, Super-P carbon, carbon black, Kenjen, stainless steel, Sn or Si. When Li+ is one of the ionic charge carriers, the electrolyte may be nonaqueous. In an embodiment where zinc dendrite structures form at the negative electrode, the electronically conductive and chemically reactive layer comprises a metallic layer.

In an aspect, the disclosure provides a multi-layer battery separator with at least one conductive layer to prolong the cycle life and safety enhancement of the cell. The conductive layer may have an external tab that can be used for monitoring the cell or be used to "control" the cell. The conductive layer prolongs the cycle life of the battery by different mechanisms. In the case where the conductive layer does not include an auxiliary external tab the conductive layer may prolong by cycle life by one or all of the following mechanisms: a) as a free standing physical barrier, stronger than conventional PP-PP separators, which limits the size of a short to the size of the pores of the conductive layer (an example is a 0.007 mm thick stainless steel or copper perforated film) and b) as a chemically reactive material to the short material, such that the reaction between the conductive layer and the short results in energy consumption and may stop or remove the short (an example is a 0.007 mm aluminum film or a 0.001 mm aluminum coating on one side of a porous polymer film, such as microporous PP-PP). When an external tab electronically connects the conductive layer to outside of the cell additional mechanisms include c) use of the external tab to monitor the voltage between any of the electrodes and the conductive layer and d) use of the external tab to apply a voltage or current between any of the electrodes and the conductive layer. Mechanism d) includes the mechanisms of d1) burning the short, d2) activating a solid electrolyte, d3) activating alloying with dendrite and d4) releasing other substances in the cell.

Safer batteries: Overvoltage protection and Safe-short separators and electrochemical cells implementing them: multilayer separators made of materials that upon electronic contact with an electrode result in an observable change in the voltage. An electronic short between the opposite electrodes can be very dangerous, the suggested separators can not only give an early warning to the user before any catastrophic failure but can also reduce the severity of a battery failure. An example is an electrochemical cell with multilayer separators such that at least one of the separator layers is made of a metal (e.g. aluminum, titanium, copper, stainless steel, nickel, iron) or alloy or an electronically conductive material such as electronically conductive polymers for example such that the short can results in ion deposition on at least a part of the said separator. The said layer(s) can be porous or perforated to allow the passage of ions with the assistance of any electrolytes. The said separator can further have electronically insulating layers or coatings such that there is no electronic connection between the opposite electrodes inside the cell when separated with the said separator. Any internal electronic connection between the opposite electrodes e.g., due to external or internal objects (such as formed dendrites or initial defects from manufacturing) thus may reach the internal electronically conductive layer(s) which results in change of voltage and can further prevent the short between the opposite electrodes. As an example in a 3.7V lithium battery such as with lithium metal anode, $LiCoO_2$ cathode and non-aqueous electrolyte, implementing a separator which has aluminum as one of the components such as perforated aluminum foil, a short between the lithium metal and the aluminum due to dendrite formation, external metallic objects or high temperature inside the cell will change the voltage of the cell, further the dendrite can chemically prefer to stop growth as an electronic contact between the aluminum and lithium dendrite can change the electrochemical reactions. This is in addition to the benefit due to mechanically strong aluminum layer that may prevent the shorts or stop the dendrite. The excellent electronic and thermal conductivity of the metallic membrane can even affect the cell electrical and thermal fields such that the nucleation and growth of the dendrites is slowed down or stopped. All of these may help with better deposition of lithium upon recharging and prevention of catastrophic failure; it is noteworthy to mention that the aluminum layer may be electronically insulated from at least of one electrode by an electronically insulating layer or coating (made of materials such as conventional battery separators, conventional battery binders, PE, PP, polyester, polyurethanes, PVDF, PTFE, silicone, polyimide, $Al_2O_3$, $SiO_2$, $TiO_2$, PEO, LIPON, etc.); this layer or coating can be selected such that the chance of any direct electronic contact between the opposite electrodes be minimized.

The electronically conductive layer can be porous, perforated, nonwoven or thin coating. The size of the holes can be from 10 nm to 1 cm, depending on the chemistry of the cell. For example in a lithium ion battery it can be about 0.2 mm. In an alkaline battery (Zinc anode based or Nickel cathode based) it can be about 0.5 mm. The thickness of the layer can be less than 1 mm, preferably less than 0.1 mm depending on the chemistry. For example in li-ion battery it can be about 0.01 mm. In an alkaline battery (Zinc anode based or Nickel cathode based) it can be about 0.1 mm. The layer itself can be a coating on a non-conductive layer such as micro-porous or nonwoven PE-PP such as Celgard 2225. The thickness of the coating can be less than 0.005 mm, for example can be about 0.002 mm. The layer can also be made of metalized PET or metalized polyimides. The electronically conductive material can be made of any electronically conductive materials such as metals (e.g., stainless steel, copper, titanium, nickel, aluminum, Sn), from alloys (e.g., alloys of the said metals), from conductive polymers, from carbon, or any combinations thereof. The porosity of the layer can be at least 30%, for example 70%.

In an embodiment, an electrochemical cell comprises: a positive electrode; a negative electrode; one or more ionically conductive electrolytes positioned between said positive electrode and said negative electrode; and a composite separator comprising at least one electronically insulating layer and at least one electronically conductive layer; said composite separator being positioned between said positive electrode and said negative electrode and being permeable to ionic charge carriers, but not electronically conductive across the composite separator; wherein said electronically conductive layer undergoes deposition or electroplating of ionic charge carriers or chemical reaction with a dendrite structure or an internal defect upon formation of an internal short between the negative or the positive electrode and said electronically conductive layer, the short formed by contact of the dendrite structure or the internal defect with said electronically conductive layer. In an embodiment, the electronically conductive layer is chemically reactive with the dendrite structure. In an embodiment, the chemical reaction is an alloying reaction.

The invention may be further understood by the following non-limiting examples.

Example 1: Novel Membranes

1) "a Unique Hybrid Membrane for Protecting Lithium Metal Anode or Zinc Anode"

An exemplary hybrid membrane is a novel composite electrolyte composed of liquid, polymer and ceramic electrolytes, designed in a special format. The hybrid membrane has high conductivity (more than 1 mS/cm), mechanical strength (shear modulus=2 GPa; tensile strength=200 MPa; rupture strength=1000 gr) and flexibility. The membrane is low cost ($1/sq. m) and can easily be produced in large quantities (rolls of 100 m long, 6 cm width and 0.025 mm thickness). Using non-aqueous electrolyte near the anode and aqueous electrolyte near the cathode allows using high capacity air and sulfur cathodes with lithium metal anode. The membrane is chemically inert, does not react with lithium metal, electrolytes, air or moisture, and separates the anolyte and catholyte environments. A schematic figure and the mechanism of the performance of the hybrid membrane are shown in FIGS. 1-2. The hybrid design resolves the high cost, fragility and high resistivity of solid electrolytes without compensating the safety. Lithium electroplating, including dendrite growth, is further controlled by a) providing high mechanical pressure on the surface of the lithium metal, b) manipulating the electric field by using a conductive layer inside the membrane. It is expected that the novel hybrid electrolyte in conjunction with using state of the art electrolyte and additives can enable the next generation of high energy batteries with double the energy at half the cost.

Placed next to the cathode layer: Layer one, metal frame with polymer coating (0.007 mm aluminum, stainless steel or copper and 2×0.003 mm polyimide or polyester) with about 80% porosity filled with solid electrolyte (e.g., LISICON). A first pattern of LISICON disks fills the holes in a metallic matrix. Each solid electrolyte disk can be about 10 mm. After baking, at several hundreds of degrees Celsius, a polymer coating is applied on the metallic part. The design of the first layer overcomes the brittleness, large thickness and expensive cost of ceramic-based solid electrolytes, such as Ohara's.

Placed next to the lithium layer: Layer two, 0.010 mm thick aluminized polymer (polyimide or polyester) with about 10% porosity filled with nonwoven or micro-porous separator and aqueous electrolyte. A second pattern of holes, each about 0.2 mm, is such that the holes of the second layer are aligned such that they have no overlap with the solid electrolyte filled holes of the first layer, Offset design.

The design of the first layer overcomes the brittleness, large thickness and expensive cost of ceramic-based solid electrolytes, such as Ohara's. The design of the second layer limits the size of the largest short, which reduces the chance of a catastrophic failure.

The offset property of the two-layer design enforces a unique tortuosity such that the applied mechanical pressure may result in stopping the growth of dendrites by kinetic frustration.

A key element of our unique innovation is a double layer perforated polymer film designing the tortuosity of the separator the way a composite material is made. Based on the concept of "offset" widely used in the science of optics, we place two identical perforated layers in a complementary pattern that prevents any light from passing from a side to the other side of the layers without going through at least one of the layers. Further, to provide low resistivity required for high power applications, layers of high mechanical strength and layers of low ionic resistance are placed next to each other as a layered composite. Our unique method allows fabrication of mechanically-thermally strong separators from almost any materials, such as PEEK, Kapton, Polyesters, PET, polysulfone or even ceramics.

Protecting lithium metal anode is a critical step in developing and improving the next generation of energy storage technologies, since they represent the most critical component needed to enable widespread commercialization of PEVs. In this example, we are suggesting a unique hybrid membrane for protecting lithium metal anode in advanced high energy batteries, such as in lithium-sulfur and lithium-air batteries. The proposed membrane is a unique hybrid membrane with excellent conductivity, stability and flexibility that is needed for enabling lithium metal battery cells, with up to 500 Wh/Kg, 1000 Wh/L and 1000 cycles. Our effort is focused on a unique class of advanced membranes with non-expensive, efficient and scalable manufacturing.

To overcome the challenges of dendrite formation and lithium contamination during recharging lithium metal anode several interesting approaches have been suggested. Several research groups, such as Balsara at LBNL have been working on polymer based electrolytes with the goal of stopping the dendrite formation or growth. Many different electrolytes (Doron Aurbach and Jeff Dahn pioneering work in 90's) and additives, such as $LiNO_3$, have been tested to control the reactions between lithium metal and the electrolyte. Finally, PolyPlus has been using LISICON solid electrolyte to prevent the contamination of lithium metal in lithium sulfur and lithium air cells. However, these efforts have not been sufficient yet. Polymer electrolytes with high mechanical strength have low conductivity and adhesiveness at room temperature. Additives and different electrolytes have not been successful beyond any coincells, as they still need the mechanical pressure on the lithium sulfur. Ceramic electrolytes are still too thick, expensive and rigid. Thus, still there is a critical need for more advanced membranes that can help in protecting the lithium surface in advanced lithium metal battery cells, larger than a few mAh.

TABLE 1

| Membrane type | Conductivity | Cost | Deformability | Scability | Protecting lithium |
|---|---|---|---|---|---|
| Aqueous electrolyte with separator | Good | Low | High | Excellent | No |
| Polymer Electrolyte | Poor | Low | Average | Good | No |
| Ceramic Electrolyte | Good | Very High | Very Poor | Very poor | Yes |

TABLE 1-continued

| Membrane type | Conductivity | Cost | Deformability | Scability | Protecting lithium |
|---|---|---|---|---|---|
| Hybrid Membrane (this work) | Good | Low | High | Good | Yes |

C-Layer Frame Fabrication Development

The frame of the C layer holds the ceramic electrolyte (e.g., LISICON) pellets in place during the manufacturing and operation. Metallic frames will be used to overcome the high temperature (more than 500° C.) and milling needed to process the ceramic electrolyte. At the end of the process, a thin electronically insulating layer will be coated on the metallic part. Thermal deformation of the metallic frame can overcome the challenge of adherence of the pellets to the metallic frame. As an example, nickel, aluminum and stainless steel can be used.

C-Layer Pellets Fabrication Development

We can use the guidelines and methods from recent literature on ceramic electrolyte research to fabricate the ceramic pellets. The process is very challenging and the dimensions of the pellets and process conditions play important roles in the quality of the product. We try to avoid the pinhole formation and cracks by optimizing the size of the pellets and the metallic frame structure.

Composite C-Layer Fabrication Development

Bonding the metallic frame to the ceramic pellets can be challenging. Solid state methods will be used as the first bonding method, such as a) Powder blending and consolidation (powder metallurgy): Powdered metal and discontinuous reinforcement are mixed and then bonded through a process of compaction, degassing, and thermo-mechanical treatment (possibly via hot isostatic pressing (HIP) or extrusion), and b) Foil diffusion bonding: Layers of metal foil are sandwiched with long fibers, and then pressed through to form a matrix.

Insulating polymer coating (a few micrometers) will be performed on the metallic frame as the final step.

In case the bonding between the metallic frame and the ceramic pellets gets lose during fabrication or operation and thermal treating (difference in thermal coefficient of metals and ceramics) being insufficient, we will use binders such as PVDF polymer in NMP and cement ($SiO2$, $Al_2O_3$, Fe2O3 and CaO) in water. This process has similarities with making reinforced concrete in structural engineering. As we will use non-aqueous with the cathodes in this testing, the interfacial resistance between the cathode and the C-layer may be high. Surface treatment such as PVDF and SiO2 coating can be used to overcome the problem.

A-Layer Fabrication

Metalized polymer films will be perforated in a periodic format, 0.1 mm diameter holes, by laser cutting, lithography or micro punching and the least expensive method will be implemented. Handling 200 cm long of 0.01 mm films can be challenging, especially if the film wrinkles, which can cause the perforation challenging. Especial engineering instruments will be designed to address this challenge.

The objective is to measure the effect of A-layer on the performance of lithium metal anode cells. Especially the effectiveness of controlling lithium electroplating by a) designed tortuosity b) manipulating the electrical field, due to the embedded conductive core layer will be investigated Two of our suggested mechanisms to control the lithium metal dendrite forming and growth are a) Manipulating the electric field inside the cell by using an inner metallic layer in the membrane that generates surface charges on its surface due to the charges on the lithium anode film. b) Applying mechanical pressure on most of the lithium metal surface which has been proven to enhance the electroplating of lithium. The surface of the perforated polymer may be treated, for example by PVDF and SiO2 coating, such that the interface resistance between the lithium anode and the membrane be minimized.

Hybrid Membrane Fabrication Development

Fabrication of the final product, hybrid membrane, requires the bonding between the A-layer and C-layer. The bonding should be very rigid so that we can implement our "designed tortuosity" mechanism to stop the growth of lithium dendrite. Attention will be given to the bonding between the C-layer and A-layer and also minimizing the bulk and interfacial resistance of the membrane. The bonding should prevent any direct contact between the ceramic pellets and lithium, as most high conductivity ceramic electrolytes react with lithium metal. As an example, we can use PVDF and SiO2 (e.g., dissolved in acetone at 40° C.) as the binder between the layers, which will allow enough wetting of the C-layer by the anolyte and preserves the "offset" between the layers.

The design used the "designed tortuosity" in blocking the dendrite and improving the electroplating of lithium.

The perfect separation between lithium metal-anolyte from the cathode-catholyte is essential in some cells. Impermeable polymer housing for the cathode-catholyte can be used such that only the hybrid membrane remains uncovered. We may need to inject the catholyte by a syringe and then close the hole by heat sealing Compressible Seal Development The objective of this element is to implement a compressible seal that can ensure enough compressive pressure on the lithium surface even in a fully discharged cell. Smooth electroplating of lithium ions requires applying enough pressure on the lithium anode surface. As the high specific energy design limits us to spring-less formats, we use a compressible housing for lithium anode.

2) A novel flexible and inexpensive composite polymer-solid electrolyte electrolyte that has very high ionic conductivity (ceramic powders, such as $TiO_2$ or lithium titanate bounded by polymers (about 10% weight) such as pvdf or Polyethylene oxide). it allows making Li-air and Li—S batteries with energy densities 2-4× higher than state of the art. Traditional methods make ceramic electrolytes without any binders, hence there are limitations on the size of the film; it has to be thick to avoid pinholes but this makes the, brittle. Also the dimensions (surface area) are limited to about 10 cm×10 cm. In our novel method, we can make ceramic-polymer electrolytes as thin as 20 micrometers and with high surface area, such as 2 m×6 cm. further, our solid electrolyte is flexible and can be used in traditional batteries such as 18650 manufacturing.

3) Spar (e.g. two perforated layers having a misfit between alignment of apertures) with different openings on each side: 20% on the Li and 80% on the Cathode. LTO, $Li_2O_2$, Titanium disulfide, $FePO_4$ and solid electrolytes deposited on nonwoven separator or in the holes of Spar.

4) Coating the surface of the "electrolyte/separator with filled holes" particles with a hydrophobic skin, e.g., polydopamine, allows $Li^+$ transport while stabilizing the electrolyte particles in an aqueous electrolyte.

5) The stable surfaces of $Li_2O_2$ are half-metallic, despite the fact that $Li_2O_2$ is a bulk insulator. A composite polymer gel containing a large volume fraction of an inorganic oxide and an organic liquid electrolyte immobilized in a polymer can give a flexible, thin membrane with a au $10^{-3}$ S $cm^{-1}$, may assist in blocking dendrites from a Li anode or soluble redox couples in a liquid cathode. In contrast, the stable surfaces of $Li_2O$ are insulating and nonmagnetic. The distinct surface properties of these compounds may explain observations of electrochemical reversibility for systems in which $Li_2O_2$ is the discharge product and the irreversibility of systems that discharge to $Li_2O$. Moreover, the presence of conductive surface pathways in $Li_2O_2$ could offset capacity limitations expected to arise from limited electron transport through the bulk solid electrolyte such as LTO, $Li_2O_2$, $TiS_2$, $FePO_4$, or for Fuel cells, where the inside the electrolyte is electronically conductive (such as Al or Ni or Tin layer in the middle) but it is electronically disconnected from the electrodes. Aluminized Mylar show how one can make it. In fact in fuel cells and Na—S batteries or Molten salt batteries or molten batteries they use high temperature, here I suggest using electronic conductivity+cell electric field (my experiments: middle of the cell is ½ of the total voltage!)

6) Coating on separator or filing the holes in Spar amphiphilic polymers—polymers composed of hydrophilic (water-loving) and hydrophobic (water-hating) parts—in modifying the interface between sulfur and the hollow carbon nanofiber, they used polyvinylpyrrolidone (PVP). Also Lithium stearate coatings can be used. [Guangyuan Zheng, Qianfan Zhang, Judy J. Cha, Yuan Yang, Weiyang Li, Zhi Wei Seh, and Yi Cui (2013) Amphiphilic Surface Modification of Hollow Carbon Nanofibers for Improved Cycle Life of Lithium Sulfur Batteries. Nano Letters doi: 10.1021/ nl304795g]. In addition to $TiO_2$ on sulfur, $TiS_2$ coatings can be formed on sulfur.

7) Solid electrolytes for lithium batteries. E.g., LTO+5% binder as a solid electrolyte film. In an embodiment, this electrolyte gets lithium from one side and release it to the other side (due to chemical gradient and electric gradient forces).

Example 2: Hybrid Membranes

In all types of batteries, such as li-ion, alkaline and lead-acid, the separator used with the liquid electrolyte is based on electronically insulating and ionically insulating polymers such as polyethylene (PE) and polypropylene (PP). Polymer electrolytes such as PEO have been tried in li-ion cells without liquid electrolyte and without a PE-PP separator, but their ionic conductivity is too low. Polymer electrolytes such as PEO have been tried in Li-ion cells with liquid electrolyte and without a PE-PP separator, but their structural stability is too low and there is no benefit in using them. Ceramic-glass based electrolytes such as LIPON and LISICON have been tried in li-ion cells with and without liquid electrolyte and without a PE-PP separator, but their ionic conductivity is too low, and their cost is too high.

In Li-ion cell with liquid electrolyte, membranes made of conventional active materials with different charge-discharge voltages vs Li+/Li can effectively replace the PE-PP separators and decrease the cost of the cell, while increasing its performance and manufacturing speed. The cost of separators now is about $2 per sqm, but the cost of the membrane suggested in this invention is $0.2 per sqm; further the interface impedance between the PE-PP separators is much higher than that of the membrane suggested here and electrodes, which increases the rate and cycle life; it further may prevent any catastrophic failure such as fire due to the high thermal stability of the disclosed membrane. The active material can be initially lithiated or not. Examples of the materials are $TiO_2$, $TiS_2$, lithium titanate, graphite, $LiFePO_4$. An example is a 50% porous layer, 10 micrometers thick made of 90% $TiO_2$ mixed with 10% binder such as PVDF. $Al_2O_3$ can also be added for lower interface resistance on the electrode-electrolyte interface, an example is a 50% porous layer, 10 micrometers thick made of 80% lithium titanate mixed with 10% binder such as PVDF and 10% $Al_2O_3$. In some embodiments this membrane can have several layers in which at least one of the layers may have high electronic conductivity. An example is a 50% porous layer, 10 micrometers thick made of 80% lithium titanate mixed with 10% binder such as PVDF and 10% $Al_2O_3$ with a thin, a few micrometers or less, carbon coating on at least one side of it. Another example is a 50% porous layer, 10 micrometers thick made of 80% lithium titanate mixed with 10% binder such as PVDF and 10% $Al_2O_3$ as the first layer and a 50% porous layer, 10 micrometers thick made of 80% lithium titanate mixed with 5% carbon black and 5% binder such as PVDF and 10% $Al_2O_3$ as the second layer. The electrolyte can be conventional li-ion electrolyte such as mix of organic solvents (for example, PC, DMC, EC) and a lithium salt (for example, $LiPF_6$ or $LiClO_4$). The electrodes can be any li-ion electrodes such as lithium, silicon or graphite anode materials and $LiFePO_4$, $LiCoO_2$, Sulfur or Air cathode. In some embodiments, the membrane can be a coating on at least one of the electrodes. Several examples are A) a 5 micrometer, 50% porosity coating of 90% lithium titanate, 5% carbon black and 5% PVDF binder on silicon anode in a li-ion cell. B) a 5 micrometer, 50% porosity coating of 90% lithium iron phosphate, 5% carbon black and 5% PVDF binder on sulfur cathode in a li-ion cell. C) a 5 micrometer, 50% porosity coating of 90% $TiO_2$, 5% carbon black and 5% PVDF binder on silicon anode in a li-ion cell. D) a 5 micrometer, 50% porosity coating of 85% lithium titanate, 10% $Al_2O_3$ and 5% PVDF binder on sulfur cathode in a li-ion cell. The electrolytes can be liquid such as commercial PC-EC-DMC with 1 M $LiPF_6$, or can be solid such as LIPON, LISICON or PEO with $LiPF_6$.

The inventors have also found that ceramic-glass and polymer electrolytes fortified with conventional active materials with different charge-discharge voltages vs Li+/Li, such as conventional anode and cathode active materials in li-ion cells, can effectively resolve the manufacturing challenges of solid electrolytes, such as low flexibility and pinholes. Some examples are A) a li-ion solid electrolyte with 85% LISICON powder, 5% lithium titanate and 10% PVDF binder, in NMP solvent made with a slurry process. B) a li-ion solid electrolyte with 70% LISICON, 15% $TiO2$, 5% lithium iron phosphate, 5% carbon black and 5% PVDF binder, in NMP solvent made with a slurry process; In this case, due to the presence of the electronically conductive carbon black, a liquid electrolyte and separator or a non-electronic conductive porous coating is needed between the membrane and at least on electrode. C) a li-ion solid electrolyte with 70% PEO with LiPF6 salet, 15% LISICON, 5% lithium titanate, 5% Al2O3 and 5% PVDF binder. D) a li-ion solid electrolyte with 65% LISICON, 10% MnO2, 5% PEO with LiFP6, 5% Al2O3, 5% TiO2, 5% lithium titanate and 5% PVDF binder. The electrolytes can be liquid such as commercial PC-EC-DMC with 1 M LiPF6, or can be solid such as LIPON, LISICON or PEO with LiPF6. A metallic frame, such as aluminum copper, titanium, iron or stainless steel, can be used to provide both electronic conductive network in the membrane and structural stability; however the membrane should not connect the anode and cathode electronically, for example one interface of the membrane and an electrode needs an electronically insulating layer.

Example 3: PEO/$LiClO_4$ Polymer Electrolyte Coated Seperatores

Kapton (K) separator and aluminum (Al) mesh was coated with various combinations of poly(ethylene) oxide (PEO) and lithium perchlorate ($LiClO_4$) polymer electrolyte solutions. The description and concentrations of PEO coated separators are shown in Table 2 below. Separators that were coated with a 50:50 weight percent mixture of PEO: $LiClO_4$ polymer electrolyte have the highest coating weigh and separators coated with 5% solid PEO in $H_2O$ have the lowest coating weight

TABLE 2

| Separator Combination (PEO:LiClO) | Substrate | PEO Polymer, wt % | $LiClO_4$, wt % |
|---|---|---|---|
| K + PEO | Kapton | 100 | 0 |
| K + PEO (90:10) | Kapton | 90 | 10 |
| K + PEO (70:30) | Kapton | 70 | 30 |
| K + PEO-50:50 | Kapton | 50 | 50 |
| Al + PEO | Al mesh | 100 | 0 |
| Al + PEO-90:10 | Al mesh | 90 | 10 |
| Al + PEO-70:30 | Al mesh | 70 | 30 |
| Al + PEO-50:50 | Al mesh | 50 | 50 |

Figure 13A:
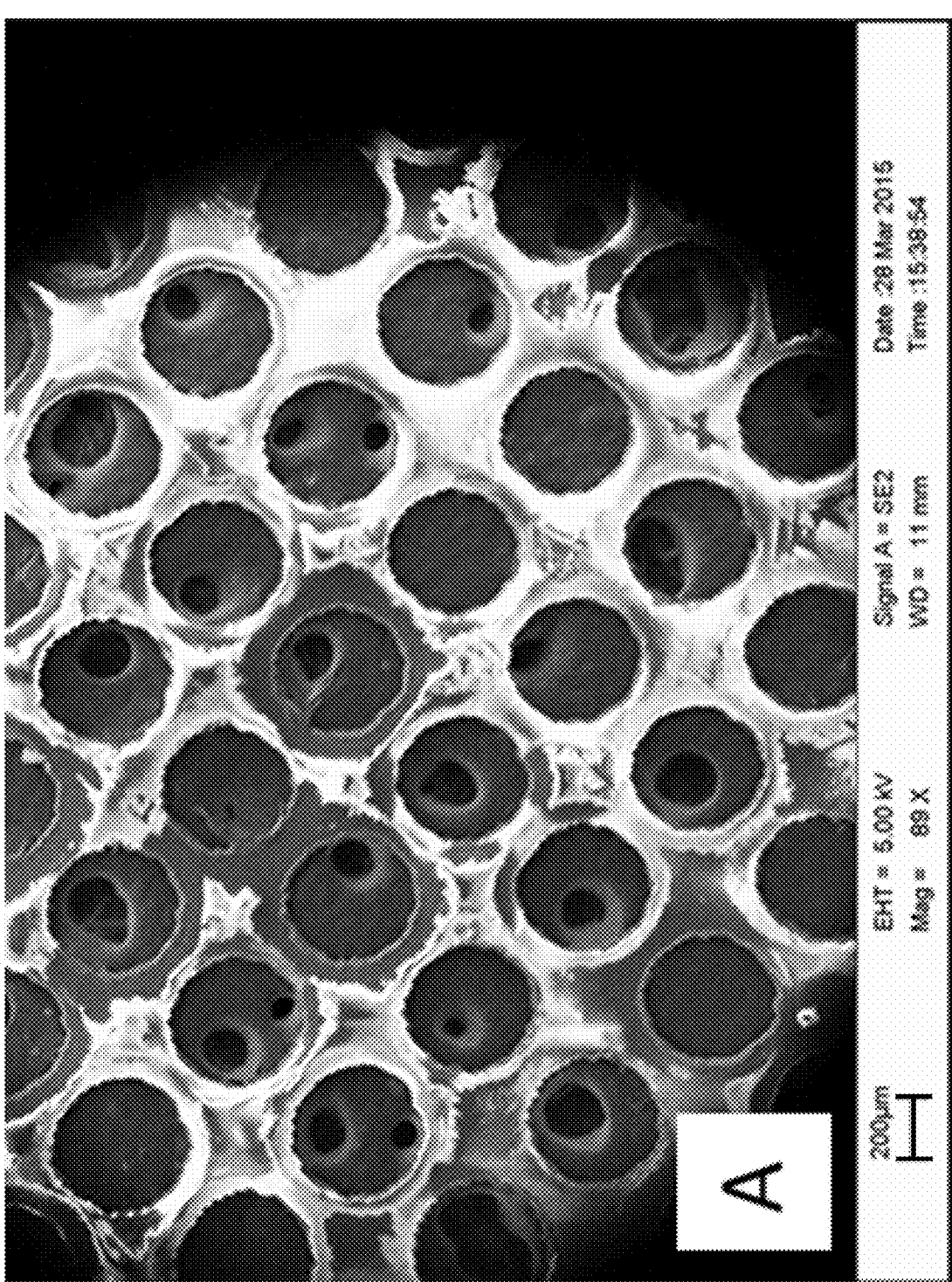
FIGS. 13A and 13B: Scanning Electron Microscope (SEM) image of Kapton substrate coated with PEO polymer.
Figure 13B:
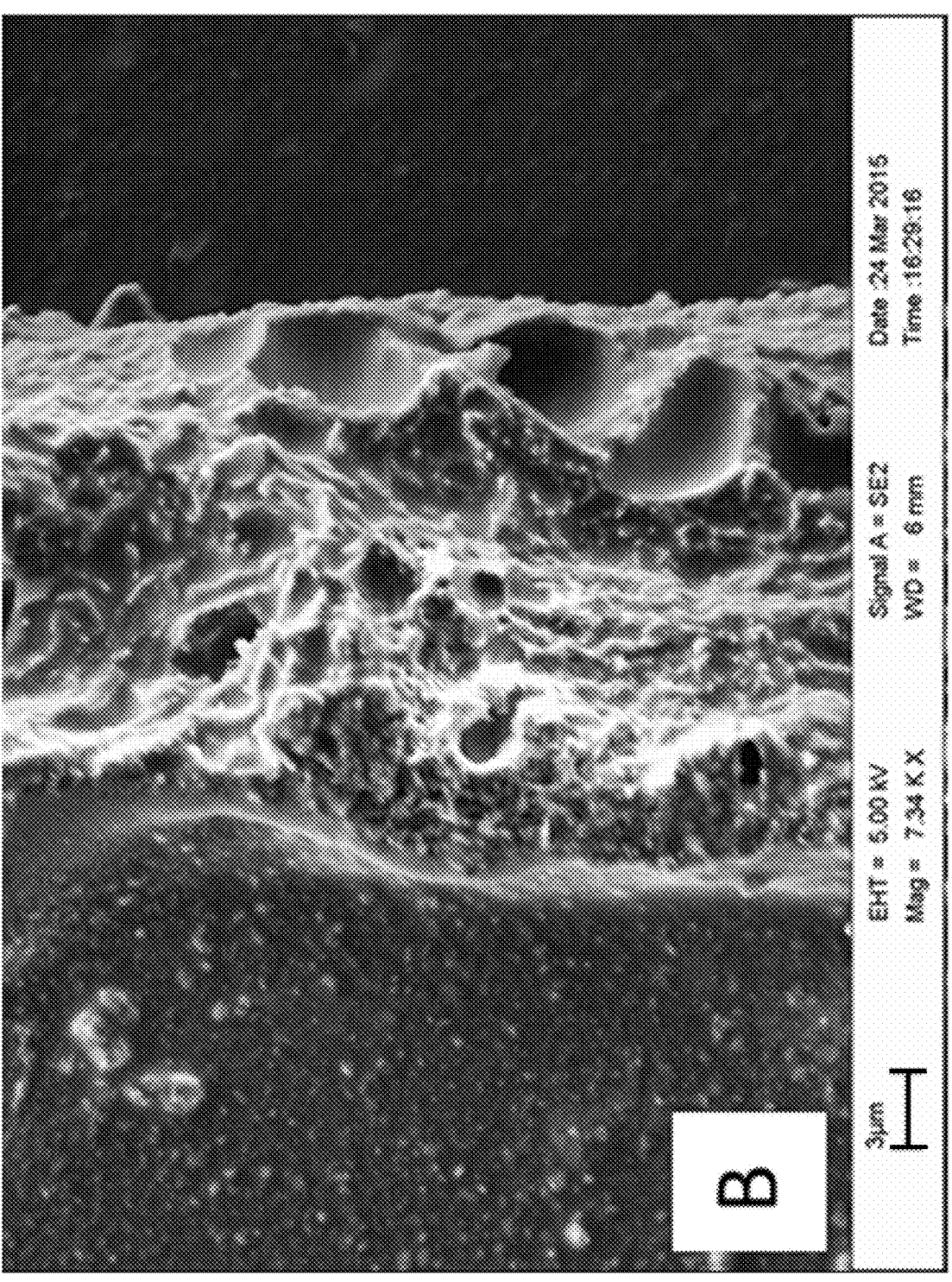
Figure 13C:
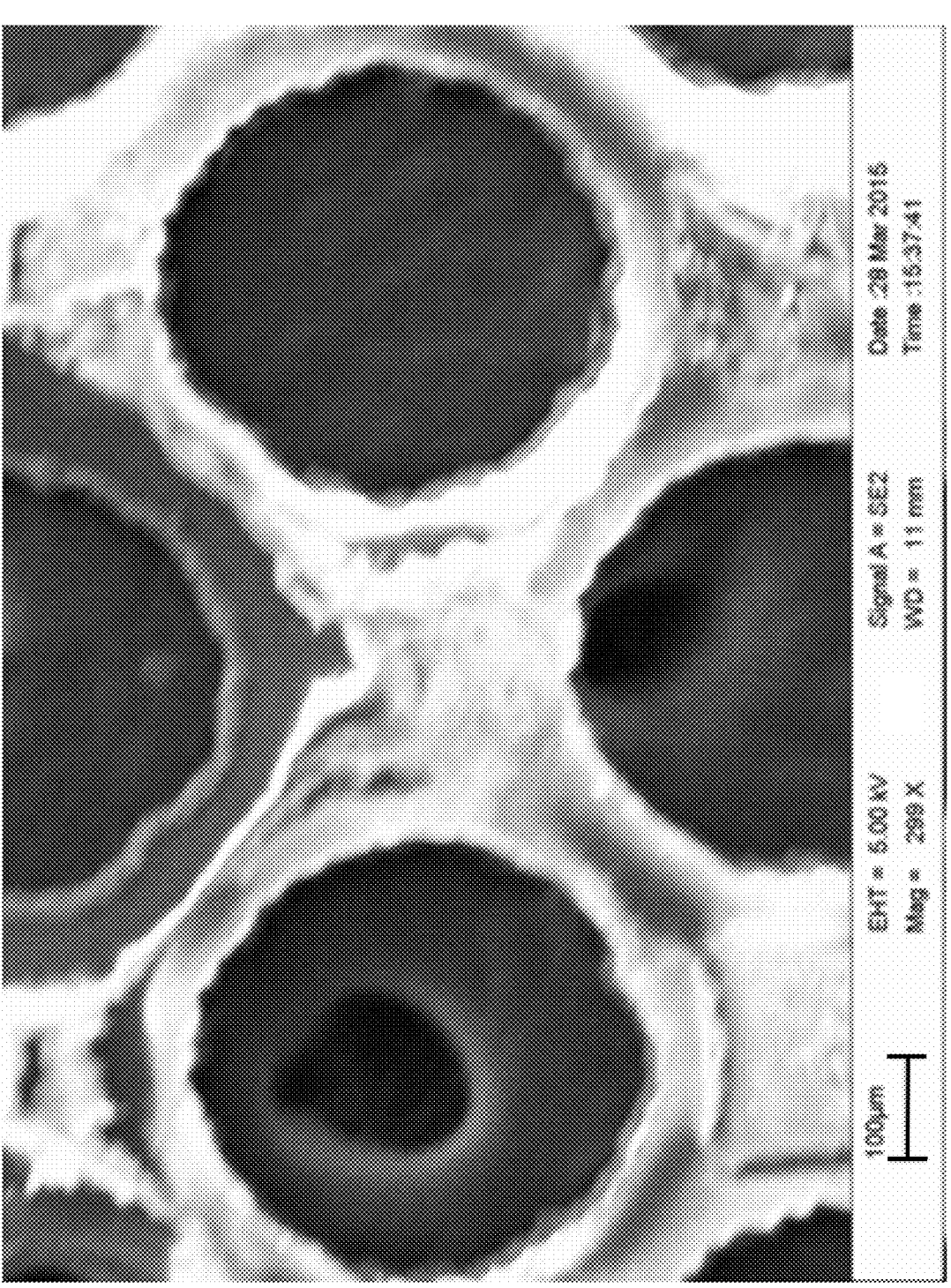
FIGS. 13C, 13D and 13E: Additional SEM images of coated Kapton substrates.
Figure 13D:
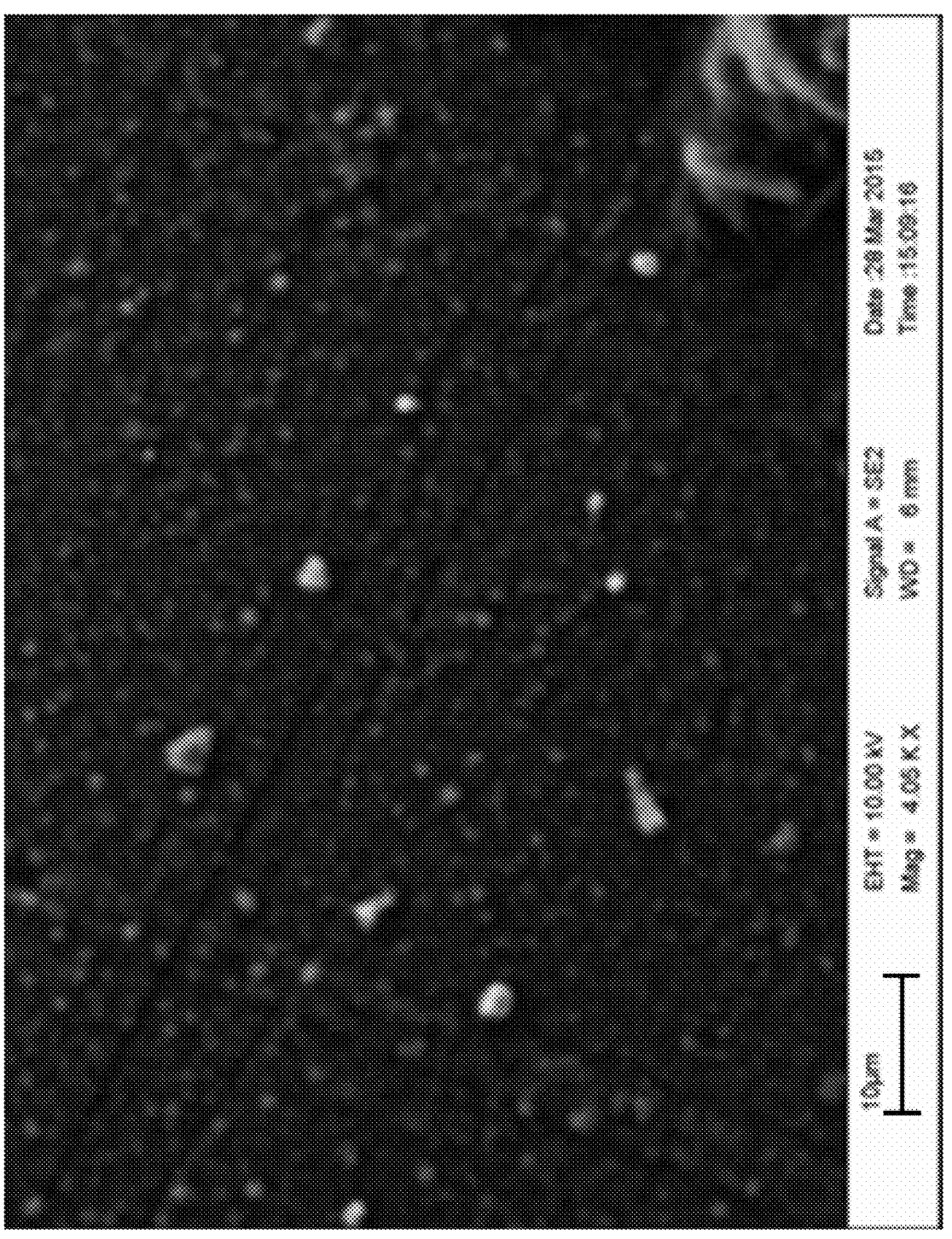
Figure 13E:
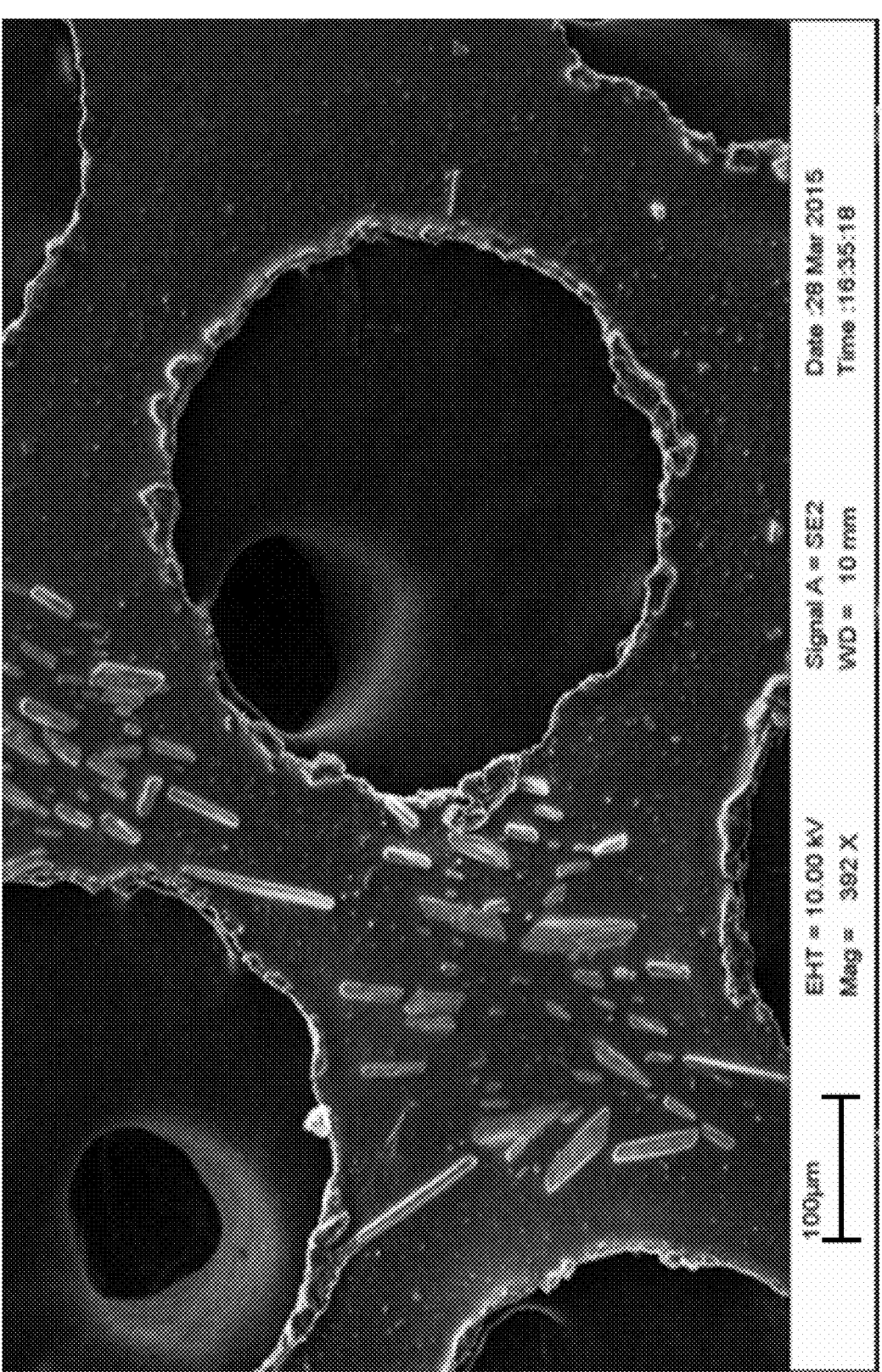
Figure 13F:
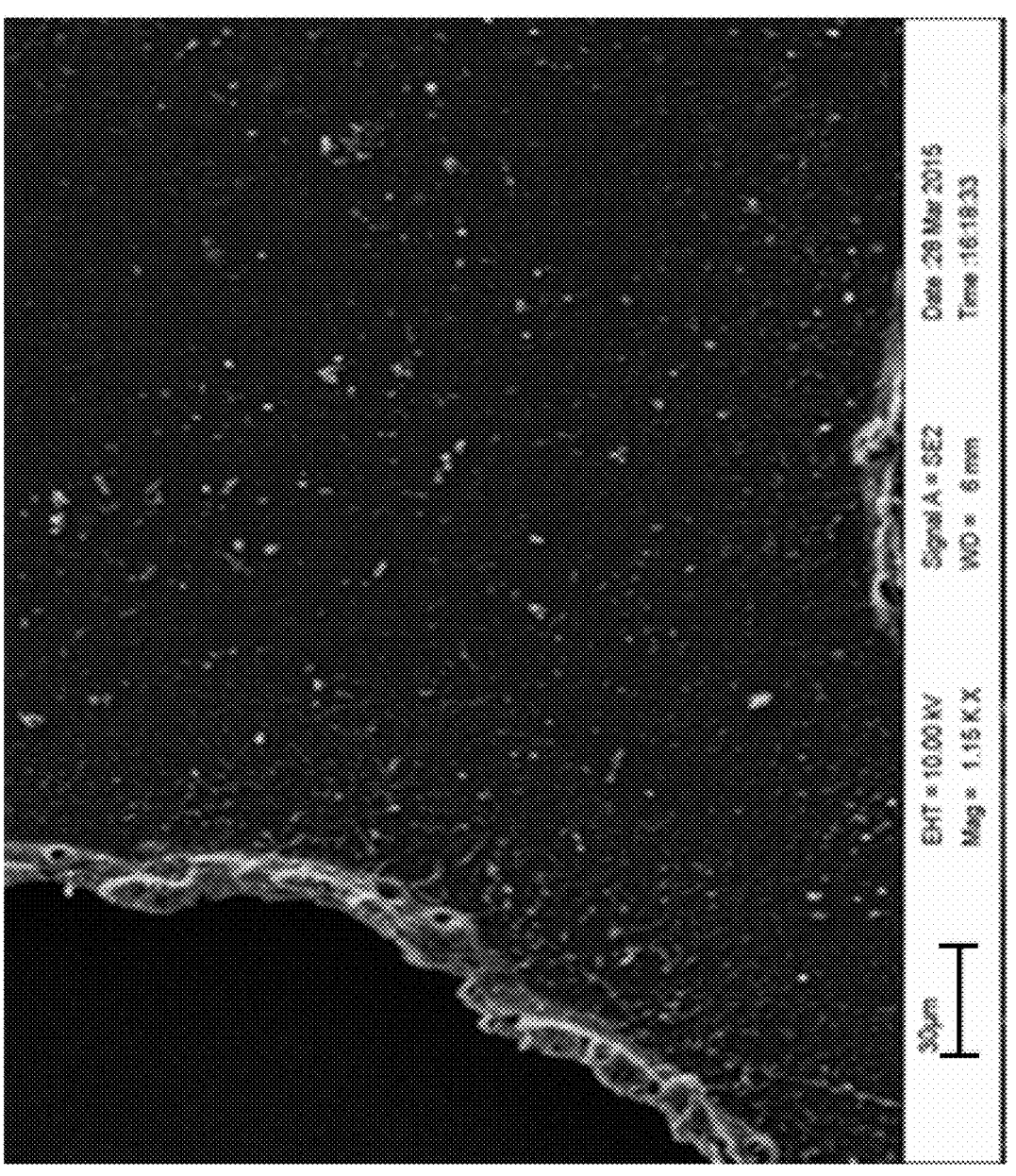
FIGS. 13F, 13G and 13H show SEM images of coated Al substrates.
Figure 13G:
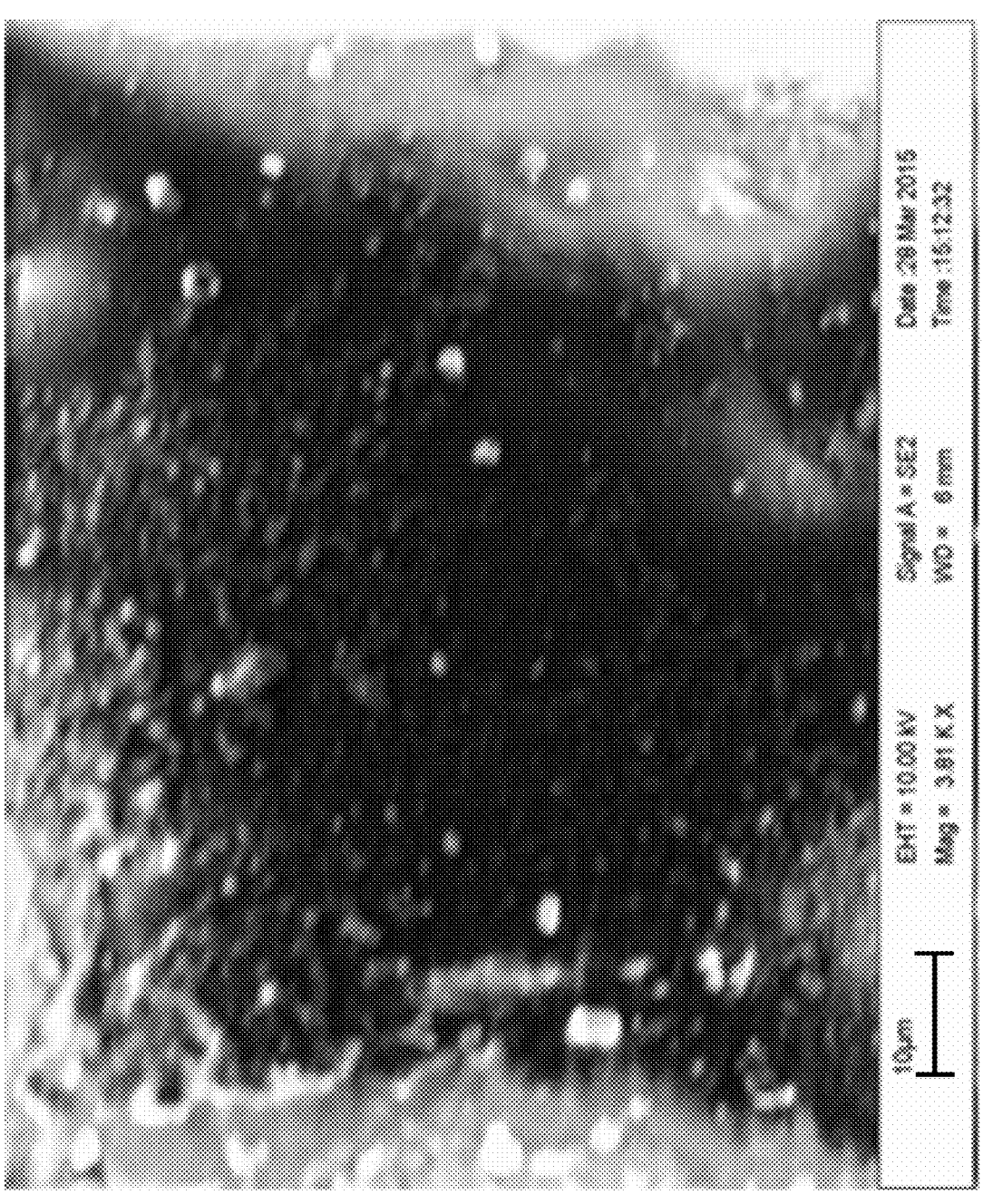
Figure 13H:
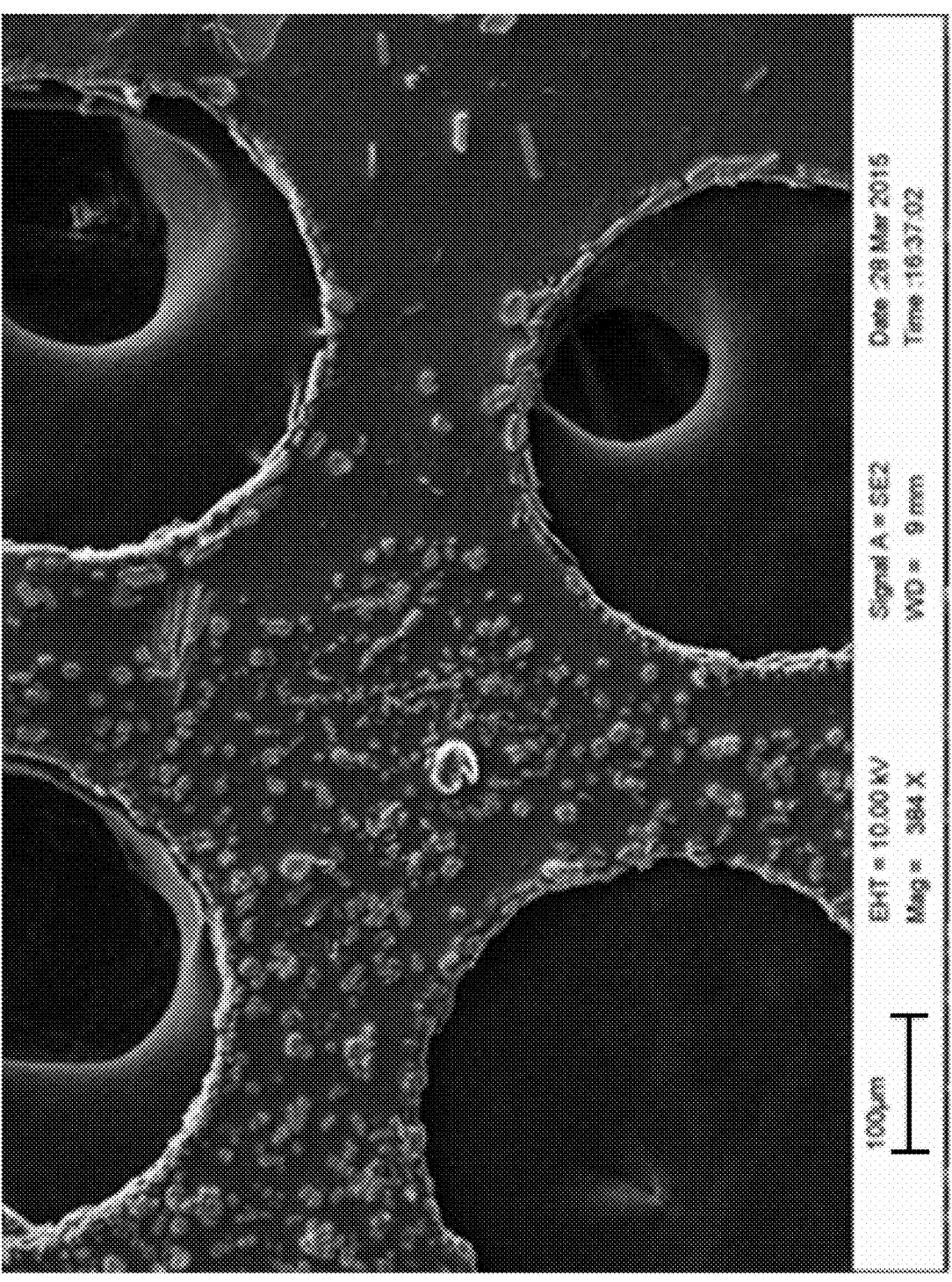

Displayed in FIG. 13A is the SEM image of Kapton coated with PEO polymer at 89× magnification showing uniform distribution of the polymer electrolyte coating. FIG. 13B displays a cross section of the same separator. It is difficult to distinguish the difference between substrate and the polymer electrolyte layers for polymer electrolyte thickness calculation. Better sample preparation for cross section imaging can done in the future, possibly using liquid nitrogen to fracture the sample more cleanly or to make use of a diamond blade cutting surface. The SEM images reveal that the pores of the separator are not filled. Viscosity adjustment of the solution concentrations along with controlling the drying conditions would likely produce a fully filled film. FIGS. 13C, 13D and 13E: shows additional SEM images of coated Kapton substrates: FIG. 13C: Kapton+PEO, FIG. 13D: Kapton+PEO: $LiClO_4$/90:10. FIG. 13E: Kapton+PEO: $LiClO_4$/50:50. FIGS. 13F, 13G and 13H show SEM images of coated Al substrates. FIG. 13F shows an Al substrate coated with PEO, FIG. 13G shows an Al+PEO: LiClO4/90: 10, FIG. 13D shows Al+PEO: LiClO4/50:50.

Figure 14A:
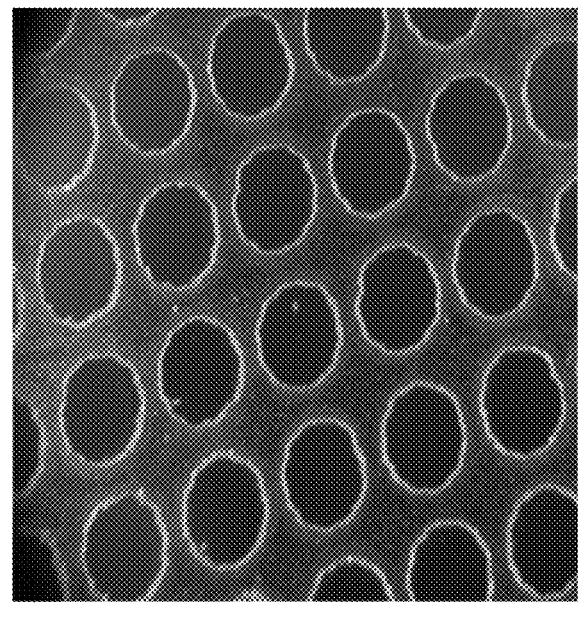
FIG. 14A-14D.
Figure 14B:
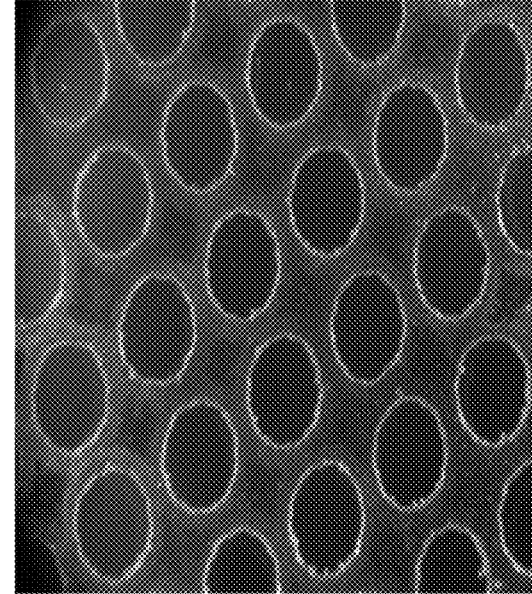
Figure 14C:
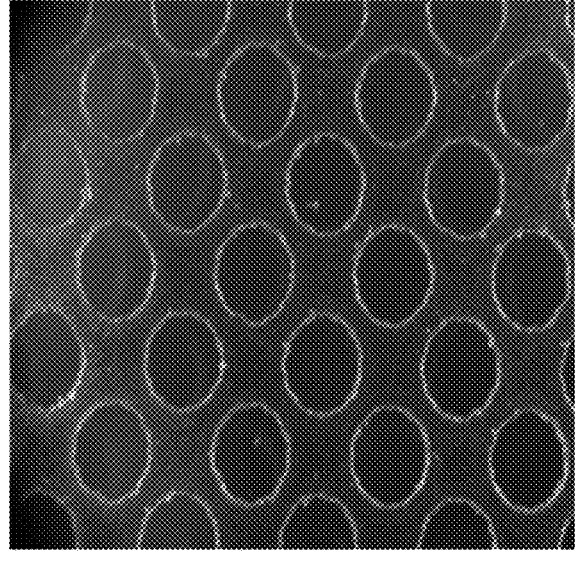
Figure 14D:
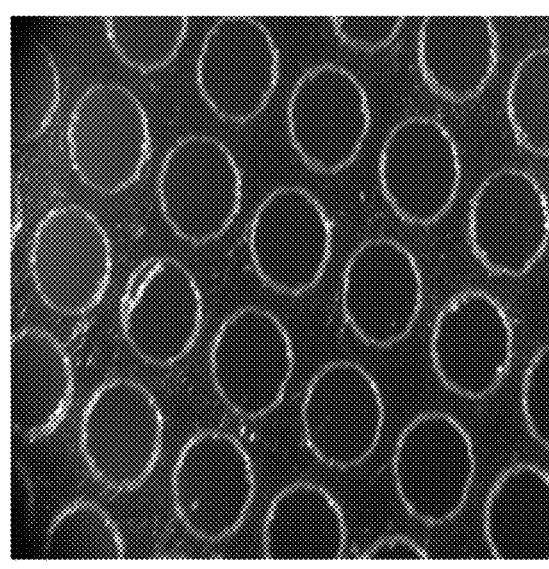
Figure 14E:
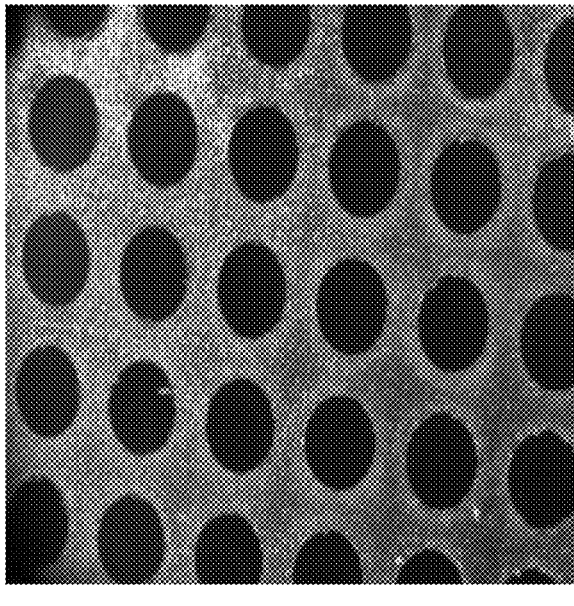
FIG. 14E-14H.
Figure 14F:
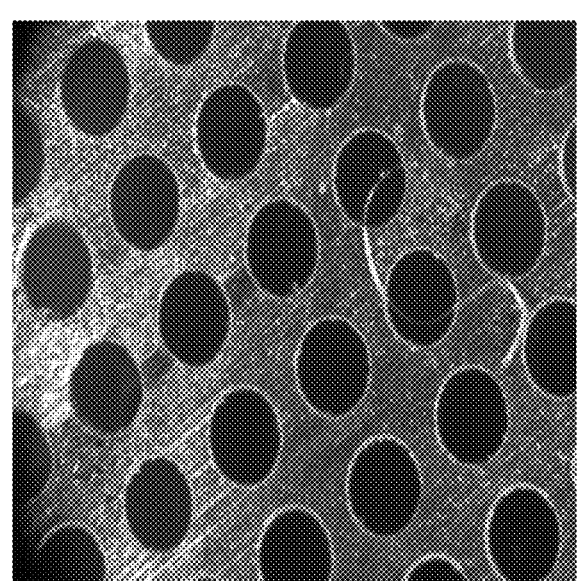
Figure 14G:
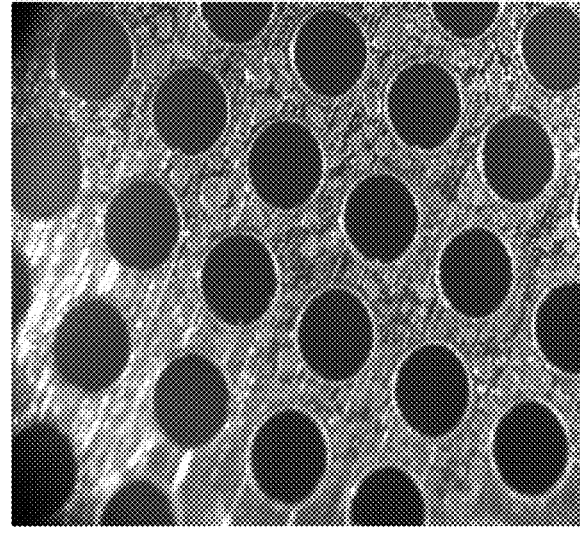
Figure 14G:
Figure 14H:
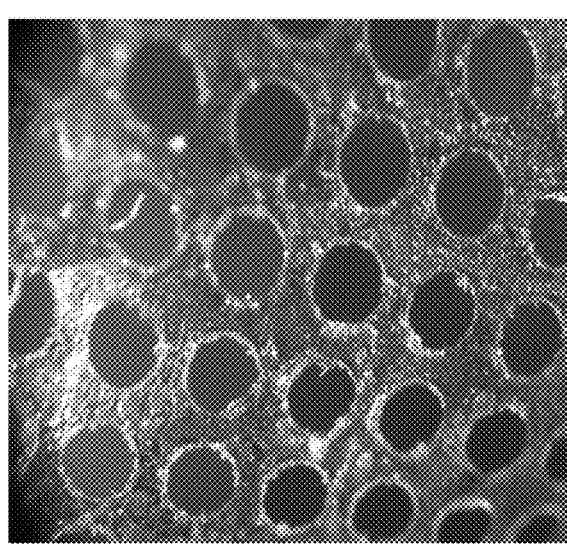

Microscope images of different polymer coated separators are displayed in FIGS. 14A-14D and FIGS. 14E-14H. FIG. 14A: Kapton+PEO; FIG. 14B: Kapton+PEO: $LiClO_4$/90:10; FIG. 14C: Kapton+PEO: $LiClO_4$/70:30; FIG. 14D: Kapton+ PEO: $LiClO_4$/50:50. FIG. 14E: Al+PEO; FIG. 14F: Al+PEO: $LiClO_4$/90:10; FIG. 14G: Al+PEO: $LiClO_4$/70:30; FIG. 14H: Al+PEO: $LiClO_4$/50:50.

Half cells in coin cell format with polymer electrolyte coated separators displayed in Table 1, lithium cobalt oxide (LCO) cathodes, Li anode, and DMC/1M $LiClO_4$ electrolyte were prepared in a glovebox.

Figure 15:
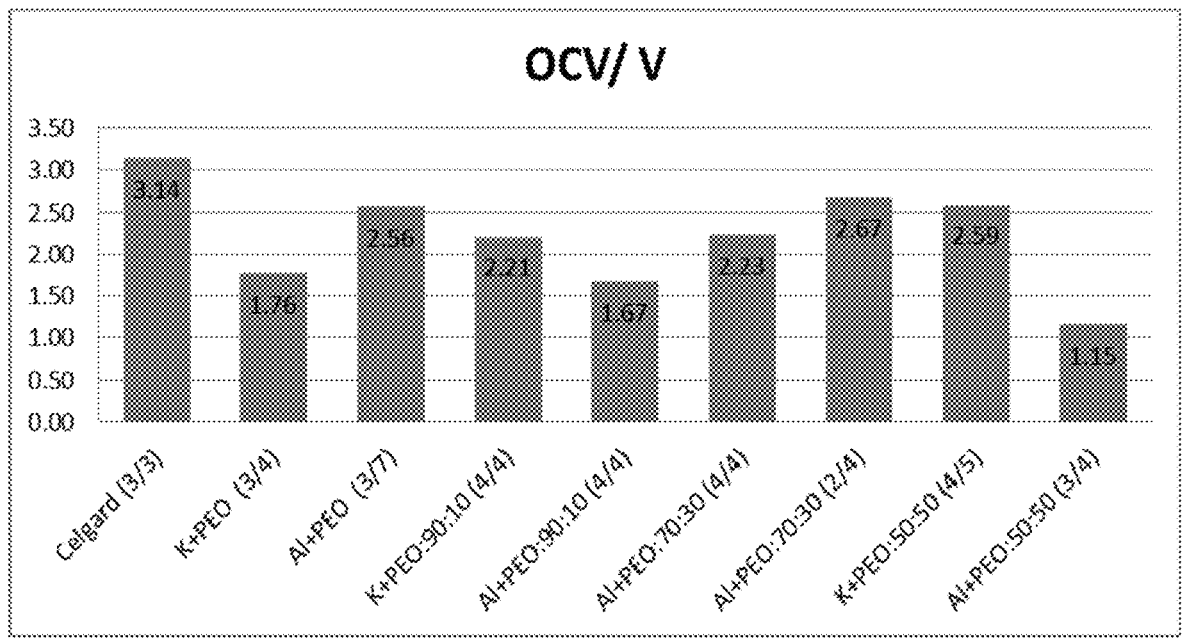
FIG. 15: Average open circuit voltage (OCV) measurements of the LCO half coin cells of Example 3.

FIG. 15 above shows the average OCV measurements of these LCO half coin cells. The fraction next to the name of the cell at the bottom of the bar graph represents the number of working cells yielded over the total number of cells made. This figure displays the average OCV of those yielded cells (in Volts). In general, cells with Al mesh substrate displayed the highest failure rate. It is possible that the Al mesh, which is thicker and more rigid than Kapton is shorting some of the cells when pressed into the coin cell format.

Figure 16:
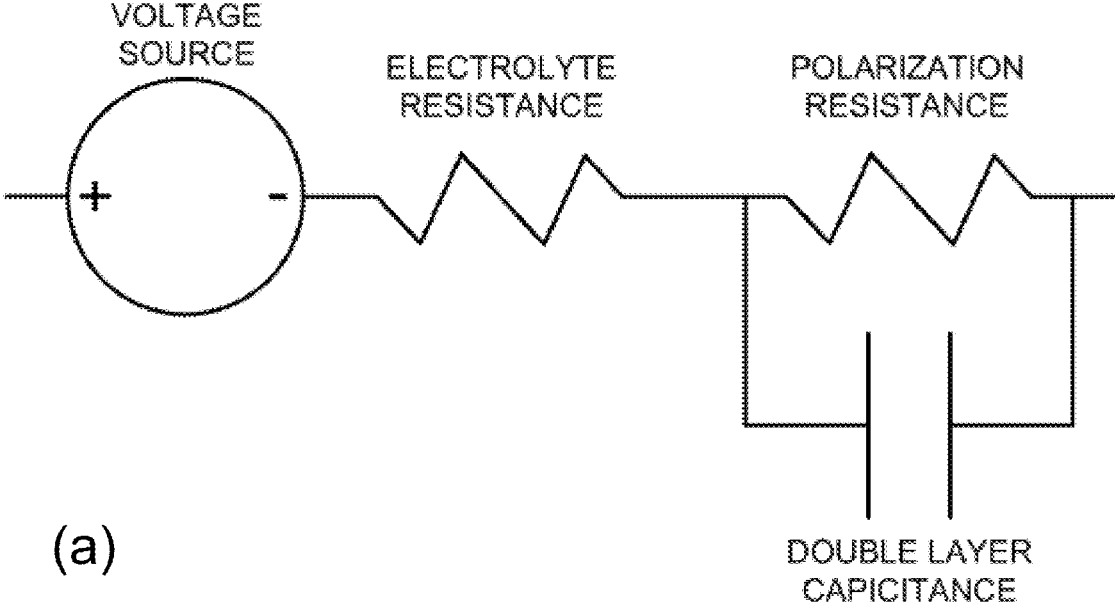
FIG. 16: Illustration of the measurement elements used
Figure 16:
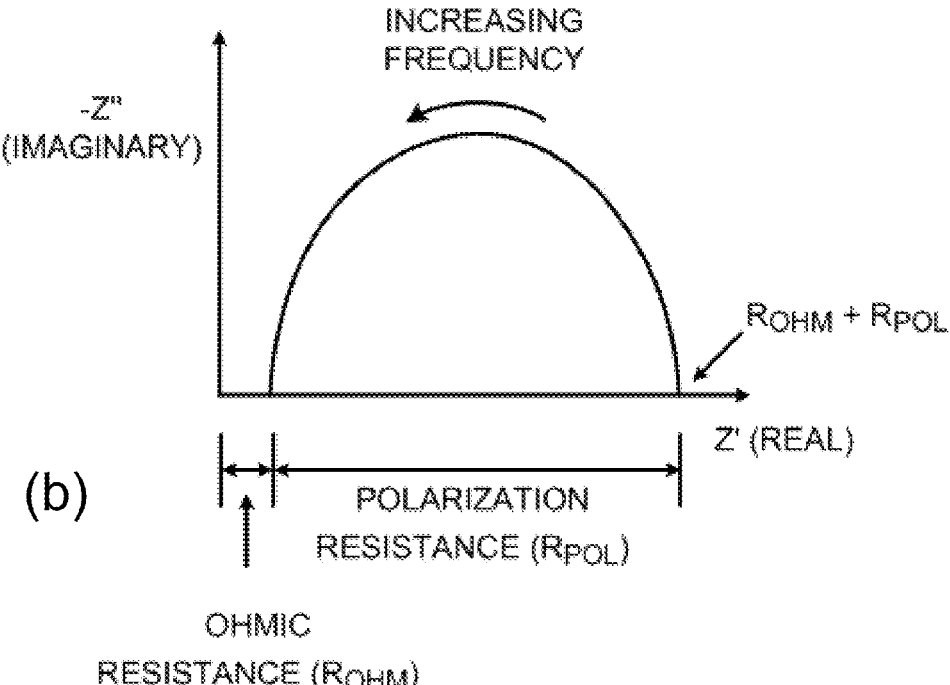
Figures 17A, 17B, 17C:
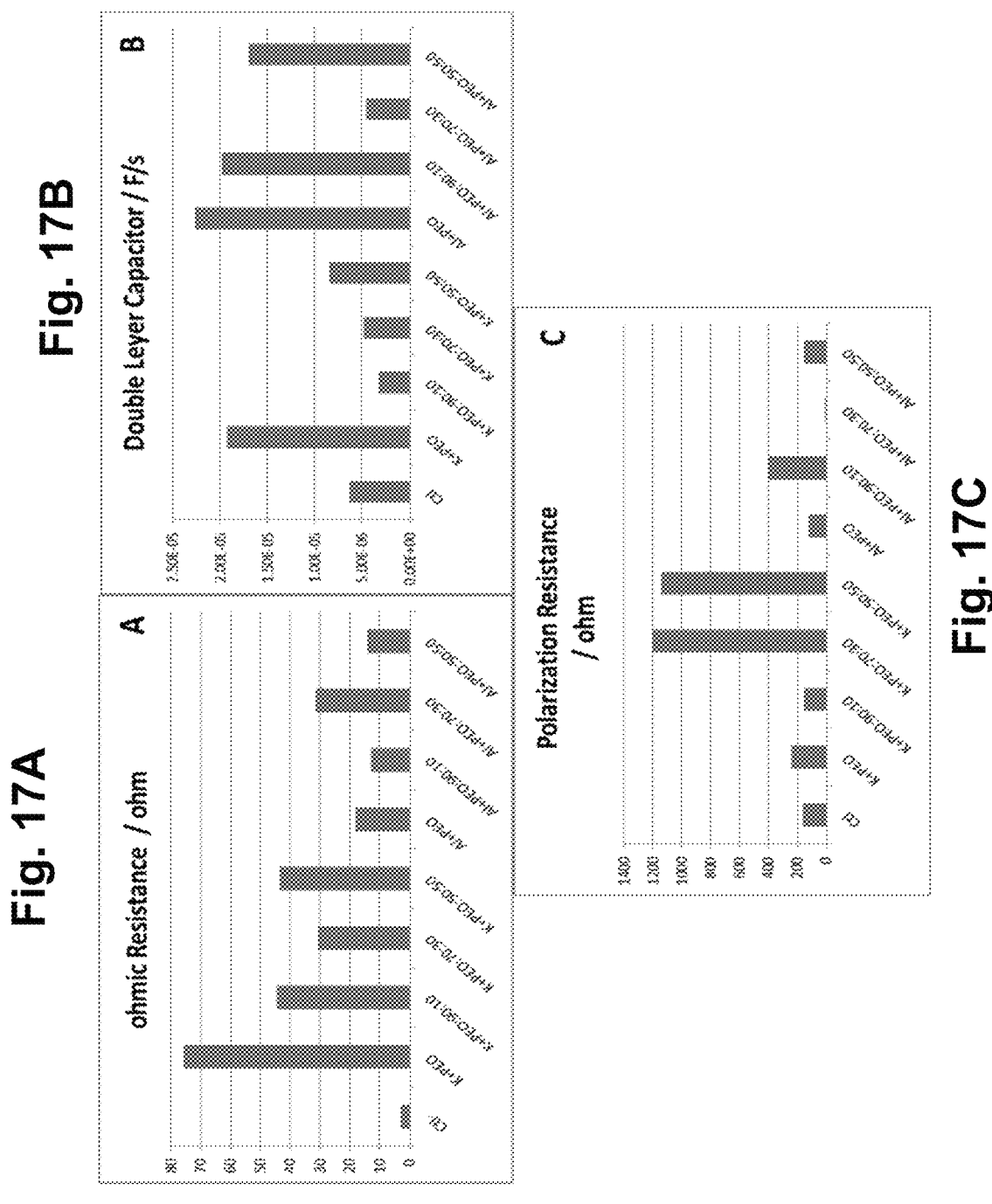
FIGS. 17A-17C: Results obtained from circuit simulation of the Nyquist plot. Displays the summary of results obtained from relationship between coin cells with different polymer coated electrolyte and 17A: ohmic resistance, 17B: double-layer capacitance, and 17C: polarization resistance

After OCV measurements, the internal ohmic resistance measurements were taken for the individual coin cells. FIG. 16 shows the definition of the measurement elements used. FIGS. 17A-17C summarizes the results obtained from circuit simulation of the Nyquist plot. Displayed in FIG. 17A is the relationship between coin cells with different polymer coated electrolyte and R1, which is defined as the electrolyte or ohmic resistance. (See FIG. 16). Displayed in FIG. 17B is the relationship between coin cells with different polymer coated electrolyte and Q1, which is defined as the double-layer capacitance. Finally, displayed in FIG. 17C is the relationship between coin cells with different polymer coated electrolyte and R2, which is the polarization resistance.

Figure 18:
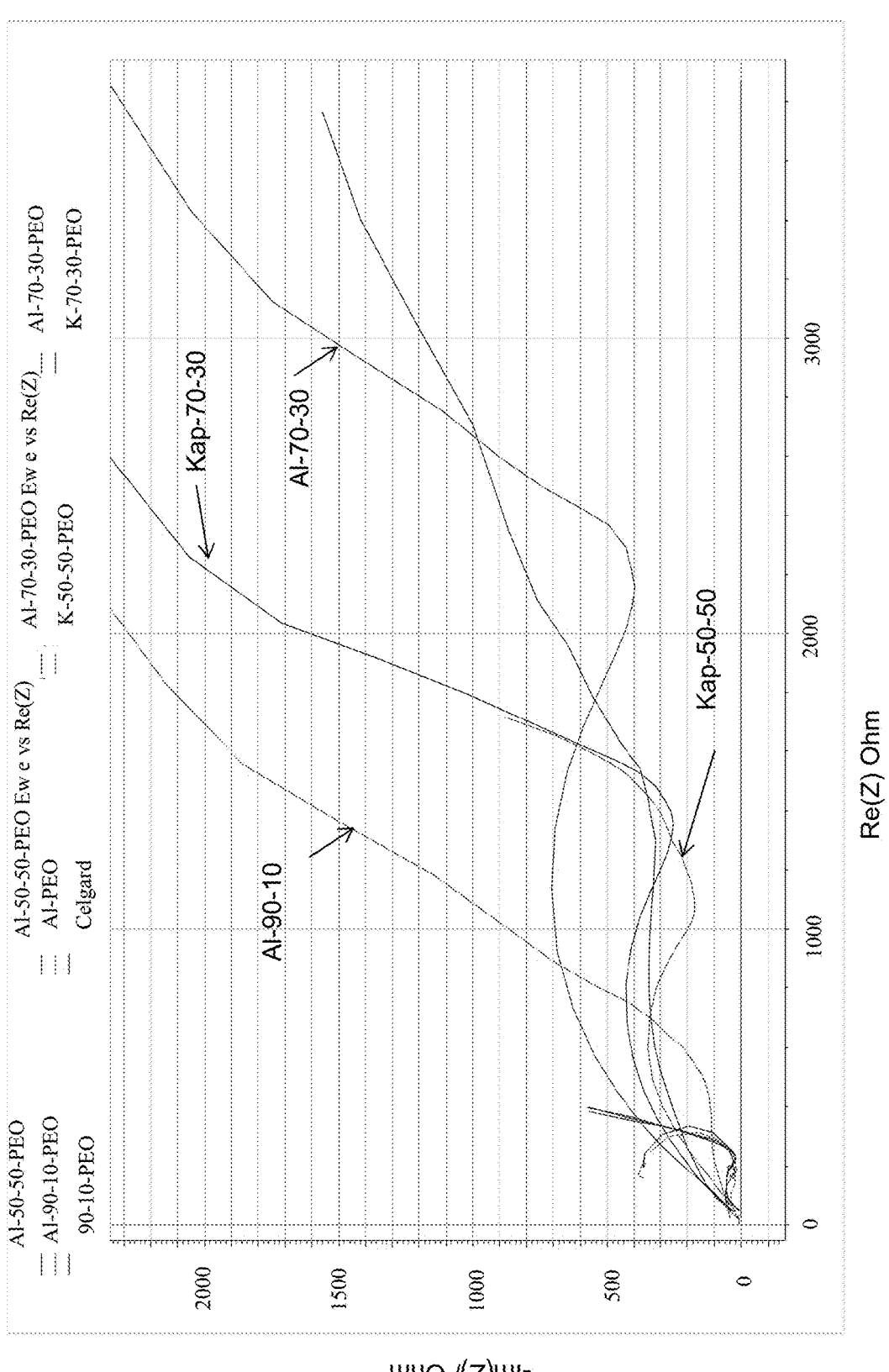
FIG. 18: The overlaid Nyquist plots of the data shown in FIGS. 16A-16C.

In general, the relationship between R1, R2 and Q1 are inversely proportional and this trend can be seen from the data. The increase in R1 or R2 indicates internal resistance increases inside of the cell. In this case all the coin cells were made the same way, with the only component that is variable is the different polymer electrolytes coated on different substrates. Therefore, the internal resistance can be attributed to the different polymer electrolytes on the substrates. It is difficult to conclude from the data which polymer electrolyte coated separator is the best without further investigation into optimized coating parameters, but generally, cells with Al mesh as a substrate show lower RA, R2 and higher Q1 in comparison to other cells. This could be due to conductivity of the Al mesh. The overlaid Nyquist plots of the data shown in FIGS. 17A-17C are displayed in FIG. 18. In the legend for FIG. 18, the identifier Al-50-50-PEO-4_03_GBS_C01.mpr: -Im(z) vs. Re(Z) has been abbreviated as Al-50-50-PEO; the identifier Al-90-10-PEO-3_02_GBS_C01.mpr: -Im(z) vs. Re(Z) has been abbreviated as Al-90-10-PEO; the identifier 90-10-PEO-1_02_GBS_C01.mpr: -Im(z) vs. Re(Z) has been abbreviated as 90-10-PEO; the identifier Al-50-50-PEO-4_03_GBS_C01.mpr: <Ew e> vs. Re(Z) has been abbreviated as Al-50-50-PEO Ew e vs. Re(Z); the identifier Al-PEO-5_03_GBS_C01.mpr: -Im(z) vs. Re(Z) has been abbreviated as Al-PEO; the identifier Celgard-3_03_GBS_C01.mpr: -Im(z) vs. Re(Z) # has been abbreviated as Celgard; the identifier Al-70-30-PEO-1_02_GBS_C01.mpr: <Ew e> vs. Re(Z) has been abbreviated as Al-70-30-PEO Ew e vs. Re(Z); the identifier K-50-50-PEO-4_02_GBS_C01.mpr: -Im(z) vs. Re(Z) has been abbreviated as K-50-50-PEO; the identifier Al-70-30-PEO-1_02_GBS_C01.mpr: -Im(z) vs. Re(Z) has been abbreviated as Al-70-30-PEO and the identifier K-70-30-PEO-3_02_GBS_C01.mpr: -Im(z) vs. Re(Z) has been abbreviated as K-70-30-PEO.

Figure 19:
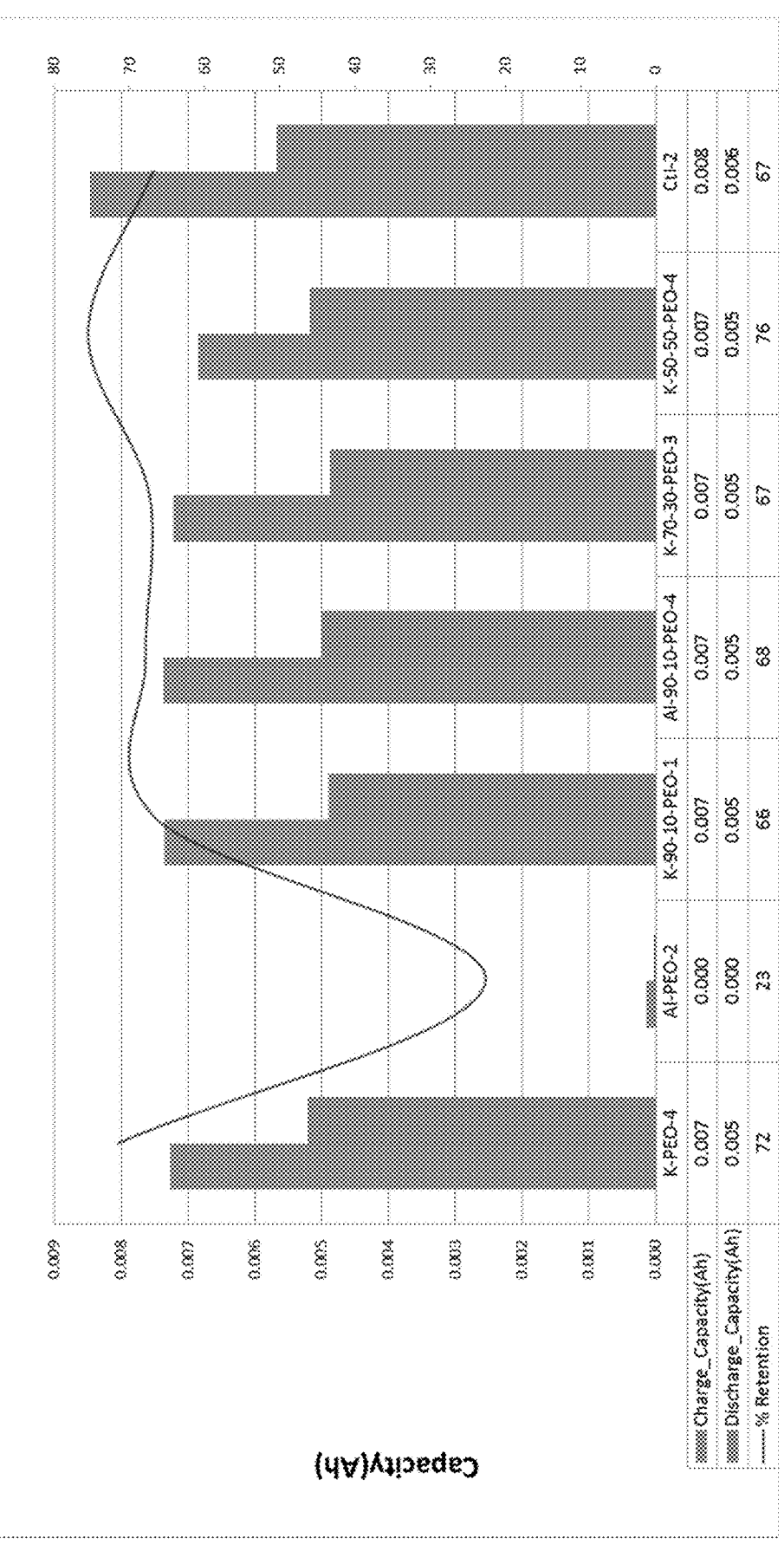
FIG. 19: First cycle charge capacity, discharge capacity and percent retention of the coin cells with different polymer separator of Example 3.

Results of 1$^{st}$ cycle electrochemical data is displayed in FIG. 19 below. FIG. 19 shows the first cycle charge capacity, discharge capacity and percent retention of the coin cells with different polymer separators. The charge capacity indicated by the left hand column and the discharge capacity indicated by the right hand column are plotted on the Y1 axis (left side) and the percent retention of the charge capacity indicated by the curve is plotted on Y2 axis (right side).

The cells were charged at C/10 to 4.2V and discharged at a rate of C/10 to 2.5 V. The designed capacity for the cells were 6 mAh and on an average 5 mAh were extracted. Generally, cells with Kapton separator performed better then cells with Al mesh. Cells with Kapton coated with PEO showed the best results. Cells with Kapton: PEO: 90:10 type of polymer separator were selected for further cycling.

Figures 20A, 20B:
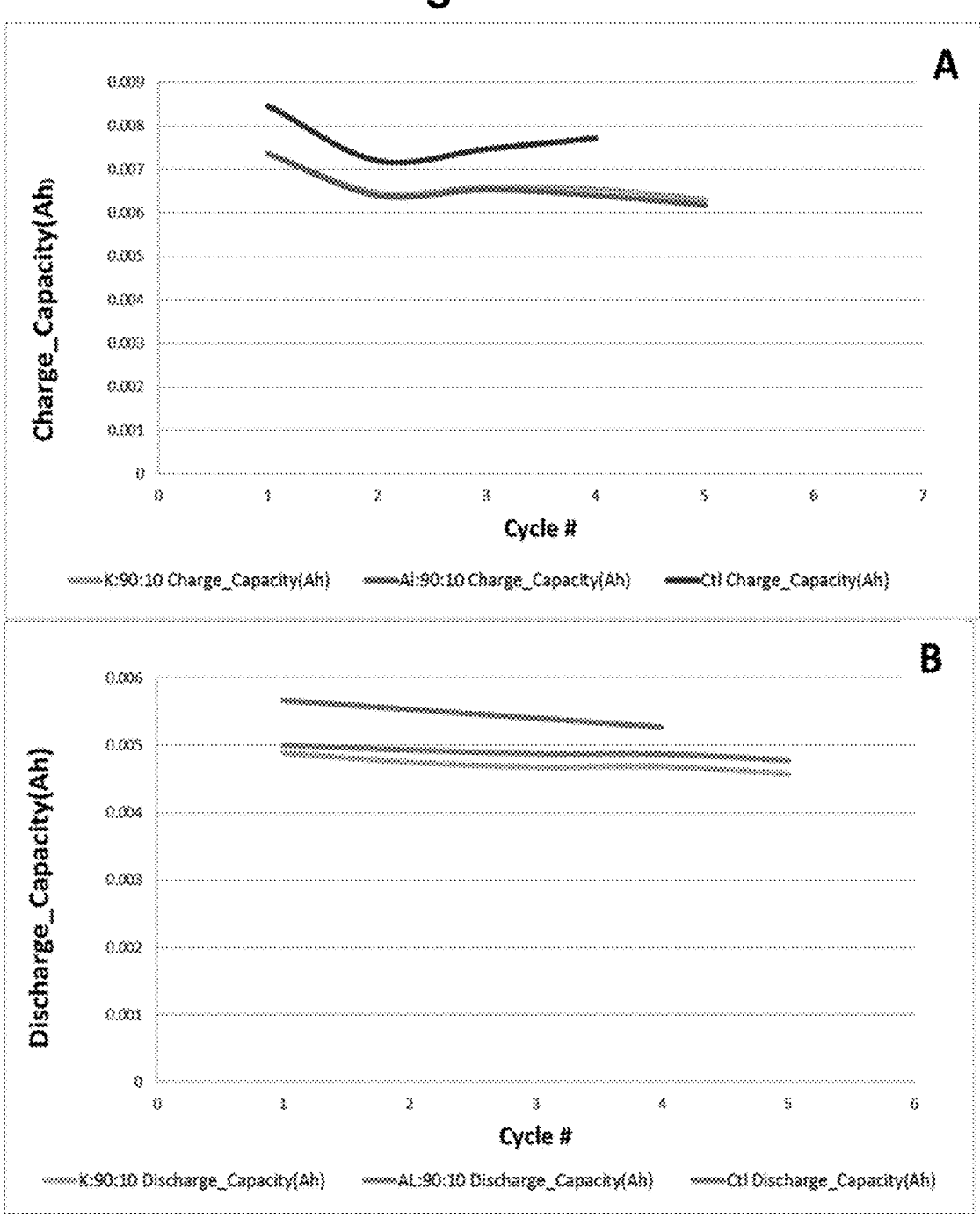
FIGS. 20A-20B: shows the cycle life of the cell in Example 3. First cycle with PEO:90:10 configuration coated on Kapton and Al mesh.

Shown in FIG. 20A is the charge capacity cycle life comparison of cells with PEO: 90:10 configuration of polymer electrolyte coated on Kapton and Al mesh against control cell. Control cells display higher capacity through 4 cycles. No difference is observed between polymer electrolytes coted on Kapton or Al mesh. Shown in FIG. 19B is the discharge capacity cycle life comparison of cell with PEO: 90:10 configuration of polymer electrolyte coated on Kapton and Al mesh against the control cell. Polymer electrolyte coated in Al had slightly higher discharge capacity than polymer coated on Kapton. At this time in the experiment, more cycle data is needed to draw a firm conclusion that this performs better than the control cell however.

FIG. 20A-20B: shows the cycle life of cells. First cycle with PEO:90:10 configuration coated on Kapton and Al mesh. FIG. 20A. Charge cycle. FIG. 20B. Discharge cycle.

Example 4: PVDF Polymer Base Slurry Coated on Supports

Kapton (K) separator and aluminum (Al) mesh were coated with various combinations of slurry made of Polyvinylidene fluoride (PVDF), Lithium-titanate (LTO), Carbon Filler (CF) and Graphite (G). The descriptions and concentrations of these PVDF based slurry coated separators are displayed in Table 3 below.

TABLE 3

| Separator Formulation Name | Substrate | PVDF Binder Amount wt % | Active Material wt % | Conductive Filler wt % |
|---|---|---|---|---|
| K + PVDF | Kapton | 100 | 0 | 0 |
| K + PVDF + LTO | Kapton | 30 | 60 | 10 |
| K + PVDF + LTO + CF | Kapton | 35 | 65 | 0 |
| K + PVDF + G | Kapton | 35 | 65 | 0 |
| AL + PVDF | Al mesh | 100 | 0 | 0 |
| AL + PVDF + LTO | Al mesh | 30 | 60 | 10 |
| AL + PVDF + LTO + CF | Al mesh | 35 | 65 | 0 |
| AL + PVDF + G | Al mesh | 35 | 65 | 0: |

Figure 21:
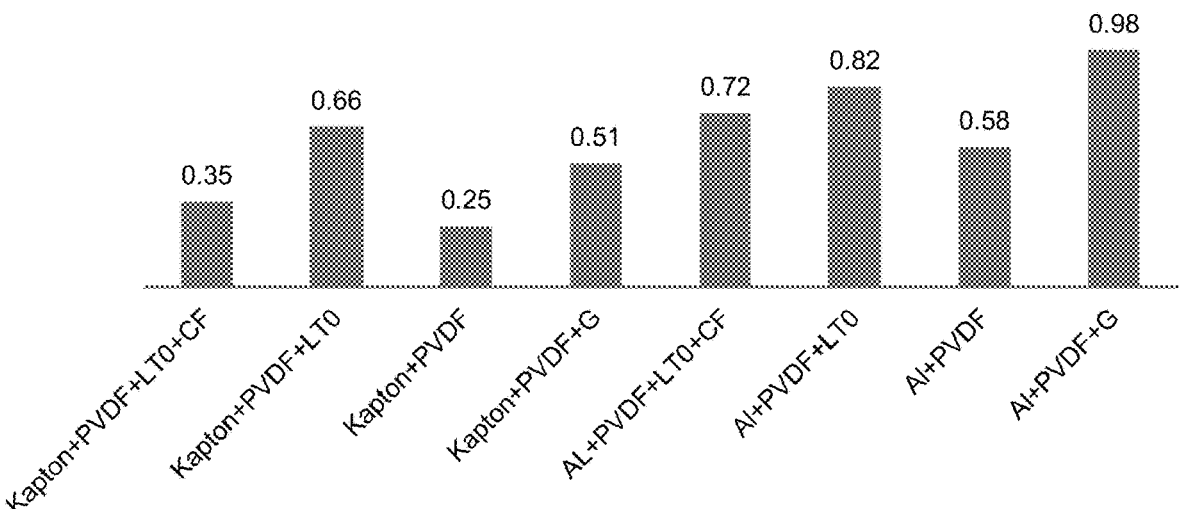
FIG. 21 Coating weights of PVDF based slurry coated separators in Example 4.

The coating weights per area of these separators are displayed in FIG. 21. PVDF slurry coated on Al substrates gave higher coating weights on average, with the formulation of PVDF with Graphite giving the highest coating loading within the group of tests. Weights are in g/cm$^2$.

Figures 22A, 22B, 22C, 22D, 22E, 22F:
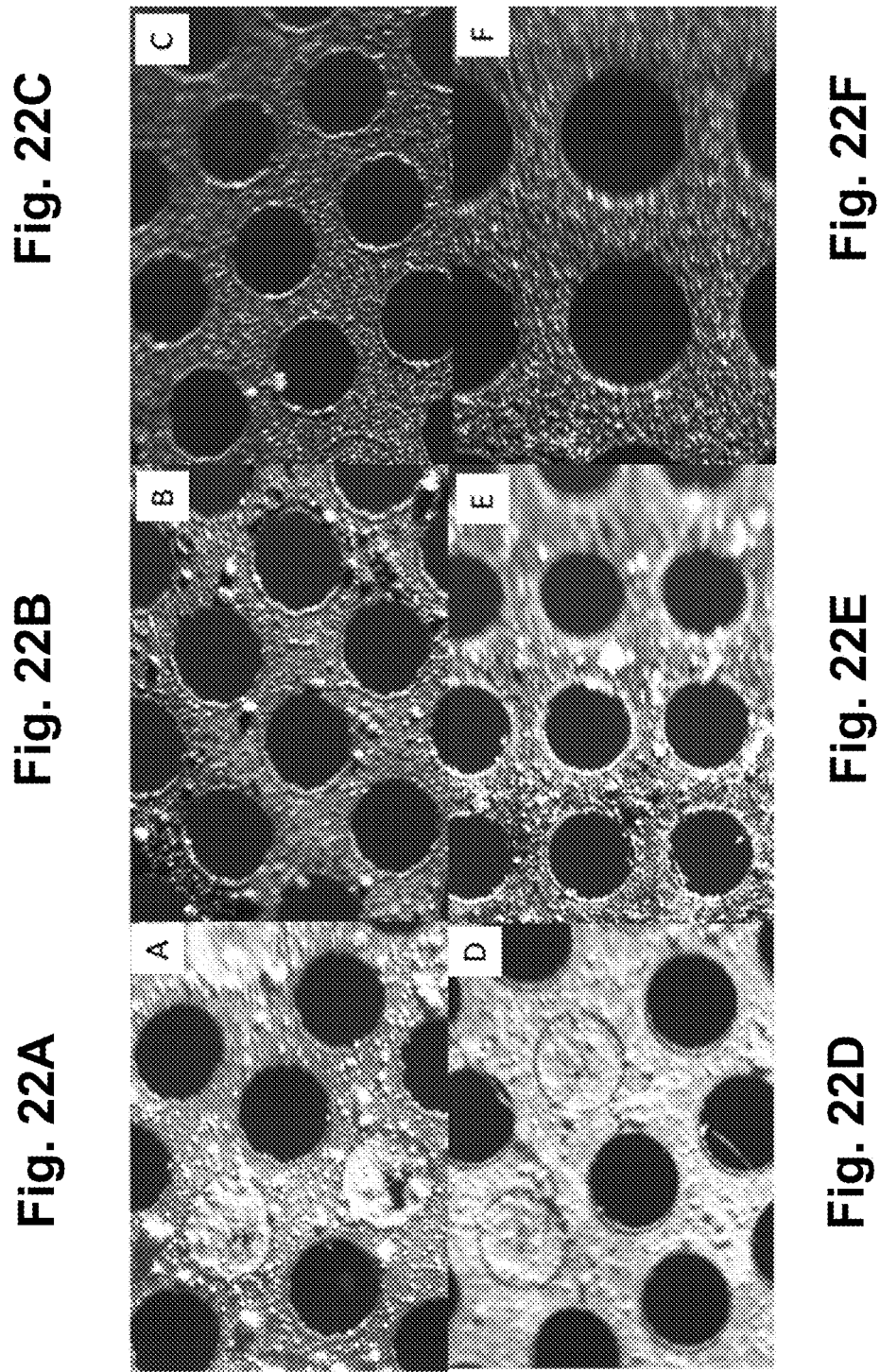
FIG. 22A-22F: Microscope images of substrates coated with PVDF base slurries.

Microscope images of substrates coated with PVDF base slurries: FIG. 22A: Kapton coated with PVDF and LTO slurry. FIG. 22B: Kapton coated with PVDF, LTO, and CF slurry. FIG. 22C: Kapton coated with PVDF, and graphite slurry. FIG. 22D: Al mesh coated with PVDF and LTO slurry. FIG. 22E: Al mesh coated with PVDF, LTO and CF slurry. FIG. 22F: Al mesh coated with PVDF, and graphite slurry.

Figure 23:
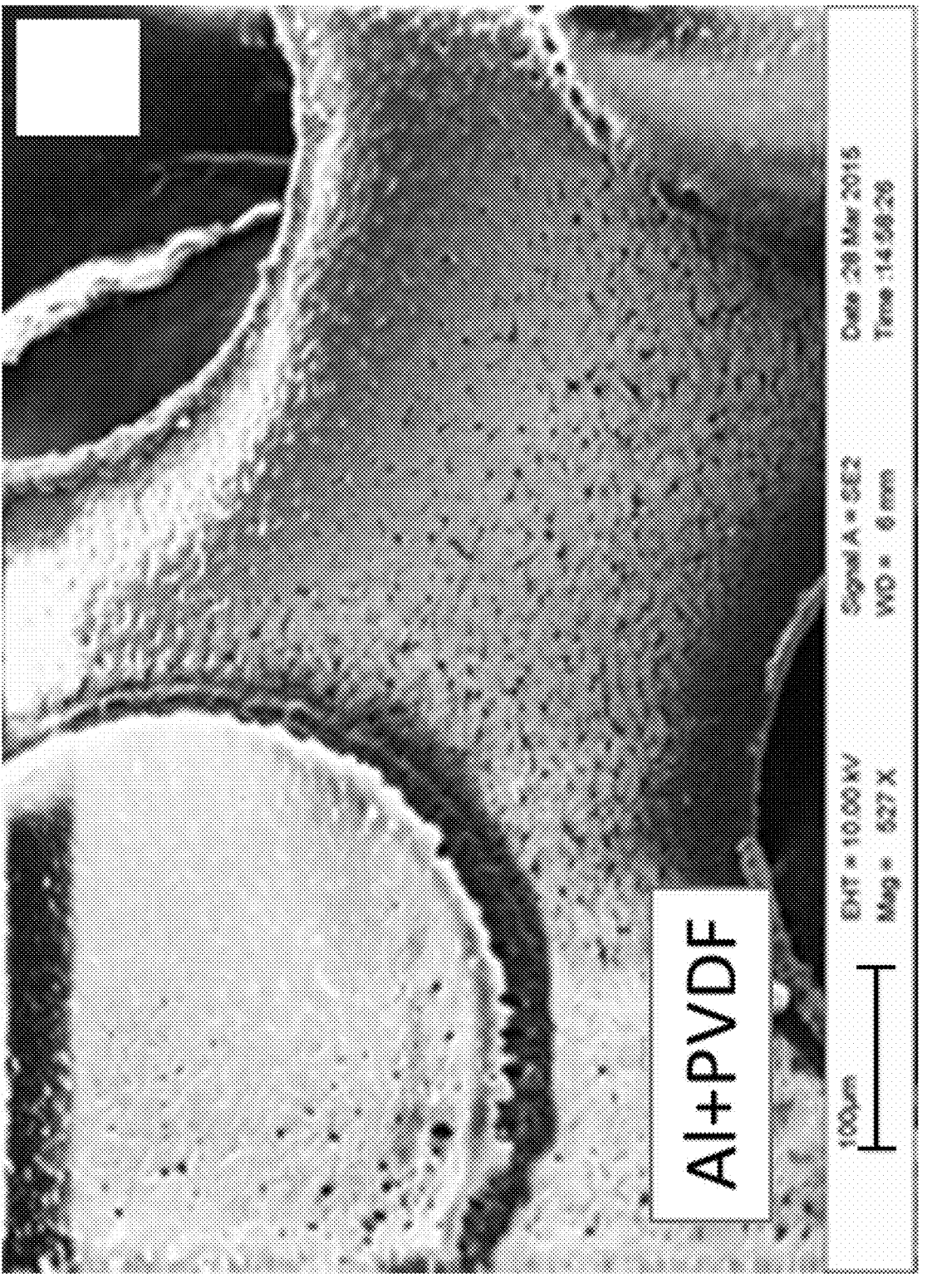
FIG. 23: SEM image of Al mesh coated with PVDF.

The microscope images of these Kapton and Al mesh coated PVDF based slurry in FIGS. 22A-22F show that on both substrates the slurry coated with PVDF and graphite formulation covers the surfaces more smoothly and uniformly in comparison to coatings with PVDF and LTO slurry. Rough surfaces can result in micro shorts during the coin cell assembly. FIGS. 22A-22F also shows that with manipulation of the slurry viscosity it is possible to fill in the all the pores of the substrate. Further experiments can be conducted. The PVDF polymer can fill in the holes completely at the current dimensions as can be seen in FIG. 23D and SEM image of FIG. 23 showing Al mesh coated with PVDF.

Figure 24A:
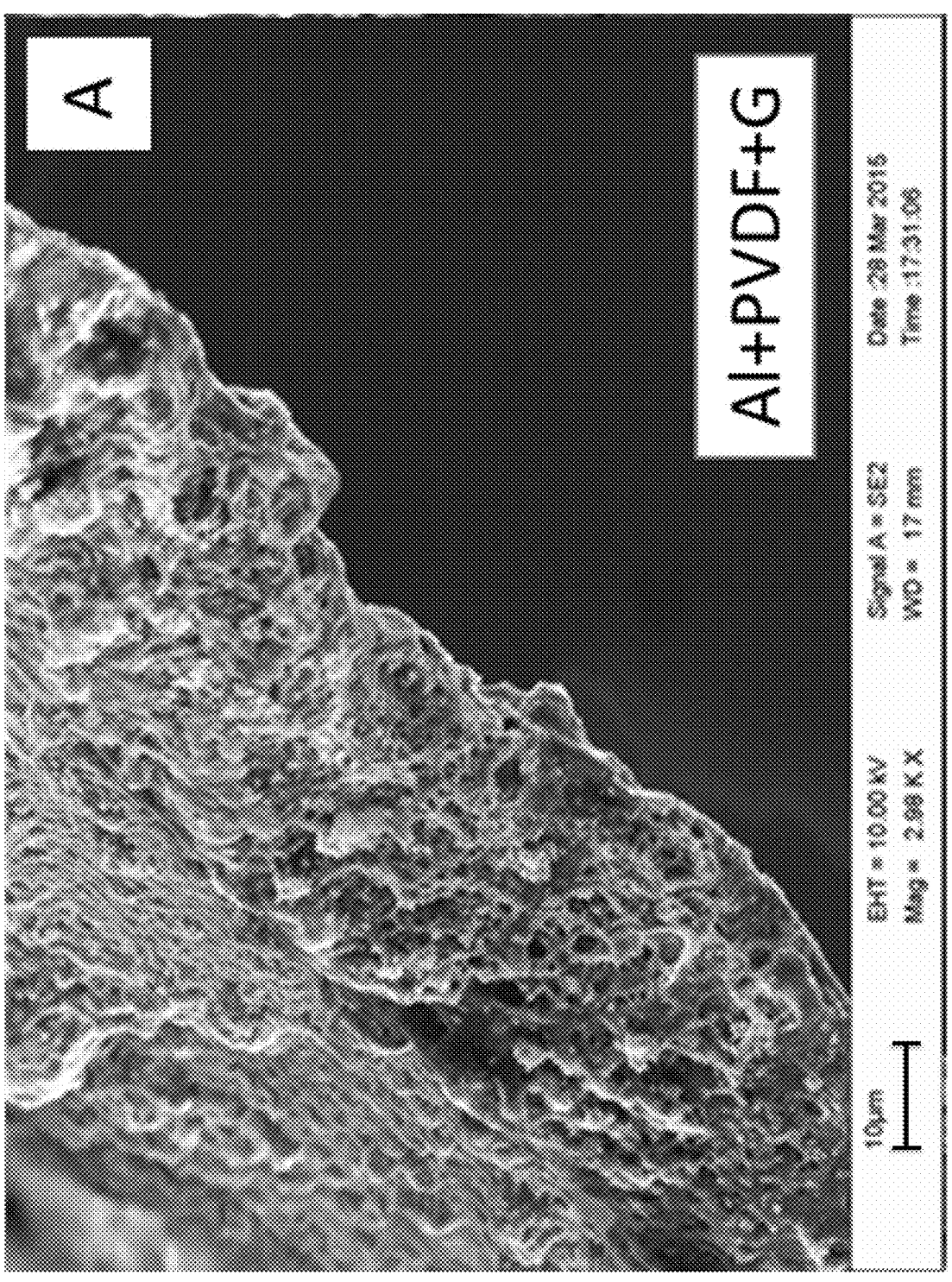
FIGS. 24A and 24B: SEM image of Al (FIG. 24A) mesh and Kapton (FIG. 24B) coated with PVDF and graphite slurry.
Figure 24B:
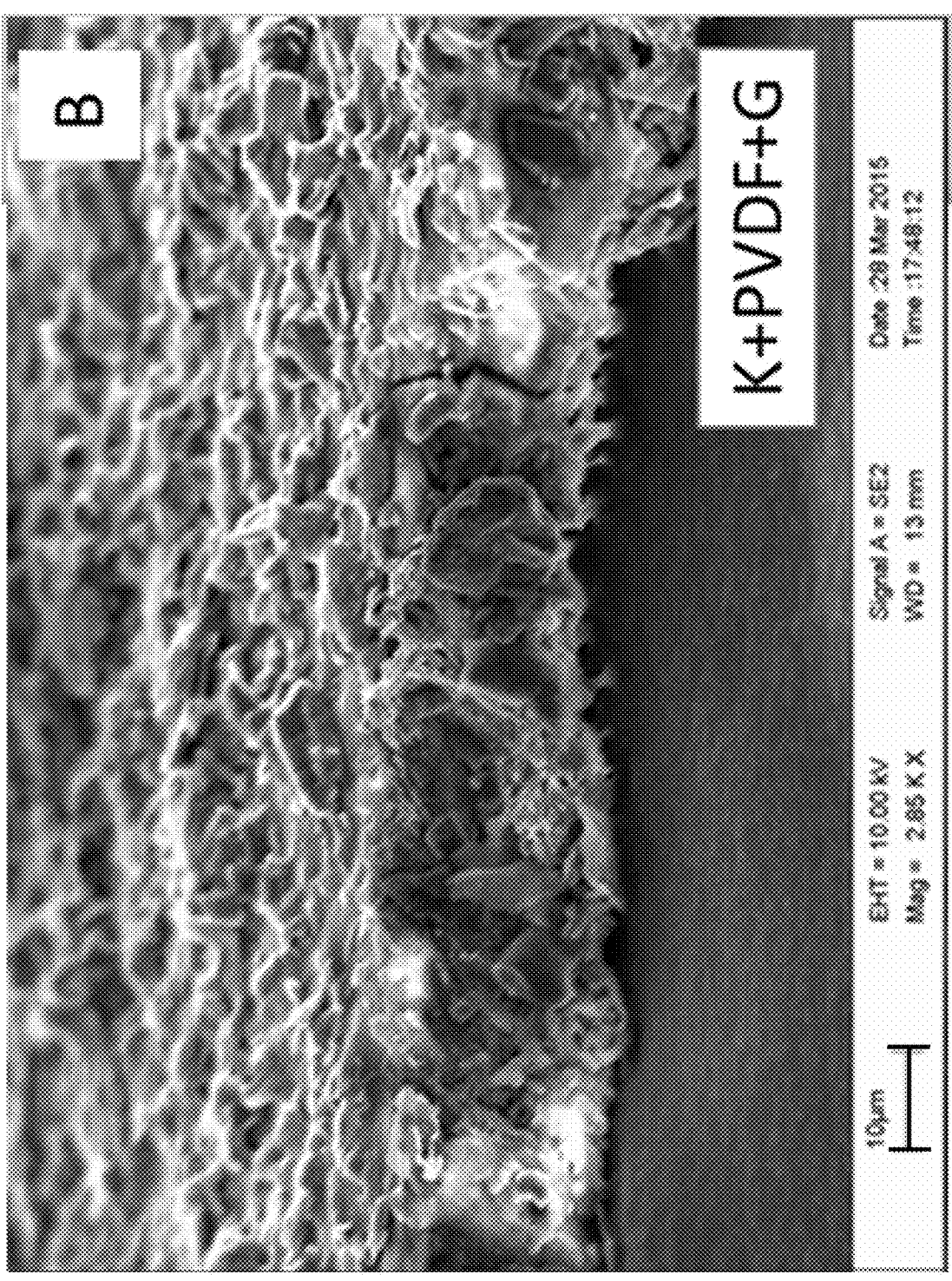

FIGS. 24A and 24B show SEM images of Al (FIG. 24A) mesh and Kapton (FIG. 24B) coated with PVDF and graphite slurry.

Displayed in FIGS. 24A and 24B are Kapton and Al mesh coated with PVDF and graphite slurry with an edge on view. It is difficult to distinguish the difference between substrate and the polymer electrolyte layers for precise thickness calculations but the overall thickness is approximately 20 microns. Fracturing of the samples using liquid nitrogen for end on analysis or cutting with a diamond blade should provide more exact dimensional details in the future should that be needed.

Half cells in coin cell format were prepared in a glovebox using these PVDF polymer based slurry coated separators, LCO cathodes, Li anodes, and two different electrolytes (EC/DMC with 1M $LiPF_6$ and DMC with 1M $LiPF_6$).

Figure 25:
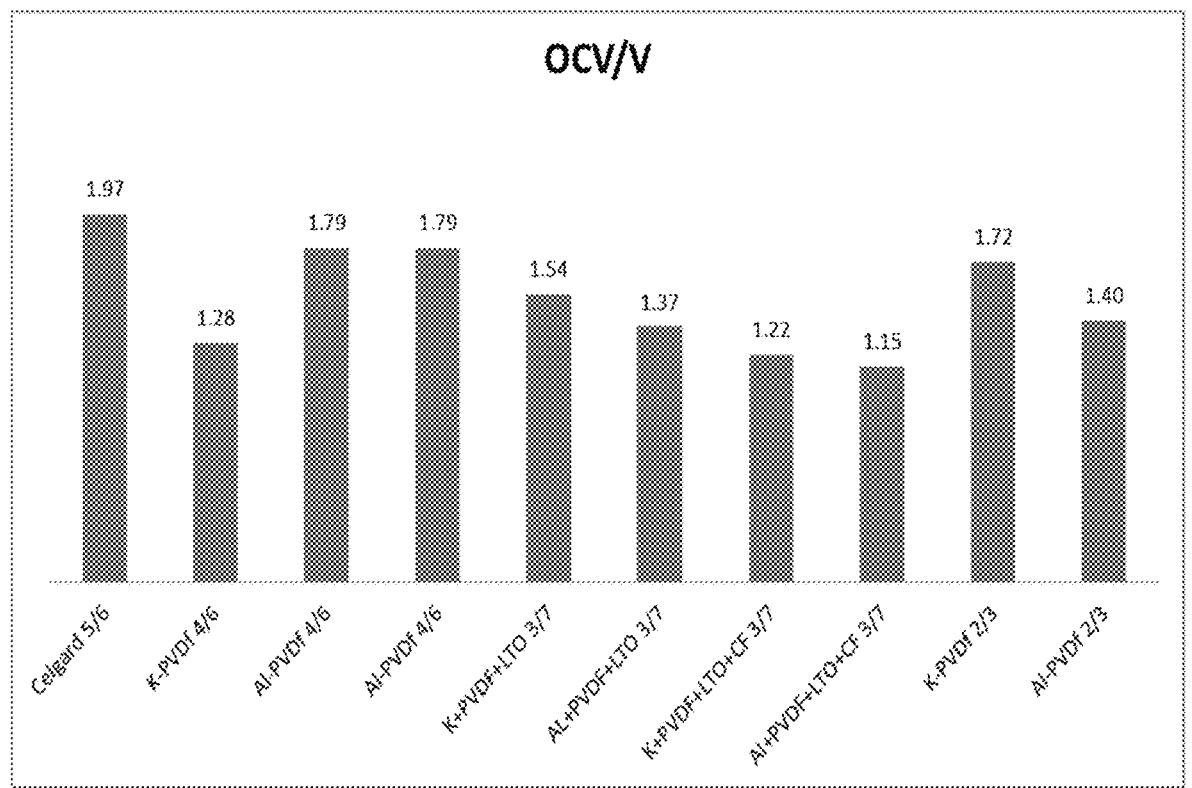
FIG. 25 Average open circuit voltage (OCV) measurements of the LCO half coin cells in Example 4.

FIG. 25 shows average open circuit voltage (OCV) measurements of the LCO half coin cells made with PVDF base slurries. The fraction next to the name of the cell represents the number of working cells yielded over the total number of cells attempted. The figure displays the average OCV in volts of the working cells. Overall, all the cells had low OCV and the yields of functioning coin cells were relatively low. This was attributed to use of two different types of electrolyte. Coin cell mechanics, cathode electrode (punched edges), quality of Li and crimper also can contribute to bad yield.

Figure 26A:
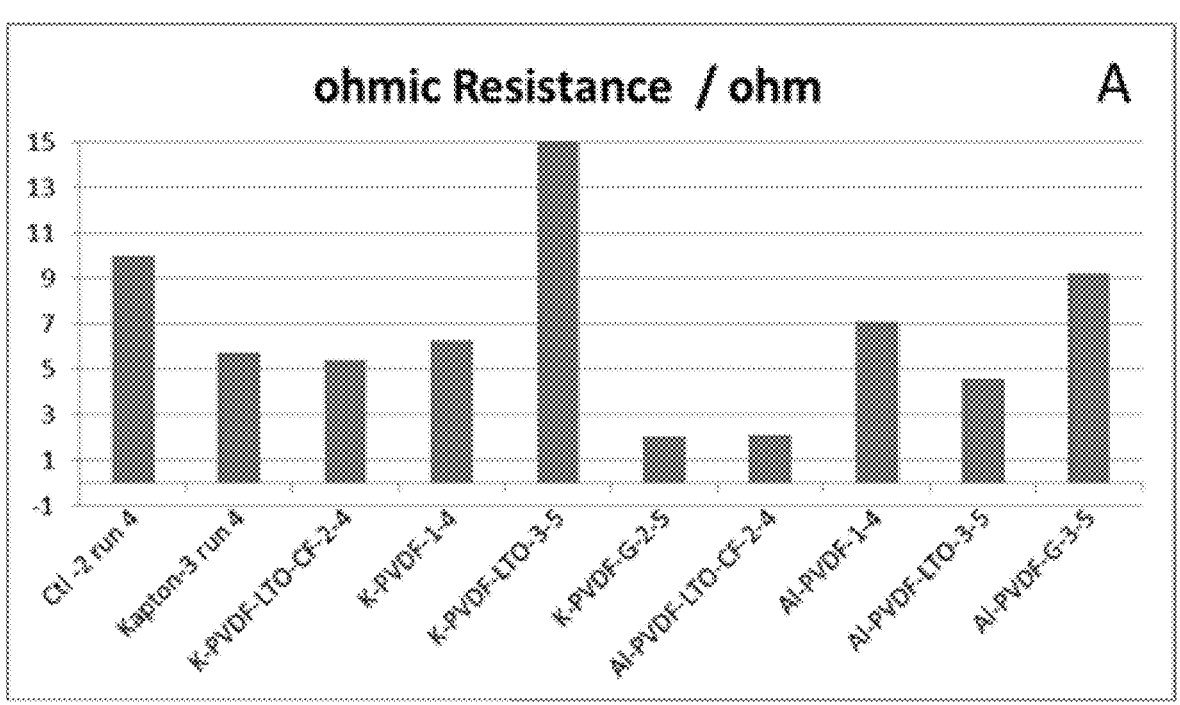
FIGS. 26A-26C summarize the results obtained from circuit simulation of the Nyquist plot. Displayed is the summary of results in the relationship between coin cells with different polymer coated electrolyte
Figure 26B:
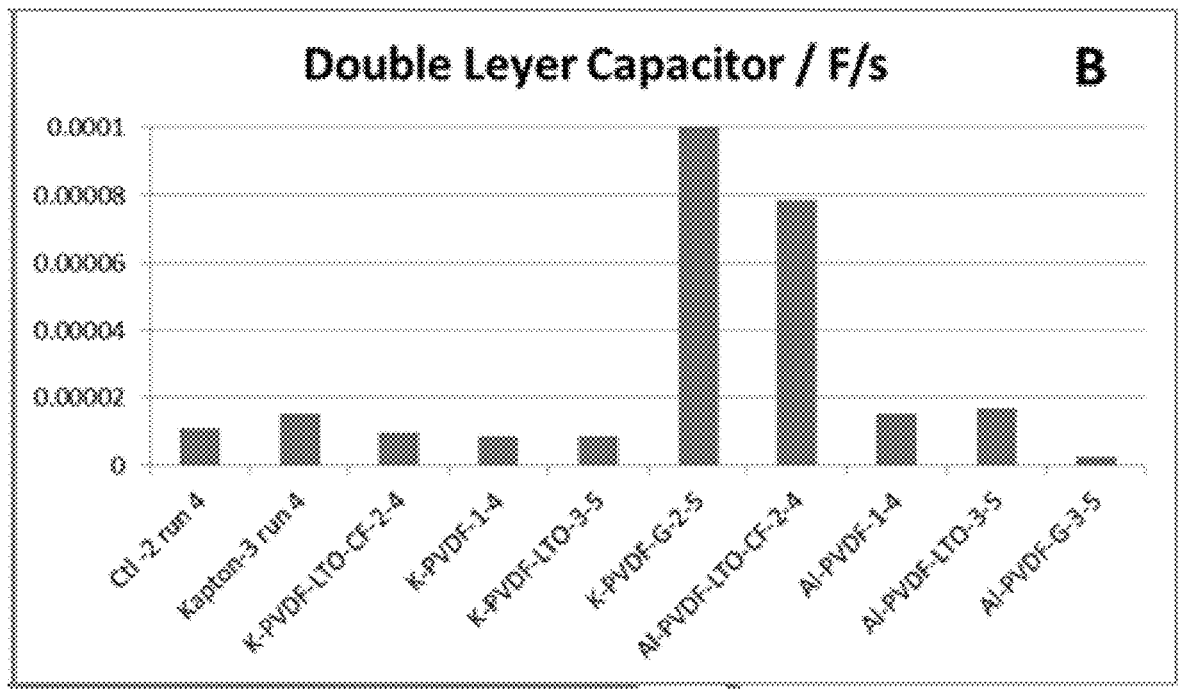
Figure 26C:
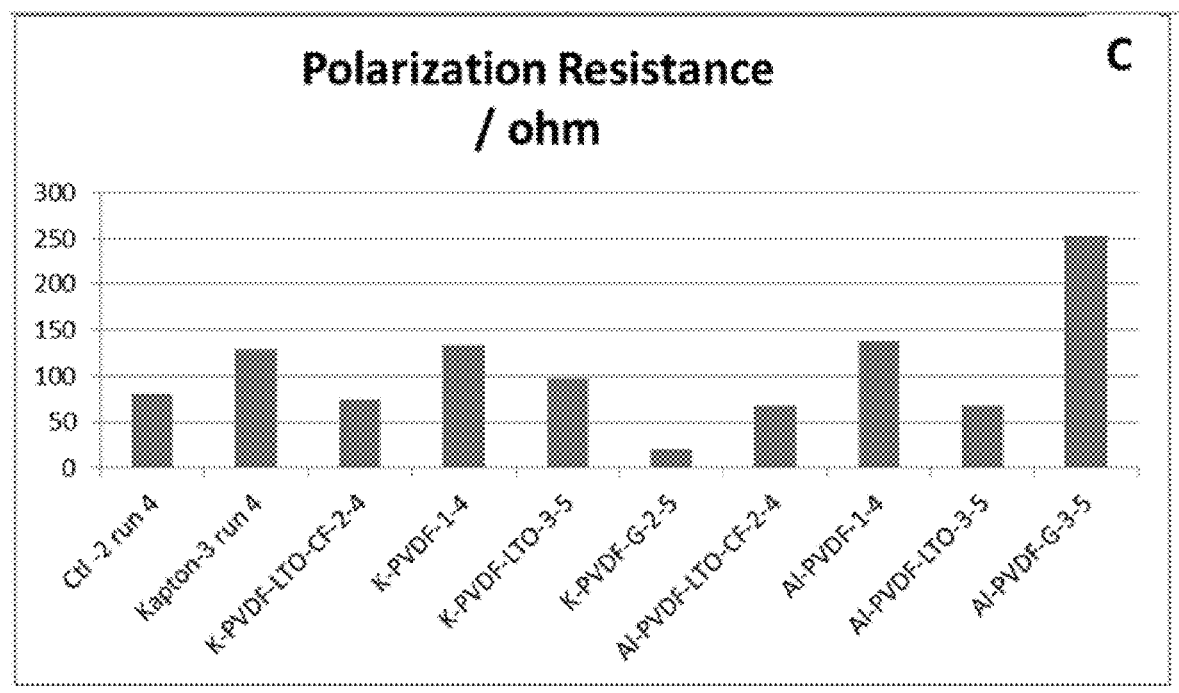

After OCV measurements were taken, the internal ohmic resistance measurements were recorded for individual coin cells. FIGS. 26A-26C summarize the results obtained from circuit simulation of the Nyquist plot. Displayed in FIG. 26A is the relationship between coin cells with different polymer coated electrolytes and R1, which is defined as the electrolyte or ohmic resistance. (See FIG. 16). Displayed in FIG. 26B is the relationship between coin cells with different polymer coated slurry and Q1, which is defined as the double-layer capacitance. Finally, displayed in FIG. 26C is the relationship between coin cells with different polymer coated electrolyte and R2, which is defined as the polarization resistance.

Figure 27:
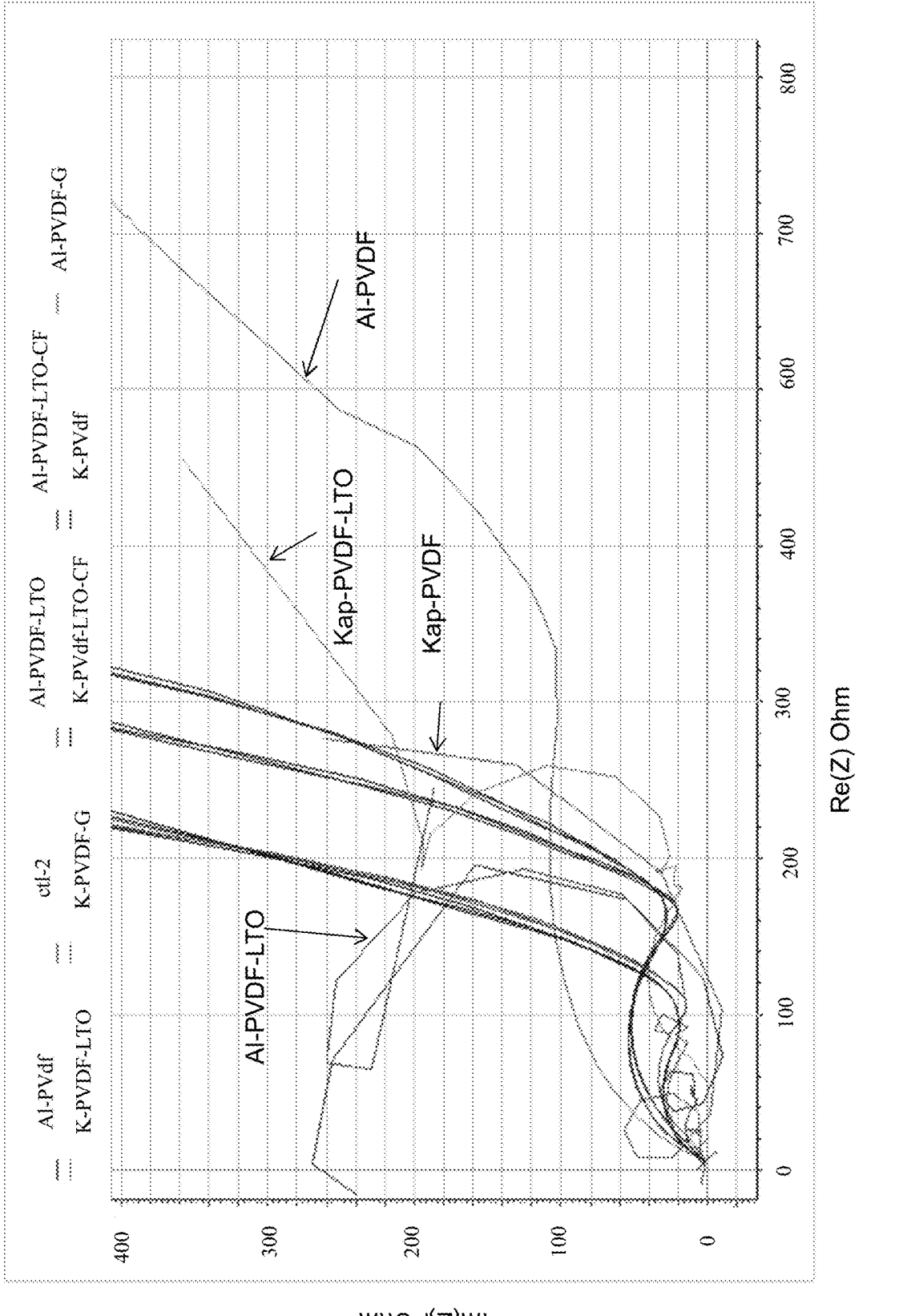

In general, relationship between R1, R2 and Q1 are inversely proportional. The increase in R1 or R2 indicates internal resistance increases inside of the cell. In this case all the coin cells were attempted to be made the same way, with the only component that was changed was the different polymer electrolytes coated on different substrates in theory. Therefore, the internal resistance differences can be attributed to the different polymer electrolytes substrates used. It is difficult to conclude from this initial data which polymer electrolyte coated separator is the best performing. As can be seen in overlaid Nyquist plot in FIG. 27 the data was very inconsistent. These inconsistent results could have been a result of two different electrolyte lots that were needed to complete the series of experiments. Ideally no other changes would have been made during the assembly of these cells. However, the coin cell spacers and the springs were changed through the series of builds and so drawing a firm conclusion from one cell to the next is not reliable. To get a reliable data it is important to the experiments consistent with only one variable changed at a time. It is recommended that these results obtained are repeated. In the legend for FIG. 27, the identifier Al-PVdf-1_02_GBS_C01.mpr has been abbreviated as Al-PVdf; the identifier K-PVDF-LTO-3_03_GBS_C01.mpr has been abbreviated as K-PVDF-LTO; the identifier ctl-2_02_GBS_C01.mpr has been abbreviated as ctl-2; the identifier K-PVDF-G-2_03_GBS_C01.mpr has been abbreviated as K-PVDF-G;

the identifier Al-PVDF-LTO-3_03_GBS_C01.mpr has been abbreviated as Al-PVDF-LTO; the identifier K-PVdf-LTO-CF-2_02_GBS_C01.mpr has been abbreviated as K-PVdf-LTO_CF; the identifier Al-PVDF-LTO-CF-2_03_GBS_C01.mpr has been abbreviated as Al-PVDF-LTO-CF; the identifier K-PVdf-1_02_GBS_C01.mpr has been abbreviated as K-PVdf; and the identifier Al-PVDF-G-3_03_GBS_C01.mpr has been abbreviated as Al-PVDF-G.

Figure 28:
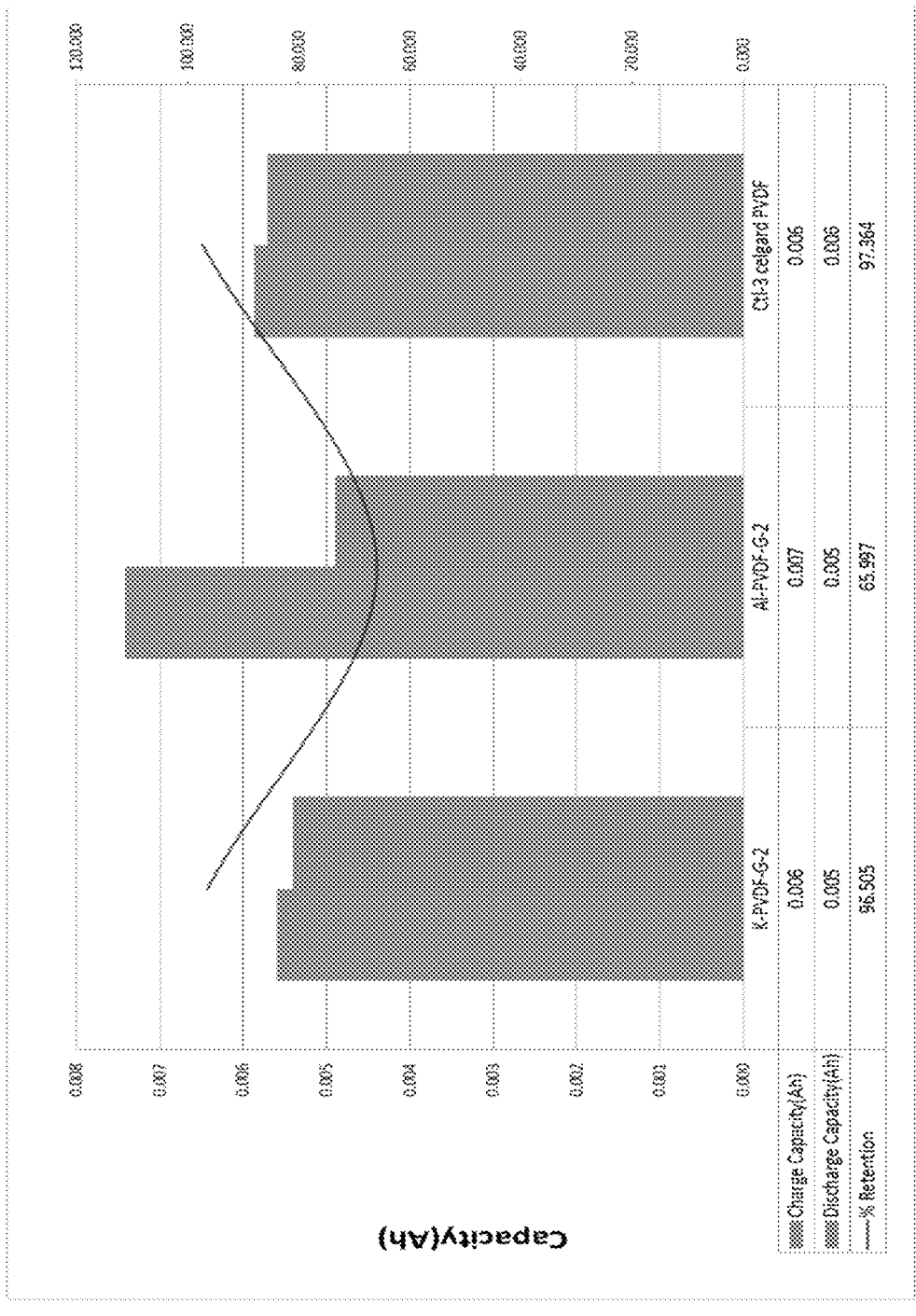
FIG. 28: First cycle charge capacity, discharge capacity, and percent retention of the coin cells with Kapton and Al mesh coated with PVDF and graphite slurry.

Due to the number of Arbin channels available, only the PVDF and graphite slurry coated Kapton and Al mesh cell were selected to be cycled. The electrochemical data displayed in FIG. 28 is of those cells, where the 1$^{st}$ cycle is shown. FIG. 28: First cycle charge capacity, discharge capacity, and percent retention of the coin cells with Kapton and Al mesh coated with PVDF and graphite slurry. The charge capacity indicated by the left column and the discharge capacity indicated by the right column are plotted on the Y1 axis (left side) and the percent retention of the charge capacity indicated with by the curve is plotted on Y2 axis (right side).

The cells were charged at C/10 to 4.2V and discharged at rate of C/10 to 2.5 V. The designed capacity for the cells was calculated to be 6 mAh and on an average 5 mAh was extracted from these cells. The early results show that cells with Al substrate displayed the lowest percent retention at 66%, in comparison to cells with the Kapton substrate at 97%.

Figures 29A, 29B:
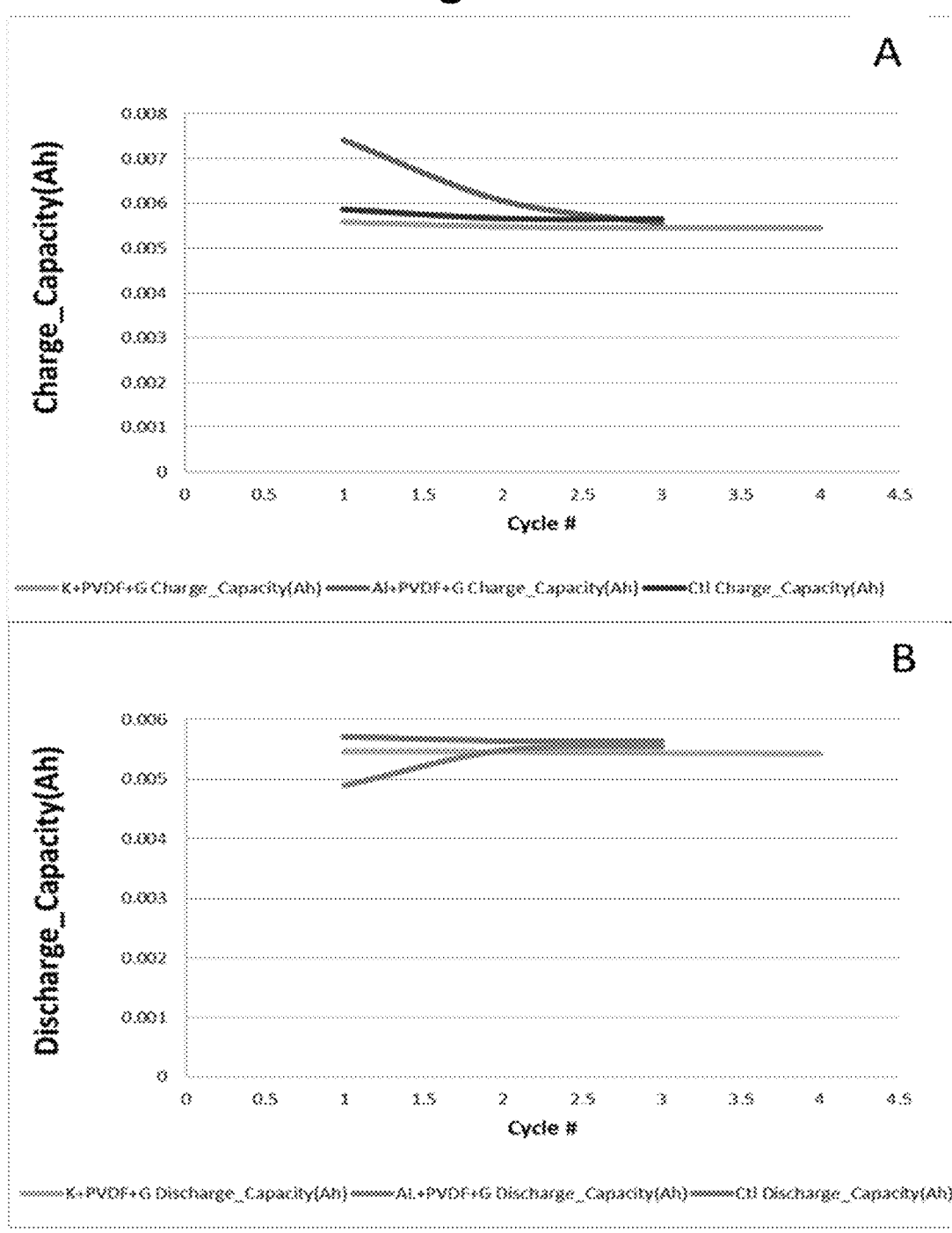
FIGS. 29A-29B: Cycle life of cells with Kapton and Al mesh substrate coated with PVDF and graphite slurry.
Figure 30:
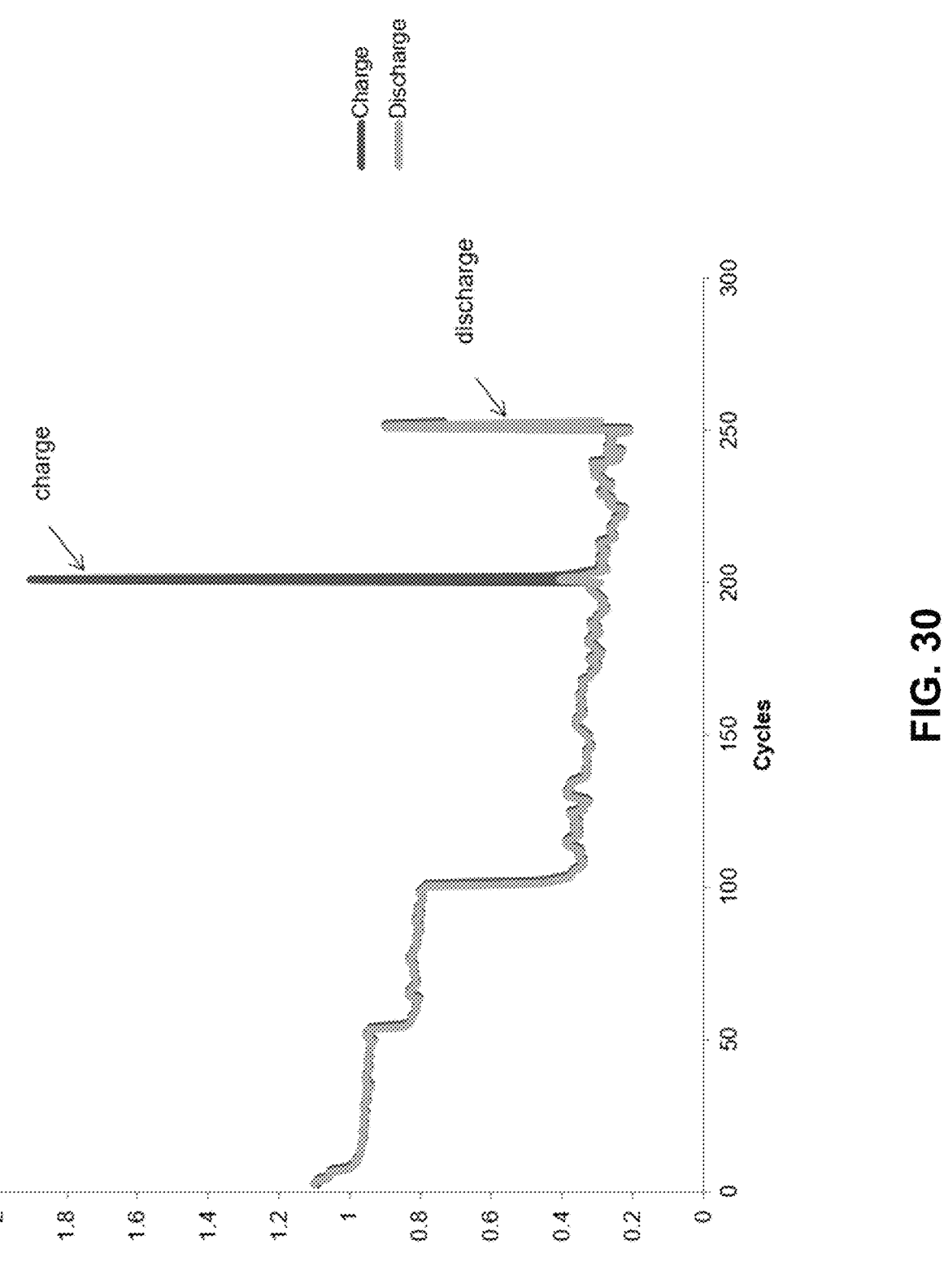
FIG. 30: Capacity (mAh) versus cycles for a $LiTiO_2$, Toray®, Al, lithium cell.
Figure 31:
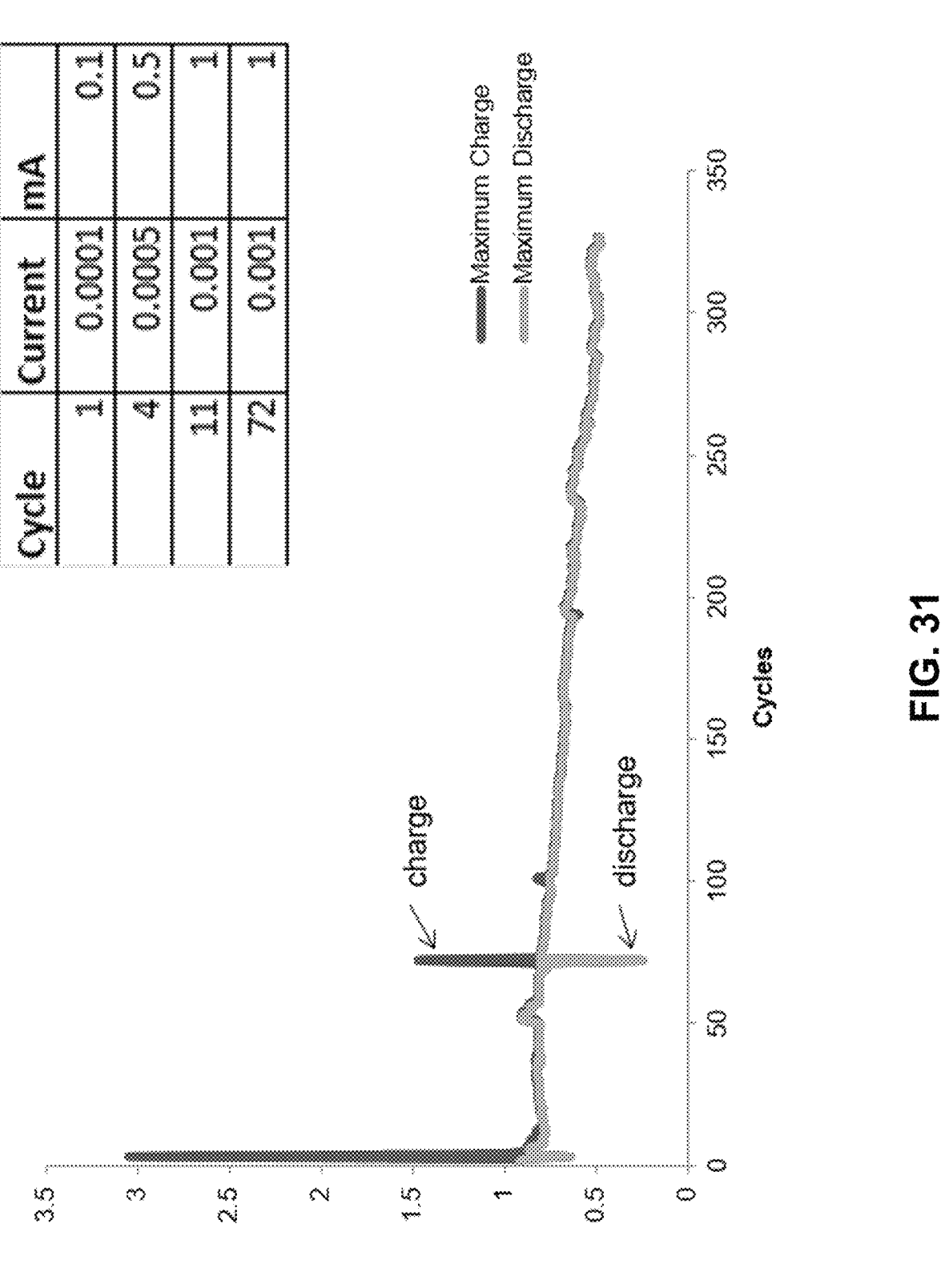
FIG. 31: Capacity (mAh) versus cycles for a $LiTiO_2$, Celgard®, Cu, lithium cell.
Figure 32:
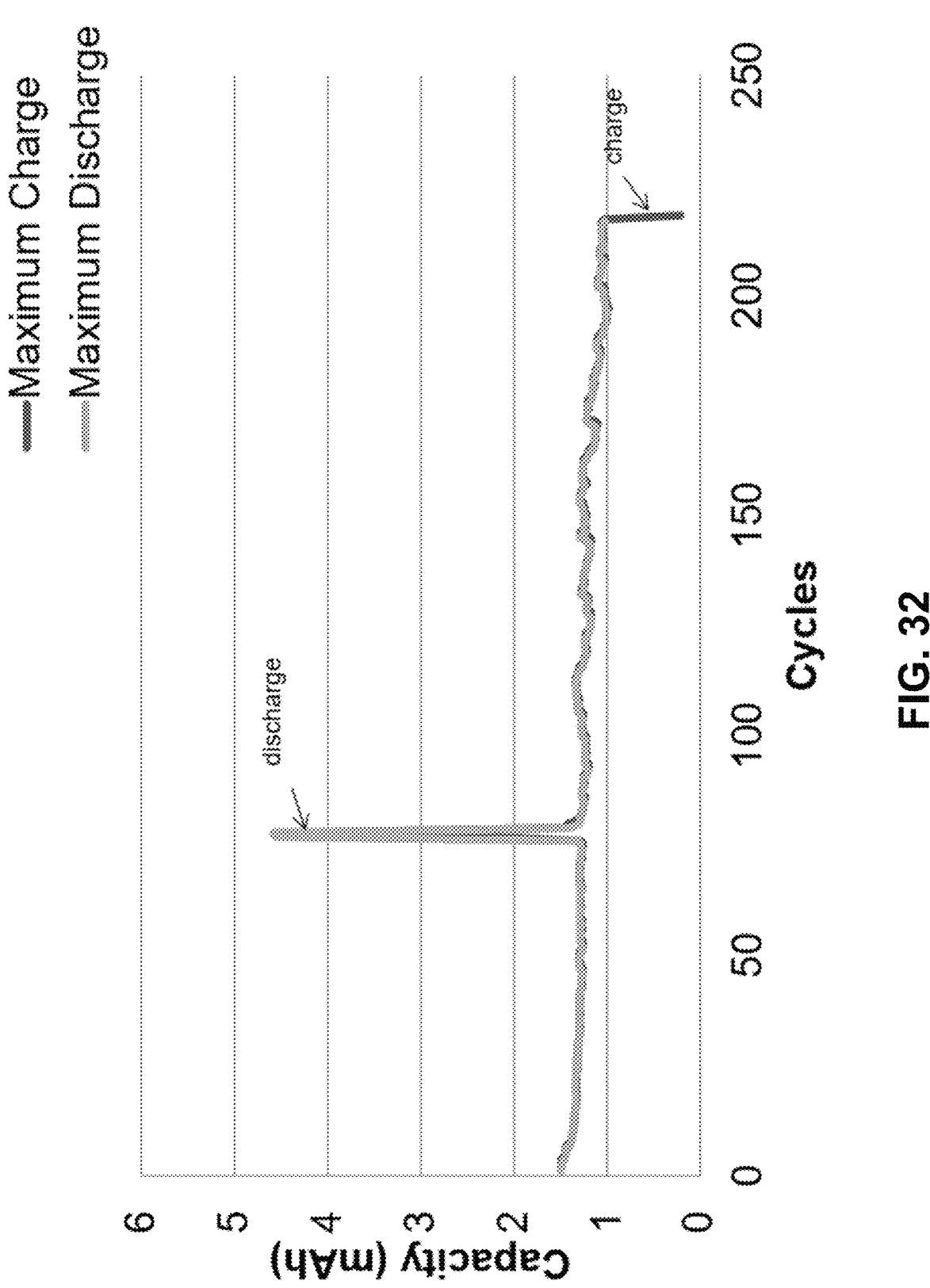
FIG. 32: Capacity (mAh) versus cycles for a $LiTiO_2$, Celgard®, Ni, lithium cell.

Shown in FIG. 29A is the charge capacity cycle life comparison of cells with K+PVDG+G, Al+PVDF+G, and the control separator. Other than the initial drop in charge capacity there is no difference that can yet be observed between polymer electrolytes coated on Kapton or Al mesh in the cycle history. This will continue to be monitored over time for variations. Shown in FIG. 29B is the discharge capacity cycle life comparison of cell with K+PVDG+G, Al+PVDF+G and the control separator. At this time, more cycles are still needed for any conclusions to be drawn and the cycling will continue.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The invention claimed is:

1. An electrochemical lithium ion cell comprising:
an anode comprising a primary active anode material and a first current collector in electronic communication with the primary active anode material, wherein the anode comprises lithium and a first carbonaceous material;

a cathode comprising a primary active cathode material and a second current collector in electronic communication with the primary active cathode material;
one or more electrolytes positioned between said anode and said cathode; said one or more electrolytes capable of conducting ionic charge carriers;
at least one ionically conductive and electrochemically active solid-state layer positioned between the one or more electrolytes and the anode;
wherein the at least one ionically conductive and electrochemically active solid-state layer is electronically conductive;
wherein the at least one ionically conductive and electrochemically active solid-state layer comprises an electrochemically active material characterized by voltage ranges of reduction and oxidation suitable for reaction with Li;
wherein the at least one ionically conductive and electrochemically active solid-state layer comprises a lithium titanate and a second carbonaceous material.

2. The electrochemical cell of claim 1, wherein the at least one ionically conductive and electrochemically active solid-state layer is from 10 nm to 50 μm in thickness.

3. The electrochemical cell of claim 1, wherein said at least one ionically conductive and electrochemically active solid-state layer is nonporous.

4. The electrochemical cell of claim 1, wherein said at least one ionically conductive and electrochemically active solid-state layer comprises one or more of said electrolytes.

5. The electrochemical cell of claim 1, wherein said at least one ionically conductive and electrochemically active solid-state layer is in the form of a coating on at least one side of the one or more electrolytes.

6. The electrochemical cell of claim 1, wherein the one or more electrolytes is a polymer electrolyte or a ceramic electrolyte.

7. The electrochemical cell of claim 1, wherein the at least one ionically conductive and electrochemically active solid-state layer is porous.

8. The electrochemical cell of claim 1, wherein said at least one ionically conductive and electrochemically active solid-state layer is in physical contact with the anode.

9. The electrochemical cell of claim 1, wherein the at least one ionically conductive and electrochemically active solid-state layer comprises a composite material of metal and the second carbonaceous material.

10. The electrochemical cell of claim 1, wherein the at least one ionically conductive and electrochemically active solid-state layer comprises a mixture of metal and the second carbonaceous material.

11. The electrochemical cell of claim 1, wherein the at least one ionically conductive and electrochemically active solid-state layer comprises a coating on the one or more electrolytes.

12. The electrochemical cell of claim 1, wherein the at least one ionically conductive and electrochemically active solid-state layer comprises a coating on the anode.

13. The electrochemical cell of claim 1, wherein the at least one ionically conductive and electrochemically active solid state layer and the anode are separated by a woven, non-woven, or perforated layer.

14. The electrochemical cell of claim 13, wherein the woven, non-woven, or perforated layer comprises polyethylene, polypropylene, polyester, polyimide, or $TiO_2$.

15. The electrochemical cell of claim 13, wherein the woven, non-woven, or perforated layer is chemically inert.

16. The electrochemical cell of claim 1, wherein the one or more electrolytes comprises a solid electrolyte.

\* \* \* \* \*